United States Patent
Watanabe et al.

(10) Patent No.: US 10,603,743 B2
(45) Date of Patent: Mar. 31, 2020

(54) POWER SUPPLY DEVICE, JOINING SYSTEM, AND ELECTRIC PROCESSING METHOD

(71) Applicant: NIPPON STEEL & SUMITOMO METAL CORPORATION, Tokyo (JP)

(72) Inventors: Fuminori Watanabe, Tokai (JP); Kazuhiko Fukutani, Kimitsu (JP); Seiji Furusako, Kimitsu (JP); Chisato Yoshinaga, Kisarazu (JP); Tohru Okada, Toyota (JP)

(73) Assignee: NIPPON STEEL CORPORATION, Tokyo (JP)

( * ) Notice: Subject to any disclaimer, the term of this patent is extended or adjusted under 35 U.S.C. 154(b) by 207 days.

(21) Appl. No.: 15/533,423

(22) PCT Filed: Dec. 11, 2015

(86) PCT No.: PCT/JP2015/084776
§ 371 (c)(1),
(2) Date: Jun. 6, 2017

(87) PCT Pub. No.: WO2016/093340
PCT Pub. Date: Jun. 16, 2016

(65) Prior Publication Data
US 2017/0348798 A1    Dec. 7, 2017

(30) Foreign Application Priority Data
Dec. 12, 2014  (JP) .................................. 2014-252141
Dec. 12, 2014  (JP) .................................. 2014-252151

(51) Int. Cl.
*B23K 26/00*      (2014.01)
*B23K 9/10*       (2006.01)
(Continued)

(52) U.S. Cl.
CPC ........ *B23K 26/0342* (2015.10); *B23K 11/043* (2013.01); *B23K 11/11* (2013.01);
(Continued)

(58) Field of Classification Search
CPC ..... B23K 11/043; B23K 11/11; B23K 11/241; B23K 26/0342; B23K 26/1423;
(Continued)

(56) References Cited

U.S. PATENT DOCUMENTS 5,115,113 A * 5/1992 Miller .................... B23K 11/31
                                            219/117.1
6,140,825 A   10/2000 Fujii et al.
(Continued)

FOREIGN PATENT DOCUMENTS

CN    101847919 A    9/2010
CN    102077460 A    5/2011
(Continued)

OTHER PUBLICATIONS

Abe et al., "Fundamental Research on Spot Welding Method Capable of Inspecting Lowest Guarantee Nugget Diameter in Nondestructive Manner", Joining and Materials Processing for Light Structures Japan Welding Society, Jan. 20, 2006, total 21 pages.
(Continued)

*Primary Examiner* — Sang Y Paik
(74) *Attorney, Agent, or Firm* — Birch, Stewart, Kolasch & Birch, LLP

(57) ABSTRACT

There is provided a power supply device that supplies an output current to an electric processing device which performs electric processing on workpieces. The device includes: a first power supply; a magnetic energy recovery switch that receives a current supplied from the first power supply, and converts the received current into the output current; and a control unit that controls the magnetic energy
(Continued)

recovery switch such that an electric current frequency of the output current includes a first electric current frequency and a second electric current frequency which are different from each other within a one-time electric processing time using the electric processing device.

12 Claims, 19 Drawing Sheets

(51) Int. Cl.
    *B23K 26/03*     (2006.01)
    *H02M 7/48*     (2007.01)
    *H05B 3/00*     (2006.01)
    *B23K 11/11*     (2006.01)
    *B23K 11/04*     (2006.01)
    *B23K 11/24*     (2006.01)
    *B23K 26/14*     (2014.01)
    *H05B 37/02*     (2006.01)

(52) U.S. Cl.
    CPC ........ *B23K 11/241* (2013.01); *B23K 26/1423* (2013.01); *H02M 7/48* (2013.01); *H05B 3/00* (2013.01); *H05B 37/02* (2013.01); *Y02P 70/181* (2015.11)

(58) Field of Classification Search
    CPC ........... H02M 7/48; H02M 2001/0003; H02M 2001/0045; H02M 2001/0048; H05B 37/02; H05B 3/00; Y02P 70/181
    USPC ..... 219/121.63, 121.64, 136, 136 R, 139 PS, 219/130.01–130.51; 363/15, 16, 17, 34, 363/132, 136
    See application file for complete search history.

(56) References Cited

U.S. PATENT DOCUMENTS

| | | | |
|---|---|---|---|
| 2001/0054602 A1 | 12/2001 | Watanabe | |
| 2002/0166843 A1* | 11/2002 | Wang | B23K 11/115 219/117.1 |
| 2010/0014333 A1* | 1/2010 | Shimada | H05B 6/04 363/126 |
| 2010/0259955 A1 | 10/2010 | Shimada | |
| 2012/0129006 A1 | 5/2012 | Kanai et al. | |
| 2012/0305547 A1 | 12/2012 | Fukutani et al. | |

FOREIGN PATENT DOCUMENTS

| | | |
|---|---|---|
| JP | 60-255287 A | 12/1985 |
| JP | 3-146279 A | 6/1991 |
| JP | 9-206941 A | 8/1997 |
| JP | 2721952 B2 | 3/1998 |
| JP | 10-314956 A | 12/1998 |
| JP | 2001-44756 A | 2/2001 |
| JP | 3180530 B2 | 6/2001 |
| JP | 2003-80372 A | 3/2003 |
| JP | 2004-358500 A | 12/2004 |
| JP | 3634982 B2 | 3/2005 |
| JP | 3959302 B2 | 8/2007 |
| JP | 2010-82666 A | 4/2010 |
| JP | 2010-131666 A | 6/2010 |
| JP | 2011-194411 A | 10/2011 |
| JP | 2012-45569 A | 3/2012 |
| JP | 5043236 B2 | 10/2012 |
| KR | 10-2011-0059655 A | 6/2011 |
| WO | WO 2009/075366 A1 | 6/2009 |
| WO | WO 2010/023709 A1 | 3/2010 |
| WO | WO 2011/013793 A1 | 2/2011 |

OTHER PUBLICATIONS

International Search Report for PCT/JP2015/084776 dated Mar. 15, 2016.
Written Opinion of the International Searching Authority for PCT/JP2015/084776 (PCT/ISA/237) dated Mar. 15, 2016.
Korean Office Action, dated Jun. 20, 2018, for Korean Application No. 10-2017-7016476, with an English translation.
Extended European Search Report dated Aug. 10, 2018, in European Patent Application No. 15866633.9.
Decision of Rejection dated Aug. 7, 2018, in Japanes Patent Application No. 2016-563746, with English translation.
Notice of Allowance dated Dec. 4, 2018, in Japanese Patent Application No. 2016-563746, with English translation.
Office Action dated Sep. 30, 2018, in Chinese Patent Application No. 201580066513.5, with partial English translation.

\* cited by examiner

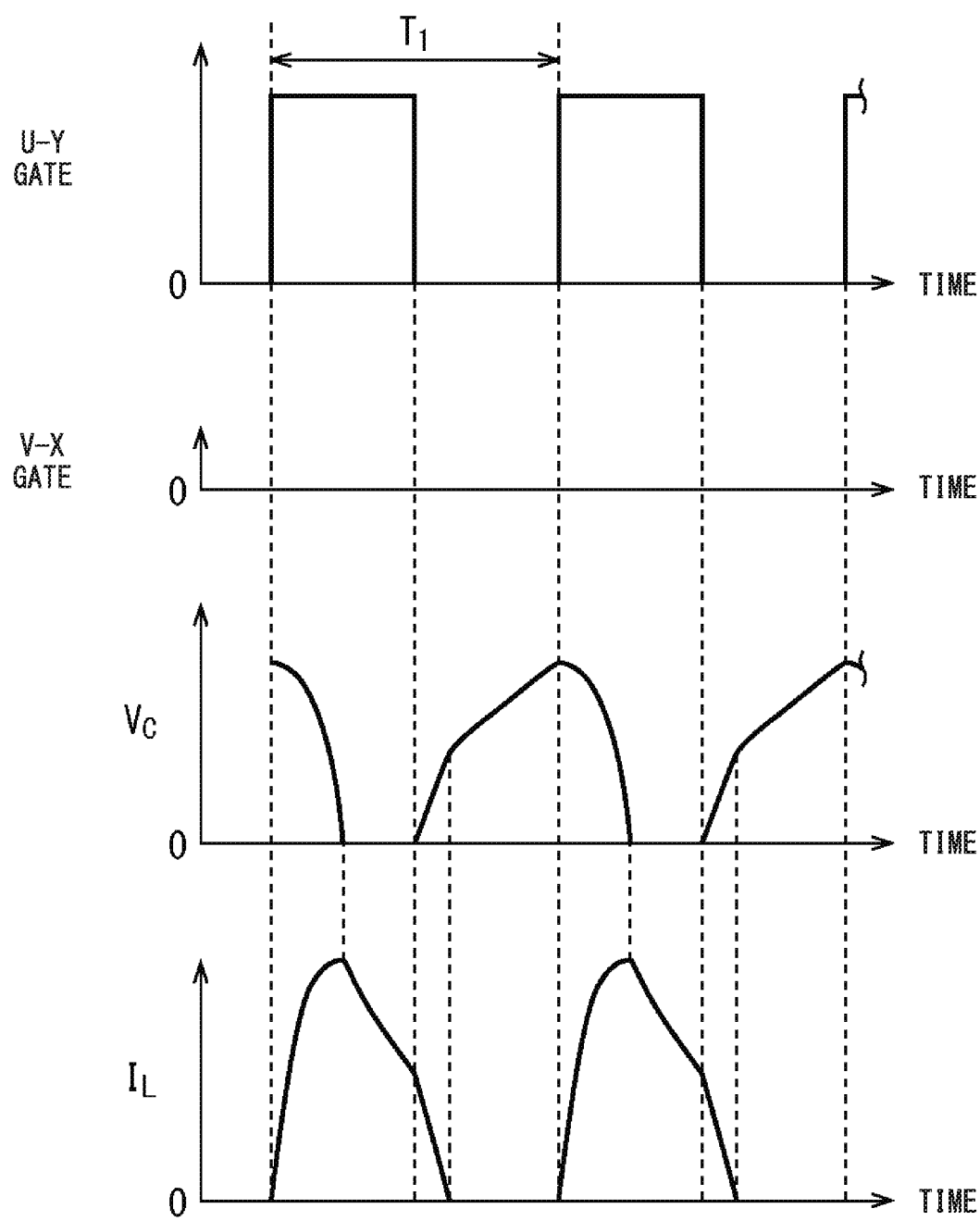

POWER SUPPLY DEVICE, JOINING SYSTEM, AND ELECTRIC PROCESSING METHOD

TECHNICAL FIELD OF THE INVENTION

The present invention relates a power supply device, a joining system, and an electric processing method.

Priority is claimed on Japanese Patent Application No. 2014-252141 filed on Dec. 12, 2014 and Japanese Patent Application No. 2014-252151 filed on Dec. 12, 2014, the contents of which are incorporated herein by reference.

RELATED ART

For example, in a process such as the assembly of various vehicles such as automobiles, ships, or other general machineries or the attachment of components, front surface or a process of manufacturing various components, electric processing performed on a component as a treated target is known. For example, in a case where the assembly of various vehicles such as automobiles, ships, or other general machineries is performed, there are many cases where resistance spot welding is used. The resistance spot welding is a method of joining a plurality of metal sheets by melting and solidifying a spot portion by Joule's heat generated by the spot portion by applying an electric current while pressurizing a welding electrode against a front surface and a rear surface of a layered portion (spot portion) of the plurality of metal sheets of which sheet surfaces are layered each other.

In general, when the resistance spot welding is performed, a single phase alternating current in a commercial frequency or a discharging current from a capacitor is applied to the welding electrode through a current transformer. There are some cases where the current passed through the current transformer is rectified and a direct current is applied. In these cases, since the current flowing in the spot portion is a low-frequency current or the direct current, the current is concentrated in the center (a contact section between the electrode and the metal sheet) of the spot portion, and the current flows approximately uniformly. Accordingly, if heat leakage to the vicinity of the spot portion (electric current portion) is taken into consideration, a temperature distribution of the electric current portion of the metal sheet is a distribution in which a temperature in the center of the electric current region is the highest and a temperature becomes lower as a position becomes away from the electric current region.

In a case where the resistance spot welding is performed on a metal sheet having high strength or rigidity such as a high-tensile steel sheet or a thick steel sheet, joint strength of a welded joint needs to be high. For example, various documents to be indicated below are known as a relevant technology of the resistance spot welding.

For example, Patent Document 1 discloses a technology for controlling a material of the welding metal by controlling a current value to control a temperature history of metal of a welding portion.

Patent Document 2 discloses that a tampering region is controlled by simultaneously applying a power supplied from a low-frequency power supply having a frequency of 50 Hz and a power supplied from a high-frequency power supply having a frequency of 30 kHz to two steel sheets in order to control a heat generation distribution of the electric current portion of the metal sheet.

Patent Documents 3 and 7 disclose a magnetic energy recovery switch (hereinafter, referred to as an MERS).

In a procedure during which the spot portion is heated and melt, splashed matter of the melting metal called sputters (splashes) are generated by factors such as (1) an excessive welding current, (2) a lack of a welding pressure of the welding electrode against the metal sheet, and (3) contamination of a front surface of the spot portion. Due to the occurrence of the sputters, workability when the resistance spot welding is performed is deteriorated, and quality of the welded joint is deteriorated, for example, the joint strength of the welded joint is insufficient in some cases.

Under the background described above, Patent Document 4 discloses a technology of increasing the welding pressure in a case where a welding pressure of a welding metal rod against the metal sheet is lower than a reference welding pressure.

As the technology for controlling the welding pressure, Patent Document 5 discloses a technology for controlling the welding pressure by calculating a compensation value by acquiring an average of signals output from the pressure detector when the welding electrode is not in contact with the pressure detector and subtracting the compensation value from the signals output from the pressure detector when the resistance spot welding is performed.

Patent Document 6 discloses a technology for synchronizing the welding pressure and the welding current during the resistance spot welding.

Incidentally, mechanical properties of the joint (hereinafter, referred to as a "spot welded joint") formed by layering the steel sheets each other and performing spot welding on the layered steel sheets are evaluated by tension shear strength (TSS) measured by applying a tension load in a direction in which the steel sheet is sheared and cross tension strength (CTS) measured by applying a tension load in a direction in which the steel sheet is peeled off. The measurement method of the tension shear strength and the cross tension strength is defined by JIS Z 3136 and JIS Z 3137.

For example, in a case where two steel sheets having tensile strength of 270 to 600 MPa are layered each other and spot welding is performed on these steel sheets, since the CTS of the welded joint is increased with an increase of the steel sheet strength, it is difficult to cause a problem of the joint strength. However, in a case where a high-strength steel sheet having a tensile strength of 750 MPa or more is used, even though the tensile strength of the steel sheet is increased, the CTS is not increased or is conversely decreased.

In general, in a case where the high-strength steel sheet is used, since stress concentration on the welding portion is increased due to a deterioration in deformability and toughness of the welding portion is deteriorated due to the quenching of the welding portion, the CTS is deteriorated. Thus, the spot welded joint of the high-strength steel sheet having the tensile strength of 750 MPa or more particularly needs to have improved CTS.

In order to improve the CTS of the spot welding, the relieving of the stress concentration on the welding portion and the improvement of the toughness of the welding portion are effective, and various technologies are suggested. If the improving effect of the CTS and the easiness of management in actual production of a structural member are taken into consideration, it is considered that an increase of a diameter of a nugget is effective in order to increase an outer circumferential dimension of the nugget on which the stress is concentrated.

Patent Document 8 discloses a high-frequency spot welder that supplies a power by a coaxial conductor until a spot welding point by attaching a welding transformer to a welding gun. The high-frequency spot welder includes a frequency converting device. The high-frequency spot welder modifies the welding portion through heat treatment by converting a frequency when necessary, and improves the strength thereof. However, since the nugget diameter is not increased only by the heat treatment, there is a limitation in improving the CTS.

Patent Document 9 discloses a metal material welding method of performing the spot welding by using a high frequency power and performing a heat treatment on the spot-welded region. However, even in the welding method, since the nugget diameter is not increased, there is a limitation in improving the CTS.

Patent Document 2 discloses a welding method of applying a power having a second frequency higher than a first frequency to the welding portion formed by applying a power having the first frequency and heating a region of a joining end portion of the welding portion and a region around the outer circumferential portion. However, even in the welding method, since the nugget diameter is not increased, there is a limitation in improving the CTS.

Patent Document 10 discloses a method of giving mechanical vibration to a welding portion to miniaturize the structure of the welding portion when the welding portion is changed from the melting state to the solidification structure in the spot welding method. However, in this method, since the mechanical vibration is less likely to propagate to the melting portion and the structure of the welding portion is not miniaturized as much as expected, there is a problem that the improving effect of the CTS is less.

Non-Patent Document 1 discloses a spot welding method using spot welding electrodes having a smooth concave depression in a center portion of the one electrode tip. According to the spot welding method, it is possible to stably form a nugget having a diameter which is equal to or greater than a lowest guarantee nugget diameter. However, in a case where there is a slight deviation or inclination of an axis of the welder due to of the presence of the depression formed in the spot welding electrode, since a welding operation becomes unstable, it is difficult to apply the welder to the actual production.

Patent Document 11 discloses a spot welding electrode capable of forming a nugget having a large diameter. However, in a case where there is a slight deviation or inclination of an axis of the welder due to of the presence of a cylindrical hollow portion present in the electrode tip, since welding operation becomes unstable, it is difficult to apply the welder to the actual production. Patent Document 11 does not disclose the CTS.

PRIOR ART DOCUMENT

Patent Document

[Patent Document 1] Japanese Patent No. 5043236
[Patent Document 2] PCT International Publication No. WO2011/013793
[Patent Document 3] Japanese Patent No. 3634982
[Patent Document 4] Japanese Patent No. 3180530
[Patent Document 5] Japanese Patent No. 3959302
[Patent Document 6] Japanese Patent No. 2721952
[Patent Document 7] PCT International Publication No. WO2009/075366
[Patent Document 8] Japanese Unexamined Patent Application, First Publication No. S60-255287
[Patent Document 9] Japanese Unexamined Patent Application, First Publication No. 2010-082666
[Patent Document 10] Japanese Unexamined Patent Application, First Publication No. 2011-194411
[Patent Document 11] Japanese Unexamined Patent Application, First Publication No. 2010-131666

Non-Patent Document

[Non-Patent Document 1] Hiroshi ABE and Takumi YAMAGUCHI, "Fundamental Research on Spot Welding Method Capable of Inspecting Lowest Guarantee Nugget Diameter in Non-destructive Manner" (Joining and Materials Processing for Light Structures, Japan Welding Society, Jan. 20, 2006)

DISCLOSURE OF THE INVENTION

Problems to be Solved by the Invention

In the technology described in Patent Document 1, the direct current or the single phase alternating current in the commercial frequency of the related art is used as target, and it is possible to control only the effective value of the related art, as the current control. In the technology described in Patent Document 2, two power supplies of the low-frequency power supply and the high-frequency power supply are necessary. Accordingly, since it is necessary to control two power supplies, there is a concern that the control is complicated and the size of the device is increased. The appropriate heat generation distribution in the welding portion of the metal sheet is changed within an extremely short time such as one second required to perform one-point spot welding depending on the welding condition (size, material, thickness, or a temperature change of the welding portion) and required characteristics (the welding metallographic structure or the joint strength). However, since the high-frequency power supply of the technology described in Patent Document 2 constitutes a series resonance circuit, the frequency of the high-frequency power supply is fixed, and the power supply needs to be provided for each frequency in order to set a heat generation region for the purpose thereof. Thus, the frequency of the output current is not able to be switched within the extremely short time such as one second.

Accordingly, the characteristics of a heated portion need to be improved by further improving current controllability when energization heating is performed on a conductor material by using a high current within a short time compared to the power supply of the related art.

The MERS described in Patent Documents 3 and 7 uses a configuration of a current switch that recovers snubber energy, but does not examine the frequency control of the high current within a short energization heating time.

In a configuration in which a welding pressure is detected and the welding pressure is controlled as in Patent Document 4, a response (a time required from when the welding pressure is detected to when the pressurization is performed with a changed welding pressure) becomes slow. Accordingly, it is not easy to reliably control the sputters.

Accordingly, when the resistance spot welding is performed, it is necessary to control the occurrence of the sputters.

As described in Patent Document 8, in order to improve the CTS, the increase of the nugget diameter or the modification of the welding portion is effective. Particularly, the increase of the nugget diameter is effective, but it is difficult to stably increase the nugget diameter in the related art.

Accordingly, the nugget diameter is stably and reliably increased, and thus, the CTS needs to be increased by reliably increasing the length of the outer circumferential portion of the nugget.

Among the various problems described above, it is particularly important to improve the current controllability when the energization heating is performed on the workpiece which is the conductor material by using the high current within the short time in terms of the improvement of the characteristics of a processing target portion which is the welding portion.

The present invention has been made in view of the above-described circumstances, and it is an object of the present invention to provide a power supply device capable of improving characteristics of a workpiece by further improving controllability of a current when electric processing is performed on the workpiece compared to that in the related art, a joining system using the power supply device, and an electric processing method.

Means for Solving the Problem

The present invention employs the following matters in order to solve the problems and in order to achieve an object.

(1) A power supply device according to an aspect of the present invention is a power supply device that supplies an output current to an electric processing device which performs electric processing on workpieces. The power supply device includes: a first power supply; a magnetic energy recovery switch that receives a current supplied from the first power supply, and converts the received current into the output current; and a control unit that controls the magnetic energy recovery switch such that an electric current frequency of the output current includes a first electric current frequency and a second electric current frequency which are different from each other within a one-time electric processing time using the electric processing device.

In accordance with the power supply according to the aspect described in (1), the control unit changes the electric current frequency such that the power supply device includes the first electric current frequency and the second electric current frequency which are different from each other within the one-time electric processing time. As a result, it is possible to control the electric current frequency of the output current to be applied such that the electric processing device performs an appropriate processing condition (for example, a current distribution condition or a heat distribution condition of the welding portion) corresponding to the material or shape of the workpiece. In addition, since the configuration in which the electric current frequency is switched by the magnetic energy recovery switch is employed, it is possible to further improve the controllability of the output current within a short time compared to that in the related art.

(2) In the power supply device according to (1), the one-time electric processing time may be equal to or less than one second.

In the description of (2), since the electric current frequency can be controlled within a short time which is equal to or less than one second, it is possible to appropriately apply the power supply device, for example, to the resistance spot welding.

(3) In the power supply device according to (1) or (2), the electric current frequency during the electric processing may be equal to or less than a resonance frequency determined by inductance on a side of the electric processing device viewed from an output end of the magnetic energy recovery switch and capacitance of a capacitor included in the magnetic energy recovery switch.

In the description of (3), the electric current frequency is set to be equal to or less than the resonance frequency, and thus, it is possible to realize the soft switching.

(4) In the power supply device according to any one of (1) to (3), the magnetic energy recovery switch may include a bridge circuit in which a first reverse conducting semiconductor switch and a fourth reverse conducting semiconductor switch are arranged in series in a first path such that conduction directions when the first and fourth reverse conducting semiconductor switches are switched off are reverse directions each other, a second reverse conducting semiconductor switch and a third reverse conducting semiconductor switch are arranged in series in a second path such that conduction directions when the second and third reverse conducting semiconductor switches are switched off are reverse directions each other, and the conduction directions of the first reverse conducting semiconductor switch and the third reverse conducting semiconductor switch when the first and third reverse conducting semiconductor switches are switched off are the same, and a capacitor that is connected between a region of regions of the first path which is located between the first reverse conducting semiconductor switch and the fourth reverse conducting semiconductor switch and a region of regions of the second path which is located between the second reverse conducting semiconductor switch and the third reverse conducting semiconductor switch. The magnetic energy recovery switch may be disposed between the first power supply and the electric processing device. The control unit may control the electric current frequency within the one-time electric processing time by controlling an ON time and an OFF time of at least one of a pair including the first reverse conducting semiconductor switch and the third reverse conducting semiconductor switch and a pair including the second reverse conducting semiconductor switch and the fourth reverse conducting semiconductor switch, or may control the electric current frequency and a current value of the output current within the one-time electric processing time by controlling the current supplied from the first power supply, and the ON time and the OFF time of at least one of the pair including the first reverse conducting semiconductor switch and the third reverse conducting semiconductor switch and the pair including the second reverse conducting semiconductor switch and the fourth reverse conducting semiconductor switch.

In the description of (4), since the power supply device has the configuration in which the electric current frequency can be switched by the magnetic energy recovery switch and the electric current can be independently controlled, it is possible to further improve the controllability of the output current in the short time compared to that in the related art.

(5) A joining system according to an aspect of the present invention includes: the power supply device according to any one of (1) to (4); and a joining device as the electric processing device that applies the output current output from the power supply device to a contact region between a plurality of electric-current applied materials as the workpieces and joins the plurality of electric-current applied materials by performing energization heating on the contact region.

According to the joining system according to the aspect described in (5), the joining device and the power supply device capable of controlling the frequency of the output current are combined, and thus, it is possible to control the change of the electric current frequency within a one-time electric processing time which is not able to be realized in the related art.

(6) In the joining system according to (5), the joining device may include a first electrode, a second electrode that is disposed so as to face the first electrode, the plurality of electric-current applied materials being clamped between the first electrode and the second electrode, and a plurality of coils through which magnetic fluxes penetrate, the magnetic fluxes generated by the output current output from the power supply device, which flows in the first electrode, the plurality of electric-current applied materials, and the second electrode. The control unit may control the magnetic energy recovery switch such that the electric current frequency of the output current output from the power supply device is changed depending on electromotive forces generated by the plurality of coils due to the magnetic fluxes.

In the description of (6), it is possible to ascertain the state of the output current flowing in the electric-current applied material during the electric processing, as the change of the electromotive force generated by the coil. Accordingly, the control unit can control the operation of the magnetic energy recovery switch through the feedback control such that the output current to be applied to the electric-current applied material becomes appropriate based on the change of the electromotive force. If a single coil is disposed, the current value flowing in the electrode can be detected, and the control based on the current value can be performed. However, if the plurality of coils is used, since information regarding the distribution of the current can be extracted, it is possible to perform high-accuracy control.

(7) In the joining system according to (6), the plurality of coils may be arranged in positions different from each other around a central axis which shares a common axis with the first electrode and the second electrode with respect to at least one of the first electrode and the second electrode.

In the description of (7), since it is possible to ascertain the change of the electromotive force generated by the coil in multiple portions around at least one of the first electrode and the second electrode, it is possible to ascertain the state change of the output current flowing in the electric-current applied material in more detail.

(8) In the joining system according to (6) or (7), if it is determined that at least one of the electromotive forces generated by the plurality of coils is deviated from a preset range, the control unit may control the magnetic energy recovery switch such that the output current is increased or decreased by a value corresponding to a deviation amount from the preset range.

In the description of (8), it is possible to control the output current by the value corresponding to the deviation amount from the preset range by comparing the electromotive forces generated by the plurality of coils with the preset range.

(9) In the joining system according to (6), the plurality of coils may face each other with the first electrode and the second electrode interposed therebetween, and may be wound around the plurality of electric-current applied materials.

In the description of (9), since the coils face each other with the first electrode and the second electrode interposed therebetween and the change of the electromotive forces generated by the plurality of coils wound around the plurality of electric-current applied materials can be ascertained, it is possible to ascertain the state change of the output current flowing in the electric-current applied material in more detail.

(10) In the joining system according to any one of (5) to (9), the joining device may include a pressure adjustment unit that increases or decreases a clamping force for clamping the plurality of electric-current applied materials.

In the description of (10), the clamping force is increased by the pressure adjustment unit, and thus, the outer dimensions of the melting portions in the contact region are increased. Accordingly, the fused area of the electric-current applied materials can be increased.

(11) An electric processing method according to an aspect of the present invention includes: a preparing process of preparing electric processing conditions corresponding to workpieces; and an electric processing process of, within a one-time electric processing time of the workpieces according to the electric processing condition, applying an output current having a first electric current frequency to the workpieces and applying an output current having a second electric current frequency different from the first electric current frequency to the workpieces.

In accordance with the electric processing method according to an aspect of the description of (11), the electric current frequency is changed such that the electric current frequency includes the first electric current frequency and the second electric current frequency which are different from each other according to the electric processing condition within the one-time electric processing time. As a result, the electric processing is performed under an appropriate processing condition (for example, a current distribution condition or a heat distribution condition of the welding portion) corresponding to the material or shape of the workpiece.

(12) In the electric processing method according to (11), the electric processing process may include a process of increasing or decreasing the output current depending on a change of an electromotive force based on magnetic flux generated by the output current applied to the workpiece.

In the description of (12), the state of the output current flowing in the workpiece can be ascertained as the change of the electromotive force based on the magnetic flux. Accordingly, it is possible to perform appropriate feedback control such that the output current applied to the workpiece becomes appropriate based on the change of the electromotive force.

(13) In the electric processing method according to (11) or (12), the electric processing process may include a process of forming a contact region for clamping a plurality of electric-current applied materials as the workpieces, a process of performing energization heating for applying the output current to the contact region, and a process of increasing or decreasing a clamping force applied to the plurality of electric-current applied materials.

In the description of (13), the clamping force is increased when necessary, and thus, the outer dimensions of the melting portions of the contact region can be increased. Accordingly, it is possible to increase the fused area of the electric-current applied materials.

EFFECTS OF THE INVENTION

In accordance with the power supply device according to the aspect described in (1), since the electric processing device can perform the electric processing using the appropriate processing condition corresponding to the material or shape of the workpiece, it is possible to improve the characteristics (for example, the joint strength of the welding portion in the resistance spot welding) of the workpiece.

In the description of (2), for example, in a case where the resistance spot welding is applied, mechanical properties such as the joint strength of the workpiece after the electric processing is performed can be further improved compared to that in a case where the power supply device of the related art is used.

In the description of (3), since the soft switching can be realized, it is possible to reduce a switching loss. In addition, since it is not necessary to use a voltage source capacitor having a high capacitance due to the soft switching, a capacitance of the capacitor can be decreased.

In accordance with the power supply device according to the aspect described in (4), since the electric processing device can perform the electric processing using the appropriate processing condition corresponding to the material or shape of the workpiece, it is possible to improve the characteristics (for example, the joint strength of the welding portion in the resistance spot welding) of the workpiece.

In accordance with the joining system according to the aspect described in (5), since the joining device can perform the joining using the appropriate joining condition corresponding to the material or shape of the electric-current applied materials to be joined, it is possible to improve the joint strength of the joining region between the electric-current applied materials.

In the description of (6), since the state of the output current flowing in the electric-current applied materials during the electric processing can be ascertained in real time and the feedback control can be performed such that the output current becomes appropriate, it is possible to prevent the occurrence of the sputters in the electric-current applied materials, and it is possible to further improve joint quality in the joining region between the electric-current applied materials.

In the description of (7), since the state change of the output current flowing in the electric-current applied materials can be ascertained in more detail, it is possible to perform minuter feedback control. Thus, it is possible to more effectively prevent the occurrence of the sputters in the electric-current applied materials, and it is possible to further improve the joint quality.

In the description of (8), since it is possible to control the output current by the value corresponding to the deviation amount from the preset range by comparing the electromotive forces generated by the plurality of coils with the preset range, it is possible to perform minuter feedback control. Thus, it is possible to more effectively prevent the occurrence of the sputters in the electric-current applied materials, and it is possible to further improve the joint quality.

In the description of (9), since it is possible to perform minuter feedback control, it is possible to more effectively prevent the occurrence of the sputters in the electric-current applied materials, and it is possible to further improve the joint quality.

In the description of (10), since the fused area of the electric-current applied materials can be increased, a joint having a relatively large size can be acquired. Thus, it is possible to improve both tension shear strength (TSS) measured by applying a tension load to the electric-current applied material in a shear direction and cross tension strength (CTS) measured by applying a tension load to the electric-current applied material in a peeling direction.

In accordance with the electric processing method according to the aspect described in (11), since the electric processing device can perform the electric processing using the appropriate electric processing condition corresponding to the material or shape of the workpiece, it is possible to improve the characteristics (for example, the joint strength of the welding portion in the resistance spot welding) of the workpiece.

In the description of (12), since the state of the output current flowing in the workpieces during the application of the electric current can be ascertained in real time and the feedback control can be performed such that the output current becomes appropriate, it is possible to prevent the occurrence of the sputters in the workpieces, and it is possible to further improve joint quality.

In the description of (13), since the fused area of the electric-current applied materials can be increased, a joint having a relatively large size can be acquired. Thus, it is possible to improve both tension shear strength (TSS) measured by applying a tension load to the electric-current applied material in a shear direction and cross tension strength (CTS) measured by applying a tension load to the electric-current applied material in a peeling direction.

BRIEF DESCRIPTION OF THE DRAWINGS

FIG. 10 is a diagram for describing an example of an operation of an MERS according to the present embodiment.

EMBODIMENTS OF THE INVENTION

Figure 1:
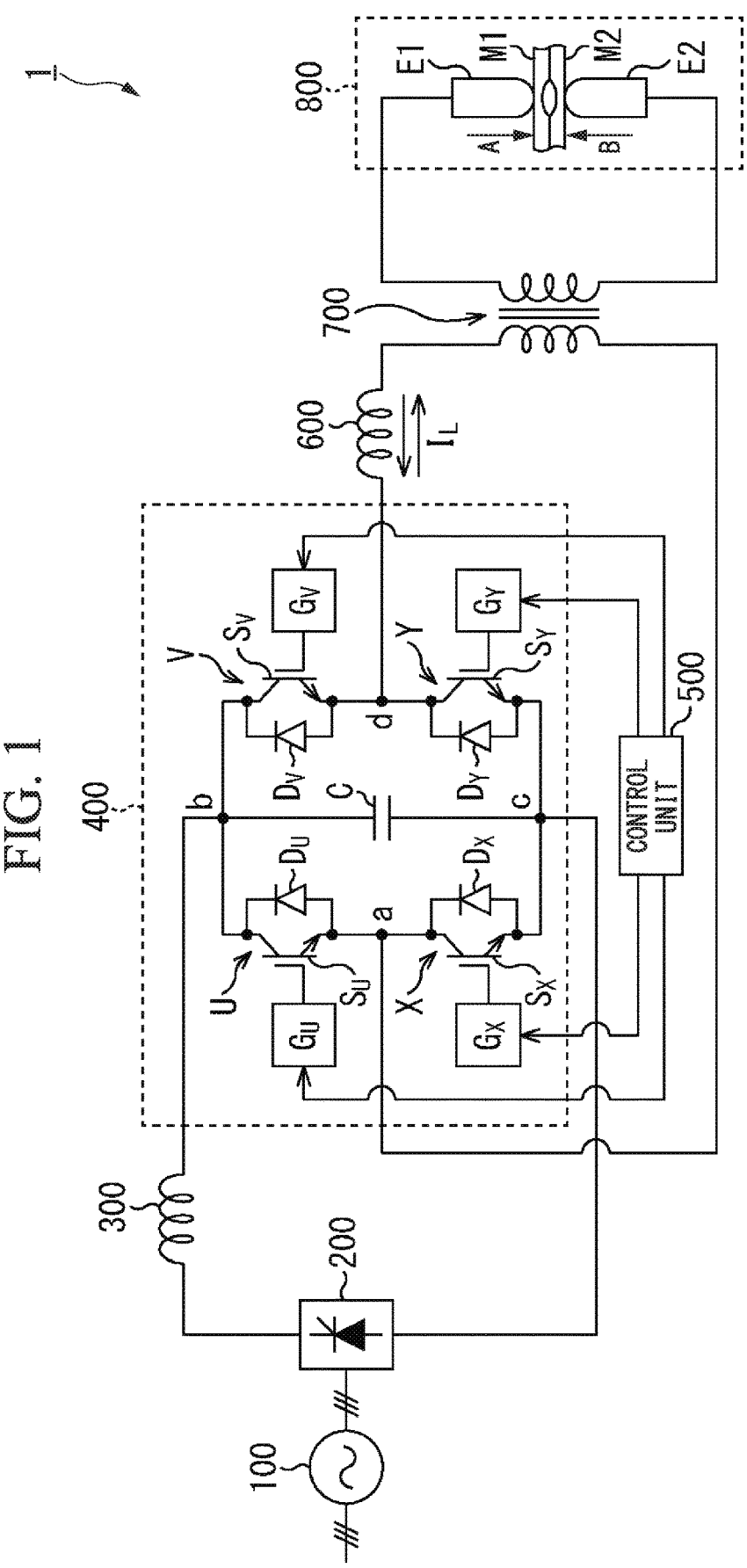
FIG. 1 is a diagram showing an example of a resistance spot welding system according to a first embodiment of the present invention.

Hereinafter, embodiments of a power supply device, a joining system, an electric processing method of the present invention will be described.

[First Embodiment]

In the present embodiment, a power supply device capable of controlling a frequency (electric current frequency) of a current applied to a workpiece (a conductive material or an electric-current applied material) within a one-time electric processing time by means of an electric processing device by using a magnetic energy recovery switch (hereinafter, referred to as an "MERS") is employed.

In the present embodiment, an example in which resistance spot welding is performed as the electric processing using a high current within a short time will be described. A steel sheet, a metal sheet such as iron, aluminum, titanium, or stainless steel, and a carbon fiber composite material is included in the workpiece (the conductive material or the electric-current applied material). In the present embodiment, an example in which the metal sheet is used as the workpiece will be described. In the resistance spot welding, energization heating for causing a high current to flow within a short time is performed. Here, the short-time energization heating means the application of an electric current in which a one-time electric processing time (one-time energization heating time) is, for example, equal to or less than one second, and preferably equal to or less than 0.5 seconds (that is, a case where when the one-time electric processing time is equal to or less than one second and preferably equal to or less than 0.5 seconds, and heating for one heating target region of the conductive material is ended). The one-time electric processing (one-time energization heating) means a process from when desired processing (heat treatment) is started by applying an electric current to the conductive material to when the processing (heat treatment) is ended by stopping the application of the electric current. The one-time electric processing (energization heating) includes a case where the processing (heat treatment) is started by performing the application of the electric current, temporarily stopping the application of the electric current for cooling and solidifying the welding portions, resuming the electric processing (energization heating) by applying the electric current to the same welding portions again, and then the processing (heat treatment) is ended by stopping the application of the electric current to the same welding portions. That is, the one-time electric processing (one-time energization heating) includes a case where the temporarily stopping of the application of the electric current is performed one time or multiple times between the initial starting of the application of the electric current and the final ending of the application of the electric current. In the resistance spot welding, one-time resistance spot welding is performed within the one-time energization heating time. For example, the high current refers to a current having an effective value of 1 kA or more, and more preferably 3 kA or more.

(Configuration of Resistance Spot Welding System)

FIG. 1 is a diagram showing an example of a configuration of a resistance spot welding system 1 according to a first embodiment.

The resistance spot welding system 1 is an example of a joining system, and includes an AC power supply 100 (first power supply), a rectifier 200, a DC reactor 300, an MERS 400, a control unit 500, an AC inductance 600, a current transformer 700, and a resistance spot welder 800 (electric processing device). In the present embodiment, the AC power supply 100, the rectifier 200, the DC reactor 300, the MERS 400, the control unit 500, the AC inductance 600, and the current transformer 700 constitute the power supply device. The power supply device supplies an output current to the resistance spot welder 800 that performs electric processing on the workpiece.

The MERS 400 receives the current supplied from the AC power supply 100, and converts the current into an output current to be supplied to the resistance spot welder 800. A connection relationship on an input side of the MERS 400 is as follows.

An input end of the rectifier 200 and the AC power supply 100 are connected to each other. One of output ends of the rectifier 200 and one end of the DC reactor 300 are connected to each other. The other one of the output ends of the rectifier 200 and a DC terminal c of the MERS 400 are connected to each other. The other end of the DC reactor 300 and a DC terminal b of the MERS 400 are connected to each other.

A connection relationship on an output side of the MERS 400 is as follows.

An AC terminal d of the MERS 400 and one end of the AC inductance 600 are connected to each other. The other end of the AC inductance 600 and one of input ends of the current transformer 700 are connected to each other. An AC terminal a of the MERS 400 and the other one of the input ends of the current transformer 700 are connected to each other. One of output ends of the current transformer 700 and a welding electrode E1 (first electrode) are connected to each other, and the other one thereof and a welding electrode E2 (second electrode) are connected to each other.

The AC power supply 100 is an example of an original power supply, and outputs an AC power. The AC power supply 100 may be a single-phase AC power supply, or may be a three-phase AC power supply.

The rectifier 200 rectifies the AC power output from the AC power supply 100, and converts the rectified AC power into a DC power. In a case where the AC power supply 100 is the single-phase AC power supply, the rectifier 200 includes a single-phase rectifier circuit. Meanwhile, in a case where the AC power supply 100 is the three-phase AC power supply, the rectifier 200 includes a three-phase rectifier circuit.

The DC reactor 300 smooths the DC power output from the rectifier 200.

The MERS 400 is an example of the MERS, and outputs the DC power input from the rectifier 200 through the DC reactor 300, as the AC power.

The control unit 500 controls an operation of the MERS 400.

An operation of the MERS 400 will be described in detail.

The current transformer 700 converts an alternating current output from the MERS 400 through the AC inductance 600 into a high current according to a turns ratio of the current transformer 700, and outputs the transformed current to the welding electrodes E1 and E2 of the resistance spot welder 800. In the present embodiment, an example in which the high current is supplied to the resistance spot welder 800 by using the current transformer 700 is illustrated. However, the current transformer 700 is not necessarily used. For example, as long as the respective elements constituting the MERS 400 can endure the above-described high current, it is not necessary to use the current transformer 700.

The resistance spot welder 800 joins contact regions by Joule's heat generated in the contact regions by applying the current to the contact regions of desired positions of metal sheets M1 and M2 while pressurizing the welding electrodes E1 and E2 so as to clamp the metal sheets M1 and M2 from a front surface and a rear surface of a layered portion of a plurality of the metal sheets M1 and M2 of which sheet surfaces are layered each other, that is, in an A direction and a B direction of FIG. 1. A known welding device may be used as the resistance spot welder 800. Various capable of being applied to the resistance spot welding may be employed as the material, sheet thickness, and number of the metal sheets M1 and M2 as targets of the resistance spot welding. As stated above, an example in which the electric processing device is the resistance spot welder 800 will be described in the present embodiment.

(Configuration of MERS 400)

Hereinafter, an example of a configuration of the MERS 400 will be described.

As shown in FIG. 1, the MERS 400 includes a bridge circuit, and a capacitor C. The bridge circuit includes four reverse conducting semiconductor switches U, V, X, and Y which are provided on two paths, and two switches are arranged in each path. The capacitor C is disposed between two paths of the bridge circuit.

Specifically, the bridge circuit includes a first path that is a path which reaches from the AC terminal a to the AC terminal d via the DC terminal b, and a second path that is a path which reaches from the AC terminal a to the AC terminal d via the DC terminal c.

On the first path, the reverse conducting semiconductor switch V (fourth reverse conducting semiconductor switch) is disposed between the AC terminal d and the DC terminal b, and the reverse conducting semiconductor switch U (first reverse conducting semiconductor switch) is disposed between the DC terminal b and the AC terminal a.

On the second path, the reverse conducting semiconductor switch Y (third reverse conducting semiconductor switch) is disposed between the AC terminal d and the DC terminal c, and the reverse conducting semiconductor switch X (second reverse conducting semiconductor switch) is disposed between the DC terminal c and the AC terminal a. The capacitor C is disposed between the DC terminal b and the DC terminal c.

When ON signals are not input to gate terminals $G_U$, $G_V$, $G_X$, and $G_Y$ and the reverse conducting semiconductor switches U, V, X, and Y are switched off, these switches cause a current to flow only in one direction, and when an ON signals are input to the gate terminals $G_U$, $G_V$, $G_X$, and $G_Y$ and these switches are switched on, these switches cause the current to flow in both directions. That is, when the reverse conducting semiconductor switches U, V, X, and Y are switched off, these switches cause the current to flow in one direction between an emitter terminal and a collector terminal, and when these switches are switched on, these switches cause the current to flow in both directions between the emitter terminal and the collector terminal.

In the following description, the "directions in which the current flows when the reverse conducting semiconductor switches U, V, X, and Y are switched off" are referred to as "forward directions" when necessary, and the directions in which the current does not flow when these switches are switched off are referred to as "reverse directions" when necessary. In the following description, "connection directions to the circuit in the forward directions and the reverse directions" are referred to as "switch polarities" when necessary.

The reverse conducting semiconductor switches U, V, X, and Y are arranged such that polarities of the switches are as follows. The reverse conducting semiconductor switch U and the reverse conducting semiconductor switch X connected in parallel between the AC terminal a and the AC terminal d have switch polarities of reverse directions each other. Similarly, the reverse conducting semiconductor switch V and the reverse conducting semiconductor switch Y connected in parallel between the AC terminal a and the AC terminal d also have switch polarities of reverse directions each other. The reverse conducting semiconductor switch U and the reverse conducting semiconductor switch V connected in series between the AC terminal a and the AC terminal d have switch polarities of reverse directions each other. Similarly, the reverse conducting semiconductor switch X and the reverse conducting semiconductor switch Y connected in series between the AC terminal a and the AC terminal d also have switch polarities of reverse directions each other.

Thus, the reverse conducting semiconductor switch U and the reverse conducting semiconductor switch Y have switch polarities of forward directions. The reverse conducting semiconductor switch V and the reverse conducting semiconductor switch X also have switch polarities of forward directions. The switch polarities of the reverse conducting semiconductor switches U and Y and the switch polarities of the reverse conducting semiconductor switches V and X are reverse directions.

The switch polarities shown in FIG. 1 may be opposite between the reverse conducting semiconductor switches U and Y and between the reverse conducting semiconductor switches V and X.

Various configurations are considered as the configuration of the reverse conducting semiconductor switches U, V, X, and Y. In the present embodiment, it is assumed that semiconductor switches $S_U$, $S_V$, $S_X$, and $S_Y$ and diodes $D_U$, $D_V$, $D_X$, and $D_Y$ are connected in parallel. That is, the reverse conducting semiconductor switches U, V, X, and Y include one of the diodes $D_U$, $D_V$, $D_X$, and $D_Y$, and one of the semiconductor switches $S_U$, $S_V$, $S_X$, and $S_Y$ connected to the diodes in parallel, respectively.

The gate terminals $G_U$, $G_V$, $G_X$, and $G_Y$ of the semiconductor switches $S_U$, $S_V$, $S_X$, and $S_Y$ are connected to the control unit 500. The gate terminals $G_U$, $G_V$, $G_X$, and $G_Y$ receive inputs of ON signals (gate signals) for turning on the semiconductor switches $S_U$, $S_V$, $S_X$, and $S_Y$, as a control signal to the MERS 400 from the control unit 500. While the ON signals are being input, the semiconductor switches $S_U$, $S_V$, $S_X$, and $S_Y$ are turned on, and cause the current to flow in both directions. However, in a case where the ON signals are not input, the semiconductor switches $S_U$, $S_V$, $S_X$, and $S_Y$ are turned off, the switches do not cause the current to flow in any direction. Thus, when the semiconductor switches $S_U$, $S_V$, $S_X$, and $S_Y$ are turned off, the current flows only in conduction directions of the diodes $D_U$, $D_V$, $D_X$, and $D_Y$ connected to the semiconductor switches $S_U$, $S_V$, $S_X$, and $S_Y$ in parallel.

The reverse conducting semiconductor switches included in the MERS 400 are not limited to only the reverse conducting semiconductor switches U, V, X, and Y. That is, the reverse conducting semiconductor switches may have the configuration indicating the above-described operation. For example, these switches may be power MOS FETs or reverse conducting GTO thyristors, or may have a configuration in which the diodes and the semiconductor switches such as IGBTs are connected in parallel.

The description of the switch polarities of the reverse conducting semiconductor switches U, V, X, and Y using the diodes $D_U$, $D_V$, $D_X$, and $D_Y$ is as follows. That is, the forward directions (the directions in which the current flows when the switches are turned off) are conduction directions of the diodes $D_U$, $D_V$, $D_X$, and $D_Y$, and the reverse directions (the directions in which the current does not flow when the switches are turned off) are non-conduction directions of the diodes $D_U$, $D_V$, $D_X$, and $D_U$. The conduction directions of the diodes ($D_U$ and $D_X$ or $D_V$ and $D_Y$) connected in parallel are the reverse directions each other between the AC terminal a and the AC terminal d, and conduction directions of the diodes ($D_U$ and $D_V$ or $D_X$ and $D_Y$) connected in series are the reverse directions each other between the AC terminal a and the AC terminal d. Between the AC terminal a and the AC terminal d, the conduction directions of the diodes $D_U$ and $D_Y$ are the forward directions each other, and the conduction directions of the diodes $D_V$ and $D_X$ are similarly the forward directions each other. Thus, between the AC terminal a and the AC terminal d, the conduction directions of the diodes $D_U$ and $D_Y$ and the diodes $D_V$ and $D_XX$ are the reverse directions each other.

As described above, the reverse conducting semiconductor switches U, V, X, and Y are arranged such that the forward directions are as follows. That is, if the reverse conducting semiconductor switch U and the reverse conducting semiconductor switch Y are paired as a first pair and the reverse conducting semiconductor switch V and the reverse conducting semiconductor switch X are paired as a second pair, the reverse conducting semiconductor switch U and the reverse conducting semiconductor switch Y which are paired as the first pair are arranged such that the forward directions are the same direction, and the reverse conducting semiconductor switch V and the reverse conducting semiconductor switch X which are paired as the second pair are arranged such that the forward directions are the same direction. The first pair and the second pair are arranged such that the forward directions are opposite to each other. Accordingly, the reverse conducting semiconductor switches (U and Y or V and X) arranged in a diagonal line in the bridge circuit are arranged such that the forward directions are the same direction.

(Operation of MERS 400)

In the MERS 400, if one reverse conducting semiconductor switch of two reverse conducting semiconductor switches provided in the diagonal line of the bridge circuit is turned on, the other reverse conducting semiconductor switch is also turned on. Similarly, if one reverse conducting semiconductor switch of two reverse conducting semiconductor switches provided in the diagonal line of the bridge circuit is turned off, the other reverse conducting semiconductor switch is also turned off. For example, if the reverse conducting semiconductor switch U is turned on, the reverse conducting semiconductor switch Y is also turned on, and if the reverse conducting semiconductor switch U is turned off, the reverse conducting semiconductor switch Y is also turned off. The same is true of the reverse conducting semiconductor switches V and X.

When two reverse conducting semiconductor switches provided in one diagonal line of two diagonal lines of the bridge circuit are turned on, two reverse conducting semiconductor switches provided in the other diagonal line are turned off. For example, when the reverse conducting semiconductor switches U and Y are turned on, the reverse conducting semiconductor switches V and X are turned off.

Figure 2:
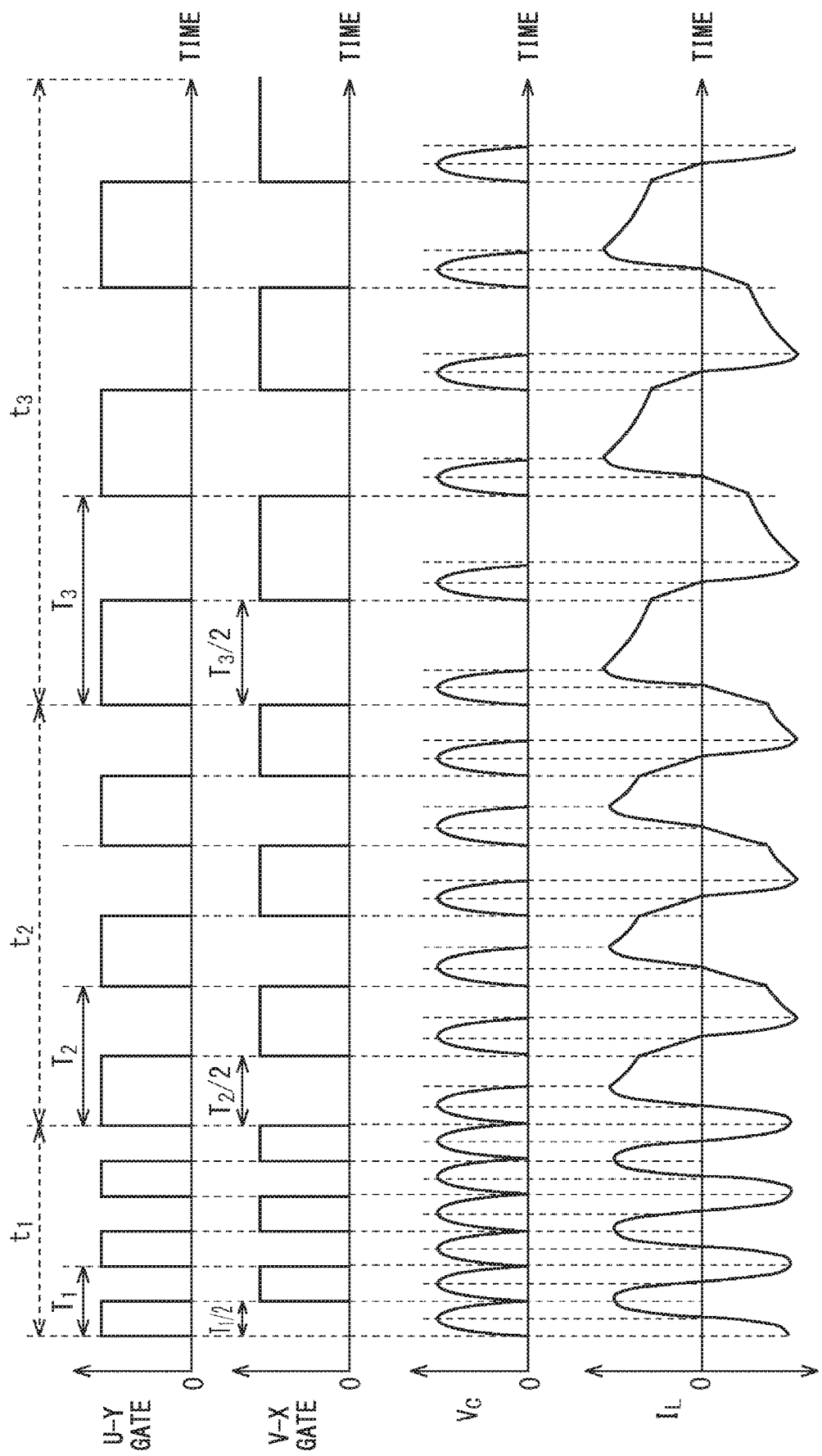
FIG. 2 is a diagram showing an example of a switching pattern according to the present embodiment and an electric current pattern of a portion corresponding to the switching pattern.

FIG. 2 is a diagram showing an example of a switching pattern and an electric current pattern (an electric current pattern of a portion corresponding to the switching pattern) according to the first embodiment. Specifically, FIG. 2 shows an example of the relationship between ON signals (gate signals) input to the gate terminals $G_U$, $G_V$, $G_X$, and $G_Y$, a voltage $V_C$ at both ends of the capacitor C, and an output current $I_L$ of the MERS 400, and a time. Here, the switching pattern according to the present embodiment is an ON and OFF pattern of the gate signals input to a "U-Y gate (gate terminals $G_U$ and $G_Y$)" and a "V-X gate (gate terminals $G_V$ and $G_X$)" shown in FIG. 2. The electric current pattern is a pattern of the "output current $I_L$ of the MERS 400" shown in FIG. 2, and is a pattern in a one-time energization heating time (one pulse electric current).

In FIG. 2, the U-Y gate represents the ON signals (gate signals) input to the gate terminals $G_U$ and $G_Y$. The V-X gate represents the ON signals (gate signals) input the gate terminals $G_V$ and $G_U$. The reverse conducting semiconductor switches U and Y (semiconductor switches $S_U$ and $S_Y$) are turned on for a period during which a waveform of the U-Y gate rises, and the reverse conducting semiconductor switches U and Y (semiconductor switches $S_U$ and $S_Y$) are turned off for a period during which the waveform of the U-Y gate falls. Similarly, the reverse conducting semiconductor switches V and X (semiconductor switches $S_V$ and $S_X$) are turned on for a period during which a waveform of the V-X gate rises, and the reverse conducting semiconductor switches V and X (semiconductor switches $S_V$ and $S_X$) are turned off for a period during which the waveform of the V-X gate falls.

In the following description, a case where the ON signals (gate signals) are input to the gate terminals $G_U$ and $G_Y$, and thus, the reverse conducting semiconductor switches U and Y are turned on is referred to "U-Y gate is turned on" when necessary. Meanwhile, a case where the ON signals (gate signals) are not input to the gate terminals $G_U$ and $G_Y$, and thus, the reverse conducting semiconductor switches U and Y are turned off is referred to "U-Y gate is turned off" when necessary.

A case where the ON signals (gate signals) are input to the gate terminals $G_V$ and $G_X$, and thus, the reverse conducting semiconductor switches V and X are turned on is referred to "V-X gate is turned on" when necessary. Meanwhile, a case where the ON signals (gate signals) are not input to the gate terminals $G_V$ and $G_X$, and thus, the reverse conducting semiconductor switches V and X are turned off is referred to "V-X gate is turned off" when necessary.

Hereinafter, the operation shown in FIG. 2 will be described.

<Operation Shown in FIG. 2>

The switching pattern in the example shown in FIG. 2 is a pattern in which two reverse conducting semiconductor switches (V and X or U and Y) provided in one diagonal line of the diagonal lines of the bridge circuit are turned on and off one time after two reverse conducting semiconductor switches (U and Y or V and X) provided in the other diagonal line are turned on and off one time.

Here, whenever the reverse conducting semiconductor switches U, V, X, and Y turned on and off three times, an ON time and an OFF time of the reverse conducting semiconductor switches U, V, X, and Y are changed. Specifically, cycles in which the reverse conducting semiconductor switches U, V, X, and Y are turned on and off one time are repeatedly changed in the order of $T_1$, $T_2$, $T_3$, $T_1$, $T_2$, ..., as shown in FIG. 2.

The ON time and OFF time of two reverse conducting semiconductor switches (U and Y or V and X) provided in one diagonal line and the ON time and the OFF time of two reverse conducting semiconductor switches (V and X or U and Y) provided in the other diagonal line are the same in the same cycles $T_1$, $T_2$, and $T_3$.

As shown in FIG. 2, the cycles ($T_1$, $T_2$, and $T_3$) in which the reverse conducting semiconductor switches U, V, X, and Y are turned on and off one time correspond to a cycle of the output current $I_L$ of the MERS 400. That is, frequencies in which the reverse conducting semiconductor switches U, V, X, and Y are turned on and off one time correspond to a frequency (electric current frequency) of the output current $I_L$ of the MERS 400. The same is true of examples of FIGS. 3 and 4.

In the present embodiment, a frequency which is equal to or less than a resonance frequency based on the inductance when a load side (the side of the resistance spot welder 800, the electric processing device) is viewed from the output end of the MERS 400 and the capacitance of the capacitor C is used as the electric current frequency. By doing this, soft switching may be performed as described in Patent Documents 3 and 7. Since it is not necessary to use a voltage source capacitor having a high capacitance, a capacitance of the capacitor C can be decreased. The same is true of the examples shown in FIGS. 3 and 4.

A frequency $f_1$ (=$1/T_1$) is set to be the resonance frequency, a frequency $f_2$ (=$1/T_2$) is set to be lower than the frequency $f_1$, and $f_3$ (=$1/T_3$) is set to be lower than the frequency $f_2$. That is, these frequencies are set to satisfy $f_1 > f_2 > f_3$. The same is true of examples of FIGS. 3 and 4.

Hereinafter, the operation of the MERS 400 in the example shown in FIG. 2 will be described with reference to FIGS. 1 and 2.

[Period $t_1$ of Frequency $f_1$ (=Resonance Frequency)]

(1a) U-Y Gate: ON, V-X Gate: OFF

If the V-X gate is turned off and the U-Y gate is turned on, the output current $I_L$ of the MERS 400 flows along the path in the order of the current transformer 700, the reverse conducting semiconductor switch U, the capacitor C, and the reverse conducting semiconductor switch Y, and the capacitor C is charged. Accordingly, the output current $I_L$ of the MERS 400 is decreased (approaches 0 (zero)), and the voltage $V_C$ at both ends of the capacitor C is increased. If the charging of the capacitor C is completed, the output current $I_L$ of the MERS 400 becomes 0 (zero), and the voltage $V_C$ at both ends of the capacitor C represents a maximum value.

After the charging of the capacitor C is completed, the discharging of the capacitor C is started, and the output current $I_L$ of the MERS 400 flows along the path in the order of the capacitor C, the reverse conducting semiconductor switch U, the current transformer 700, and the reverse conducting semiconductor switch Y. Accordingly, the output current $I_L$ of the MERS 400 is increased from 0 (zero) (becomes a positive value from 0 (zero)), and the voltage $V_C$ at both ends of the capacitor C is decreased. If the discharging of the capacitor C is completed, the output current $I_L$ of the MERS 400 represents a positive maximum value, and the voltage $V_C$ at both ends of the capacitor C becomes a minimum value (0 (zero)).

(2a) U-Y Gate: OFF, V-X Gate: ON

The frequency $f_1$ is the resonance frequency. Accordingly, the control unit 500 turns off the U-Y gate and turns on the V-X gate when the voltage $V_C$ at both ends of the capacitor C becomes 0 (zero), as stated above. Thus, the output current $I_L$ of the MERS 400 flows along the path in the order of the current transformer 700, the reverse conducting semiconductor switch V, the capacitor C, and the reverse conducting semiconductor switch X, and the capacitor C is charged. Accordingly, the output current $I_L$ of the MERS 400 is decreased (approaches 0 (zero)), and the voltage $V_C$ at both ends of the capacitor C is increased. If the charging of the capacitor C is completed, the output current $I_L$ of the MERS 400 becomes 0 (zero), and the voltage $V_C$ at both ends of the capacitor C represents a maximum value.

After the charging of the capacitor C is completed, the discharging of the capacitor C is started, the output current $I_L$ of the MERS 400 flows along the path in the order of the capacitor C, the reverse conducting semiconductor switch V, the current transformer 700, and the reverse conducting semiconductor switch X. Accordingly, the output current $I_L$ of the MERS 400 is increased from 0 (zero) (becomes a negative value from 0 (zero)), and the voltage $V_C$ at both ends of the capacitor C is decreased. If the discharging of the capacitor C is completed, the output current $I_L$ of the MERS

400 represents a negative maximum value, and the voltage $V_C$ at both ends of the capacitor C becomes a minimum value (0 (zero)).

The frequency $f_1$ is the resonance frequency. Accordingly, the control unit 500 turns on the U-Y gate and turns off the V-X gate when the voltage $V_C$ at both ends of the capacitor C becomes 0 (zero), as stated above. The operation in the cycle $T_1$ (one cycle) is ended by the operations of (1a) and (2a). Subsequently, if the operation of (1a) and the operation of (2a) are alternatively performed two times, the operation of the period $t_1$ is ended.

As mentioned above, since the voltage $V_C$ at both ends of the capacitor C becomes 0 (zero) in timings when the U-Y gate and the V-X gate are turned on and off, the soft switching is realized.

[Period $t_2$ of Frequency $f_2$ (<Resonance Frequency $f_1$)]

(1b) U-Y Gate: ON, V-X Gate: OFF

If the V-X gate is turned off and the U-Y gate is turned on, the output current $I_L$ of the MERS 400 flows along the path in the order of the current transformer 700, the reverse conducting semiconductor switch U, the capacitor C, and the reverse conducting semiconductor switch Y, and the capacitor C is charged. Accordingly, the output current $I_L$ of the MERS 400 is decreased (approaches 0 (zero)), and the voltage $V_C$ at both ends of the capacitor C is increased. If the charging of the capacitor C is completed, the output current $I_L$ of the MERS 400 becomes 0 (zero), and the voltage $V_C$ at both ends of the capacitor C represents a maximum value.

After the charging of the capacitor C is completed, the discharging of the capacitor C is started, and the output current $I_L$ of the MERS 400 flows along the path in the order of the capacitor C, the reverse conducting semiconductor switch U, the current transformer 700, and the reverse conducting semiconductor switch Y. Accordingly, the output current $I_L$ of the MERS 400 is increased from 0 (zero) (becomes a positive value from 0 (zero)), and the voltage $V_C$ at both ends of the capacitor C is decreased. If the discharging of the capacitor C is completed, the output current $I_L$ of the MERS 400 represents a maximum value, and the voltage $V_C$ at both ends of the capacitor C becomes a minimum value (0 (zero)).

Since the frequency $f_2$ is lower than the resonance frequency $f_1$ (the cycle $T_2$ is longer than the cycle $T_1$), even though the discharging of the capacitor C is completed, the control unit 500 does not turn off the U-Y gate. The U-Y gate is maintained in the ON state, and the V-X gate is maintained in the OFF state. Accordingly, the output current $I_L$ of the MERS 400 flows along the path in the order of the reverse conducting semiconductor switch Y, the diode $D_X$, and the current transformer 700 and the path in the order of the diode $D_V$, the reverse conducting semiconductor switch U, and the current transformer 700 in parallel, and is returned. The output current $I_L$ of the MERS 400 is decreased (approaches 0 (zero)) depending on a time constant determined from the resistance of the load and the inductance.

(2b) U-Y Gate: OFF, V-X Gate: ON

If a time (a time which is ½ of the cycle $T_2$) which is a reciprocal of twice as much as the frequency $f_2$ elapses, the control unit 500 turns off the U-Y gate, and turns on the V-X gate. In this case, since the voltage $V_C$ at both ends of the capacitor C is 0 (zero), the soft switching is realized.

If the U-Y gate is turned off and the V-X gate is turned on, the output current $I_L$ of the MERS 400 flows along the path in the order of the current transformer 700, the reverse conducting semiconductor switch V, the capacitor C, and the reverse conducting semiconductor switch X, and the capacitor C is charged. Accordingly, the output current $I_L$ of the MERS 400 is decreased (approaches 0 (zero)), and the voltage $V_C$ at both ends of the capacitor C is increased. If the charging of the capacitor C is completed, the output current $I_L$ of the MERS 400 becomes 0 (zero), and the voltage $V_C$ at both ends of the capacitor C represents a maximum value.

After the charging of the capacitor C is completed, the discharging of the capacitor C is started, the output current $I_L$ of the MERS 400 flows along the path in the order of the capacitor C, the reverse conducting semiconductor switch V, the current transformer 700, and the reverse conducting semiconductor switch X. Accordingly, the output current $I_L$ of the MERS 400 is increased from 0 (zero) (becomes a negative value from 0 (zero)), and the voltage $V_C$ at both ends of the capacitor C is decreased. If the discharging of the capacitor C is completed, the output current $I_L$ of the MERS 400 represents a negative maximum value, and the voltage $V_C$ at both ends of the capacitor C becomes a minimum value (0 (zero)).

Since the frequency $f_2$ is lower than the resonance frequency $f_1$, even though the discharging of the capacitor C is completed, the control unit 500 does not turn off the V-X gate. The V-X gate is maintained in the ON state, and the U-Y gate is maintained in the OFF state. Accordingly, the output current $I_L$ of the MERS 400 flows along the path in the order of the reverse conducting semiconductor switch V, the current transformer 700, and the diode $D_U$ and the path in the order of the reverse conducting semiconductor switch X, the diode $D_Y$, and the current transformer 700 in parallel, and is returned. The output current $I_L$ of the MERS 400 is decreased (approaches 0 (zero)) depending on a time constant determined from the resistance of the load and the inductance.

If a time (a time which is ½ of the cycle $T_2$) which is a reciprocal of twice as much as the frequency $f_2$ elapses, the control unit 500 turns off the V-X gate, and turns on the U-Y gate. In this case, since the voltage $V_C$ at both ends of the capacitor C is 0 (zero), the soft switching is realized.

The operation of the cycle $T_2$ (one cycle) is ended by the operations of (1b) and (2b). Subsequently, if the operation of (1b) and the operation of (2b) are alternatively performed two times, the operation of the period $t_2$ is ended.

[Period $t_3$ of Frequency $f_3$ (<Frequency $f_2$<Resonance Frequency $f_1$)]

In the period $t_3$, a time when the output current $I_L$ of the MERS 400 is returns becomes longer than the period $t_2$.

(1c) U-Y Gate: ON, V-X Gate: OFF

If the V-X gate is turned off and the U-Y gate is turned on, the output current $I_L$ of the MERS 400 flows along the path in the order of the current transformer 700, the reverse conducting semiconductor switch U, the capacitor C, and the reverse conducting semiconductor switch Y, and the capacitor C is charged. Accordingly, the output current $I_L$ of the MERS 400 is decreased (approaches 0 (zero)), and the voltage $V_C$ at both ends of the capacitor C is increased. If the charging of the capacitor C is completed, the output current $I_L$ of the MERS 400 becomes 0 (zero), and the voltage $V_C$ at both ends of the capacitor C represents a maximum value.

After the charging of the capacitor C is completed, the discharging of the capacitor C is started, and the output current $I_L$ of the MERS 400 flows along the path in the order of the capacitor C, the reverse conducting semiconductor switch U, the current transformer 700, and the reverse conducting semiconductor switch Y. Accordingly, the output current $I_L$ of the MERS 400 is increased from 0 (zero) (becomes a positive value from 0 (zero)), and the voltage $V_C$ at both ends of the capacitor C is decreased. If the discharging of the capacitor C is completed, the output current $I_L$ of the MERS 400 represents a maximum value, and the voltage $V_C$ at both ends of the capacitor C becomes a minimum value (0 (zero)).

Since the frequency $f_3$ is lower than the resonance frequency $f_1$ (the cycle $T_3$ is longer than the cycle $T_1$), even though the discharging of the capacitor C is completed, the control unit 500 does not turn off the U-Y gate. The U-Y gate is maintained in the On state, and the V-X gate is maintained in the OFF state. Accordingly, the output current $I_L$ of the MERS 400 flows along the path in the order of the reverse conducting semiconductor switch Y, the diode $D_X$, and the current transformer 700 and the path in the order of the diode $D_V$, the reverse conducting semiconductor switch U, and the current transformer 700 in parallel, and is returned. The output current $I_L$ of the MERS 400 is decreased (approaches 0 (zero)) depending on a time constant determined from the inductance and the resistance of the load.

(2c) U-Y Gate: OFF, V-X Gate: ON

If a time (a time which is ½ of the cycle $T_3$) which is a reciprocal of twice as much as the frequency $f_3$ elapses, the control unit 500 turns off the U-Y gate, and turns on the V-X gate. In this case, since the voltage $V_C$ at both ends of the capacitor C is 0 (zero), the soft switching is realized.

If the U-Y gate is turned off and the V-X gate is turned on, the output current $I_L$ of the MERS 400 flows along the path in the order of the current transformer 700, the reverse conducting semiconductor switch V, the capacitor C, and the reverse conducting semiconductor switch X, and the capacitor C is charged. Accordingly, the output current $I_L$ of the MERS 400 is decreased (approaches 0 (zero)), and the voltage $V_C$ at both ends of the capacitor C is increased. If the charging of the capacitor C is completed, the output current $I_L$ of the MERS 400 becomes 0 (zero), and the voltage $V_C$ at both ends of the capacitor C represents a maximum value.

After the charging of the capacitor C is completed, the discharging of the capacitor C is started, the output current $I_L$ of the MERS 400 flows along the path in the order of the capacitor C, the reverse conducting semiconductor switch V, the current transformer 700, and the reverse conducting semiconductor switch X. Accordingly, the output current $I_L$ of the MERS 400 is increased from 0 (zero) (becomes a negative value from 0 (zero)), and the voltage $V_C$ at both ends of the capacitor C is decreased. If the discharging of the capacitor C is completed, the output current $I_L$ of the MERS 400 represents a negative maximum value, and the voltage $V_C$ at both ends of the capacitor C becomes a minimum value (0 (zero)).

Since the frequency $f_3$ is lower than the resonance frequency $f_1$, even though the discharging of the capacitor C is completed, the control unit 500 does not turn off the V-X gate. The V-X gate is maintained in the ON state, and the U-Y gate is maintained in the OFF state. Accordingly, the output current $I_L$ of the MERS 400 flows along the path in the order of the reverse conducting semiconductor switch V, the current transformer 700, and the diode $D_U$ and the path in the order of the reverse conducting semiconductor switch X, the diode $D_Y$, and the current transformer 700 in parallel, and is returned. The output current $I_L$ of the MERS 400 is decreased (approaches 0 (zero)) depending on a time constant determined from the resistance of the load and the inductance.

If a time (a time which is ½ of the cycle $T_3$) which is a reciprocal of twice as much as the frequency $f_3$ elapses, the control unit 500 turns off the V-X gate, and turns on the U-Y gate. In this case, since the voltage $V_C$ at both ends of the capacitor C is 0 (zero), the soft switching is realized.

The operation of the cycle $T_3$ (one cycle) is ended by the operations of (1c) and (2c). Subsequently, if the operation of (1c) and the operation of (2c) are alternatively performed two times, the operation of the period $t_3$ is ended.

When the resistance spot welding is performed one time, the operations of the periods $t_1$, $t_2$, and $t_3$ are performed at least one time. In a case where the operations of the periods $t_1$, $t_2$, and $t_3$ are performed two times or more, the operations of the periods $t_1$, $t_2$, and $t_3$ are repeatedly performed in this order.

As stated above, in FIG. 2, the gate signals of the U-Y gate and the V-X gate are turned on and off in half time of the cycle which is equal to or greater than a resonance cycle $T_1$ ($=1/f_1$) within a one-time and short-time energization heating time (so-called one pulse electric current). In this case, the gate terminals are controlled such that the gate terminals $G_V$ and $G_X$ (V-X gate) are turned off when the gate terminals $G_U$ and $G_Y$ (U-Y gate) are turned on and the gate terminals $G_V$ and $G_X$ (V-X gate) are turned on when the gate terminals $G_U$ and $G_Y$ (U-Y gate) are turned off. By doing this, the electric current can be applied through the soft switching in the frequency which is equal to or less than the resonance frequency $f_1$. The cycle of the gate signal is changed within the one-time and short-time energization heating time (within one pulse electric current), and thus, if the electric current frequencies ($1/T_1$, $1/T_2$, and $1/T_3$) of a pulse train are frequencies equal to or less than (or less than) the resonance frequency $f_1$, the electric current frequencies can be changed within the one-time and short-time energization heating time (one pulse electric current). In FIG. 2, an example in which the electric current pattern for lowering the electric current frequencies as time proceeds is formed will be described. However, the ON and OFF times (cycles of the gate signals) of the gate signals of the reverse conducting semiconductor switches U, V, X, and Y are controlled according to the electric current pattern, and thus, the electric current pattern for raising the electric current frequencies as time proceeds within the one-time and short-time energization heating time can be realized. The electric current pattern acquired by combining the electric current patterns for raising and lowering the electric current frequencies also can be realized within the one-time and short-time energization heating time.

As described above, the control unit 500 can control the MERS 400 such that the electric current frequency of the output current includes a first electric current frequency and a second electric current frequency which are different from each other within the one-time energization heating time (within electric processing time) by means of the resistance spot welder 800 (electric processing device). The control unit 500 can control the MERS 400 such that an effective value of the output current includes a first effective value and a second effective value which are different from each other within the one-time energization heating time (within the electric processing time) by means of the resistance spot welder 800 (electric processing device) in addition to the controlling of the electric current frequency.

Figure 3:
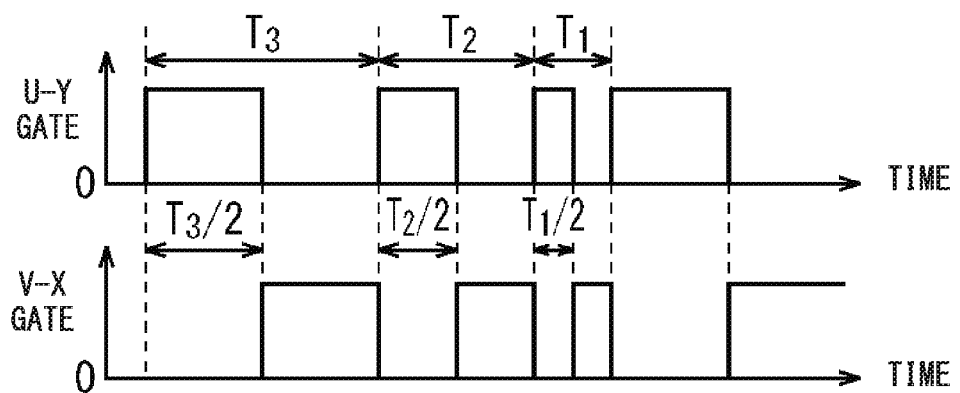
FIG. 3 is a diagram showing a modification example of the switching pattern according to the present embodiment.
Figure 4:
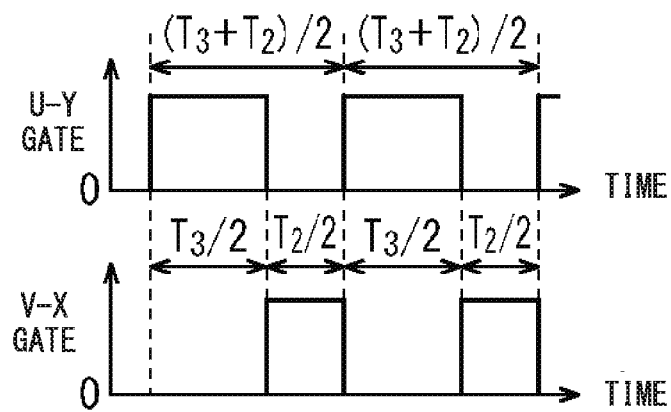
FIG. 4 is a diagram showing another modification example of the switching pattern according to the present embodiment.

<Operations Shown in FIGS. 3 and 4>

FIGS. 3 and 4 are diagrams showing other examples of the switching pattern according to the first embodiment. Specifically, FIG. 3 shows the relationship between ON signals (gate signals) input to the gate terminals $G_U$, $G_V$, $G_X$, and $G_Y$, and a time.

The switching pattern in the example shown in FIG. 3 is a pattern in which the ON and OFF operations of the reverse conducting semiconductor switches U and Y and the ON and OFF operations of the reverse conducting semiconductor switches V and X are alternately performed one time and are repeatedly and continuously performed in the order of the cycle $T_3$, the cycle $T_2$, and the cycle $T_1$ shown in FIG. 2.

As described in FIG. 3, when the reverse conducting semiconductor switches U, V, X, and Y are turned on and off one time, the ON time and the OFF time of the reverse conducting semiconductor switches U, V, X, and Y may be changed.

For example, the operation of the MERS 400 in the switching pattern shown in FIG. 3 can be realized by omitting the repetition of (1a) and (2a), the repetition of (1b) and (2b), the repetition of (1c) and (2c) in <Operation shown in FIG. 2> and performing (1c), (2c), (1b), (2b), (1a), and (2a) in this operation order. Thus, in this example, the detailed description thereof will be omitted.

As another modification example of FIG. 3, the ON time (the OFF time of the reverse conducting semiconductor switches U and Y) of the reverse conducting semiconductor switches V and X and the ON time (the OFF time of the reverse conducting semiconductor switches V and X) of the reverse conducting semiconductor switches U and Y in the same cycles $T_3$, $T_2$, and $T_1$ may be set to be different from each other. In this case, any one of the ON time (the OFF time of the reverse conducting semiconductor switches U and Y) of the reverse conducting semiconductor switches V and X and the ON time (the OFF time of the reverse conducting semiconductor switches V and X) of the reverse conducting semiconductor switches U and Y may be set to be constant. Here, in order to realize the above-described soft switching, the ON time of the reverse conducting semiconductor switches U, V, X, and Y is preferably set to be a time (=$T_1/2$) which is equal to or greater than a time which is a reciprocal of twice as much as the resonance frequency $f_1$.

A case where any one of the ON time (the OFF time of the reverse conducting semiconductor switches U and Y) of the reverse conducting semiconductor switches V and X and the ON time (the OFF time of the reverse conducting semiconductor switches V and X) of the reverse conducting semiconductor switches U and Y may be set to be constant is also applied to the example of FIG. 2. The operation in which the ON time (the OFF time of the reverse conducting semiconductor switches U and Y) of the reverse conducting semiconductor switches V and X and the ON time (the OFF time of the reverse conducting semiconductor switches V and X) of the reverse conducting semiconductor switches U and Y in the same cycles are set to be different from each other can be realized, for example, by performing the operation of (2a) and the operation of (1c) in <Operation shown in FIG. 2>, and thus, the detailed description thereof will be omitted.

Like the switching pattern in the example shown in FIG. 4, when the ON and OFF of the reverse conducting semiconductor switches U and Y and the ON and OFF of the reverse conducting semiconductor switches V and X are alternately performed one time, the ON time (the OFF time) of two reverse conducting semiconductor switches (U and Y or V and X) provided in one diagonal line and the ON time (the OFF time) of two reverse conducting semiconductor switches (V and X or U and Y) provided in the other diagonal line may be set to be different from each other.

The operation of the MERS 400 in the switching pattern shown in FIG. 4 is realized by repeating the operations of (1c) and (2b) in <Operation shown in FIG. 2>, and thus, the detailed description thereof will be omitted.

As another modification example of the example shown in FIG. 4, for example, the ON time (the OFF time) of two reverse conducting semiconductor switches (U and Y or V and X) provided in one diagonal line and the ON time (the OFF time) of two reverse conducting semiconductor switches (V and X or U and Y) provided in the other diagonal line may be set to be different in FIGS. 2 and 3.

The switching pattern is not limited to only the examples shown in FIGS. 2 to 4.

For example, in the example shown in FIG. 2, after the reverse conducting semiconductor switches U, V, X, and Y turned on and off three times, the ON time and the OFF time of the reverse conducting semiconductor switches U, V, X, and Y are changed, and then the reverse conducting semiconductor switches U, V, X, and Y are turned on and off three times. Thereafter, the reverse conducting semiconductor switches U, V, X, and Y are turned on and off three times, and the ON time and the OFF time of the reverse conducting semiconductor switches U, V, X, and Y are changed.

However, in each cycle, the number of times (three times) the reverse conducting semiconductor switches U, V, X, and Y are turned on and off may be an arbitrary number of times which is two times or more. In each cycle, the switching pattern in which the number of times (three times) the reverse conducting semiconductor switches U, V, X, and Y are turned on and off is one time is the example shown in FIG. 3.

That is, the operation in which two reverse conducting semiconductor switches (U and Y or V and X) provided in one diagonal line are turned on and off one time and the operation in which two reverse conducting semiconductor switches (V and X or U and Y) provided in the other diagonal line are turned on and off one time may be alternately repeated. By doing this, as long as at least one of a case where at least one of the ON time and the OFF time of at least one of two reverse conducting semiconductor switches (U and Y or V and X) provided in the diagonal line is changed and a case where the ON times in one cycle (a time which is a reciprocal of the electric current frequency) of two reverse conducting semiconductor switches (U and Y or V and X) provided in one diagonal line and two reverse conducting semiconductor switches (V and X or U and Y) provided in the other diagonal line are set to be different can be performed for a period during which the resistance spot welding is performed one time, any switching pattern may be used.

As for the former case, in the example shown in FIG. 2, the ON time and the OFF time of two reverse conducting semiconductor switches (U and Y or V and X) provided in the diagonal line are changed in the order of the cycle $T_1$, the cycle $T_2$, and the cycle $T_3$. As for the latter case, in the example shown in FIG. 4, the ON time of two reverse conducting semiconductor switches U and Y provided in one diagonal line in one cycle (a time of $(T_3+T_2)/2$) is set to be $T_3/2$, whereas the ON time of two reverse conducting semiconductor switches V and X provided in the other diagonal line in one cycle (a time of $(T_3+T_2)/2$) is set to be $T_2/2$.

Even in the electric current pattern in which electric current application stoppage is included in one-time electric current application, the electric current frequency may be switched. A power output (for example, an effective value of a voltage or a current output from the AC power supply 100) input to the MERS 400 is switched, and thus, a current value to be output from the MERS 400 may be easily switched independently from the electric current frequency within one-time electric current application.

In the present embodiment, the operation in which two reverse conducting semiconductor switches (U and Y or V and X) provided in one diagonal line are turned on and off one time and the operation in which two reverse conducting semiconductor switches (V and X or U and Y) provided in the other diagonal line are turned on and off are alternately repeated. However, an operation in which two reverse conducting semiconductor switches (U and Y or V and X) provided in one diagonal line are turned on and off multiple times and an operation in which two reverse conducting semiconductor switches (V and X or U and Y) provided in the other diagonal line are turned on and off multiple times may be alternately repeated.

The number of times two reverse conducting semiconductor switches (U and Y or V and X) provided in one diagonal line are consecutively turned on and off and the number of times two reverse conducting semiconductor switches (V and X or U and Y) provided in the other diagonal line are consecutively turned on and off may be set to be different from each other. Here, even in such a case, the electric current frequency may be changed within the one-time and short-time energization heating time (within one pulse electric current).

<Setting of Electric Current Pattern>

An appropriate electric current pattern depending on a welding condition determined by one or a plurality of predetermined factors which influences on the quality of a welded joint formed by performing the resistance spot welding is specified, for example, by performing a simulation, and the specified electric current pattern is stored in the control unit 500. By doing this, the simulation for specifying the electric current pattern is performed on each of the plurality of welding conditions, and the electric current pattern for one of the plurality of welding conditions is stored in the control unit 500. For example, as the factor, there are a material of the metal sheet, and a size, a material, a thickness, and a temperature change of a welding portion.

Figure 5:
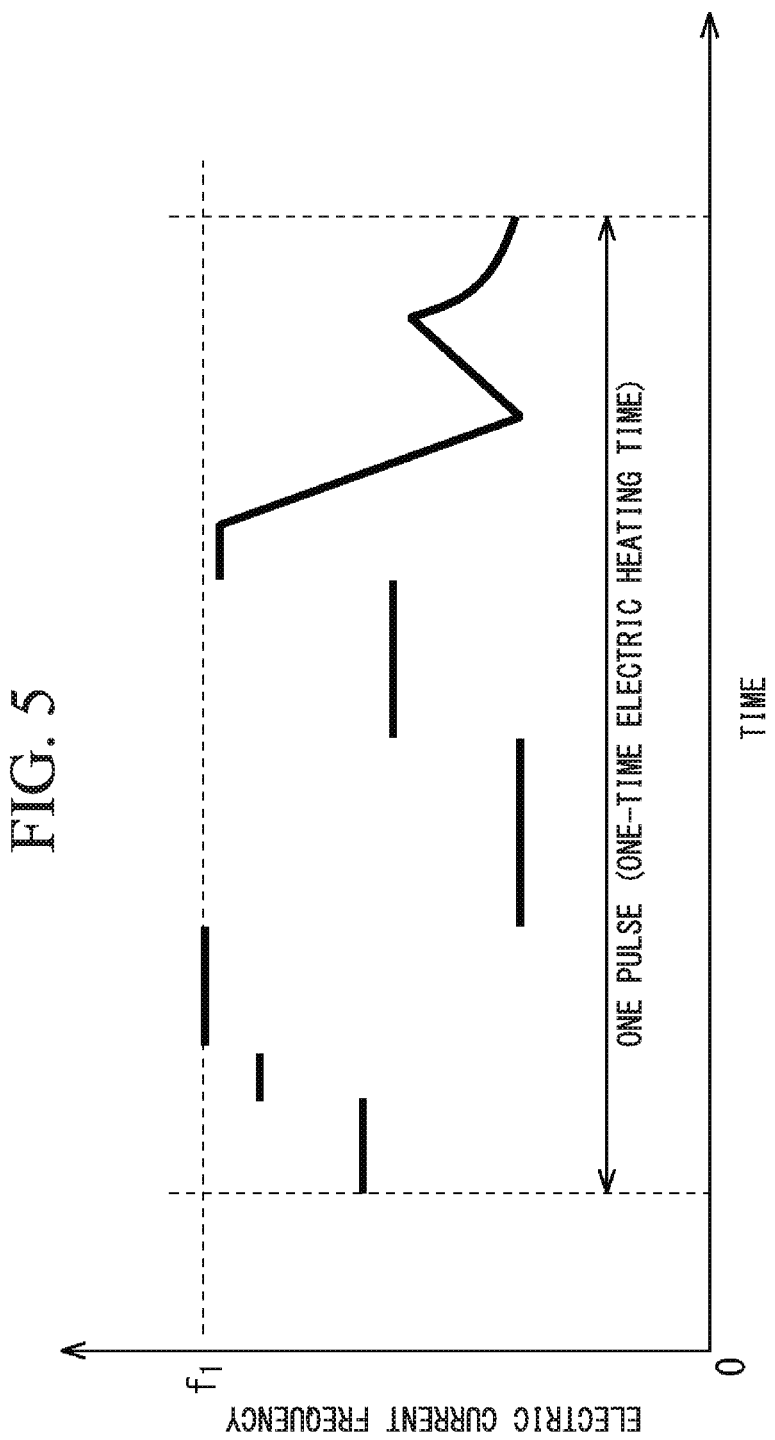
FIG. 5 is a diagram showing an example of the electric current pattern according to the present embodiment.

FIG. 5 is a diagram showing an example of the electric current pattern according to the first embodiment.

FIG. 5 shows an example of the electric current pattern in a case where the electric current frequency is changed within the one-time and short-time energization heating time (within one pulse electric current application). In the electric current pattern shown in FIG. 5, as long as the frequency is equal to or less than the resonance frequency $f_1$, the electric current frequency may be arbitrarily set. Accordingly, as long as the circuit configuration in which the resonance frequency corresponding to a required maximum electric current frequency is used, the electric current can be applied in an arbitrary electric current frequency.

When the resistance spot welding is performed, if the welding condition is input, the control unit 500 selects the electric current pattern corresponding to the welding condition from the plurality of electric current patterns, and reads the selected electric current pattern. The control unit 500 determines the switching pattern based on the read electric current pattern while the energization heating (resistance spot welding) is performed one time, and outputs the ON signals (gate signals) to the reverse conducting semiconductor switches U, V, X, and Y according to the determined switching pattern. The control unit 500 controls the reverse conducting semiconductor switches U, V, X, and Y according to such a switching pattern until the electric current pattern (one-time energization heating time (one pulse electric current application)) for performing the resistance spot welding is ended.

As described above, in the present embodiment, the ON and OFF operations of the reverse conducting semiconductor switches U, V, X, and Y are controlled according to the electric current pattern, and thus, the frequency (electric current frequency) of the output current $I_L$ of the MERS 400 is controlled within the one-time and short-time energization heating time (one pulse electric current application). The output current $I_L$ output from the MERS 400 controlled in this manner is output to the welding electrodes E1 and E2 through the current transformer 700.

In the present embodiment, it is possible to perform the application of the electric current in which an electric current frequency and an electric current are independently controlled within the one-time and short-time energization heating time (within one pulse electric current application) by controlling only a power control signal for a single power supply. For example, accordingly, it is possible to control material properties after the application of the electric current which include an electric current region within a short time according to the materials or shapes of the metal sheets M1 and M2. Accordingly, it is possible to control a current distribution and a heat distribution of the welding portion, and thus, it is possible to improve joint strength. As long as the power supply device of the present embodiment is used in the resistance spot welding, it is possible to control characteristics, a shape, or a hardness distribution of welding metal, and thus, it is possible to improve the joint strength.

In the present embodiment, an example in which the power supply device capable of supplying the high current within a short time is applied to the resistance spot welder (the energization heating device is the resistance spot welder 800) was described. However, the power supply device that heats a conductor material without melting the conductor material through the energization heating to join the conductor material within the one-time and short-time energization heating time may be realized by a power supply device having the completely same configuration as that in the present embodiment. For example, instead of the joining of the plurality of conductor materials, a power supply device that heats one or more conductor materials may also be realized by a power supply device having the same configuration as that in the present embodiment, as in the energization heating device of the steel material.

The process of the control unit 500 according to the first embodiment of the present invention described above may be realized by causing a computer to execute a program. A computer-readable recording medium that records the program and a computer program product such as the program may also be applied as the embodiment of the present invention. For example, a removable disk, a hard disk, an optical disk, a magneto-optical disk, a CD-ROM, a magnetic tape, a non-volatile memory card, or a ROM may be used as the recording medium.

[Second Embodiment]

Hereinafter, a second embodiment of the present invention will be described. In a case where sputters occur in the resistance spot welding, since impedance between an upper welding electrode, the metal sheet (work), and a lower welding electrode is changed, if a change of the impedance can be directly detected, it is possible to more reliably suppress the occurrence of the sputters. The change of the impedance appears a change of a welding current (a current flowing in the upper welding electrode, the metal sheet (work), and the lower welding electrode).

When the sputters occur, since a distribution of the welding current in the upper welding electrode and the lower welding electrode is greatly changed, the distribution of the welding current is detected, and thus, it is possible to suppress the occurrence of the sputters.

As described above, from the idea found from the present inventors, in the second embodiment of the present invention to be described below, magnetic flux generated by the welding current flows is detected in a plurality of regions on sides of at least one of the upper welding electrode and the lower welding electrode, and the welding current is controlled according to the detected magnetic flux.

Figure 6:
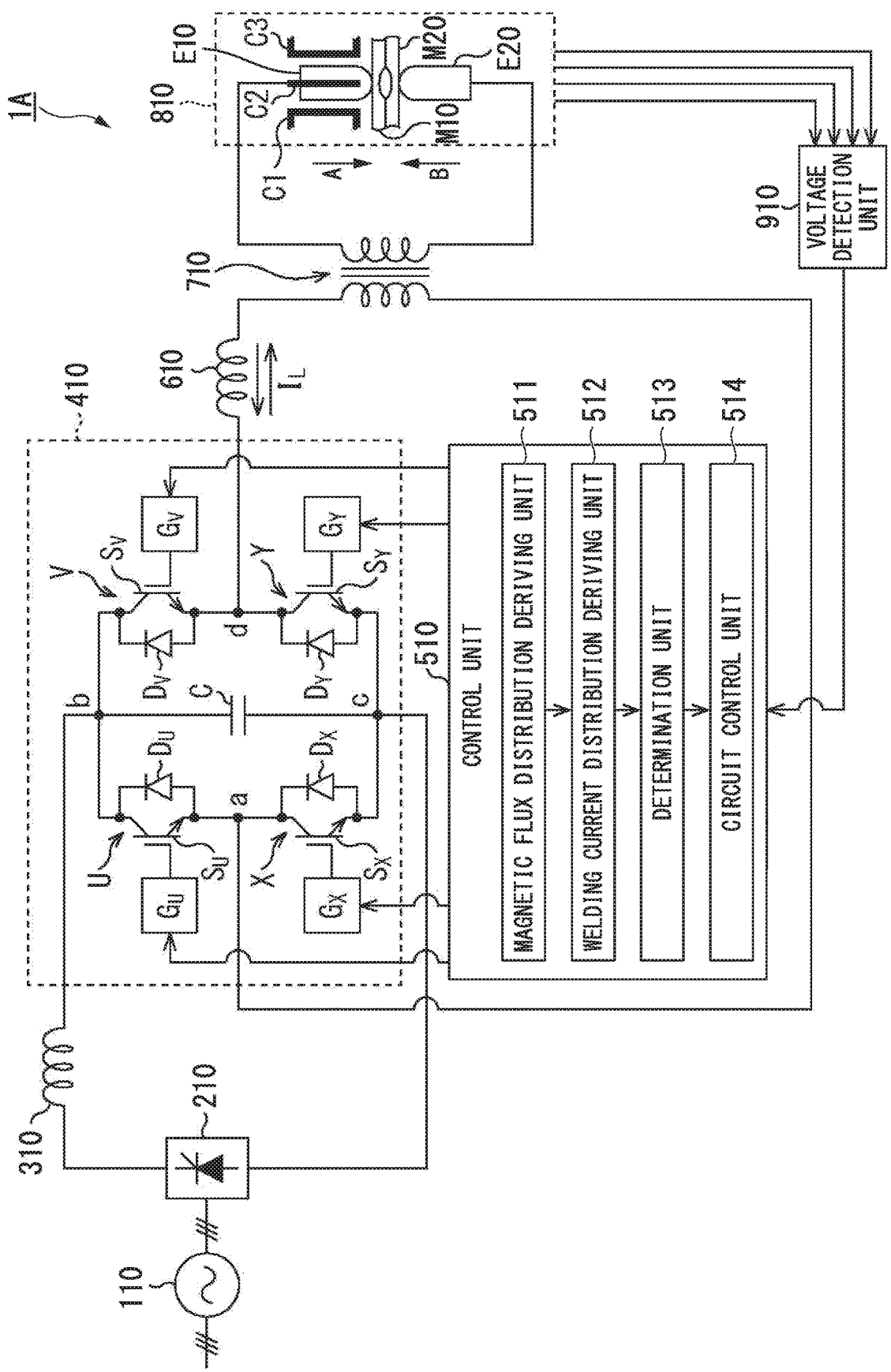
FIG. 6 is a diagram showing an example of a resistance spot welding system according to a second embodiment of the present invention.

FIG. 6 is a diagram showing an example of a configuration of a resistance spot welding system 1A according to the second embodiment.

The resistance spot welding system 1A includes an AC power supply 110, a rectifier 210, a DC reactor 310, an MFRS 410, a control unit 510, an AC inductance 610, a current transformer 710, a resistance spot welder 810, a voltage detection unit 910, and coils C1 to C4.

Figure 7A:
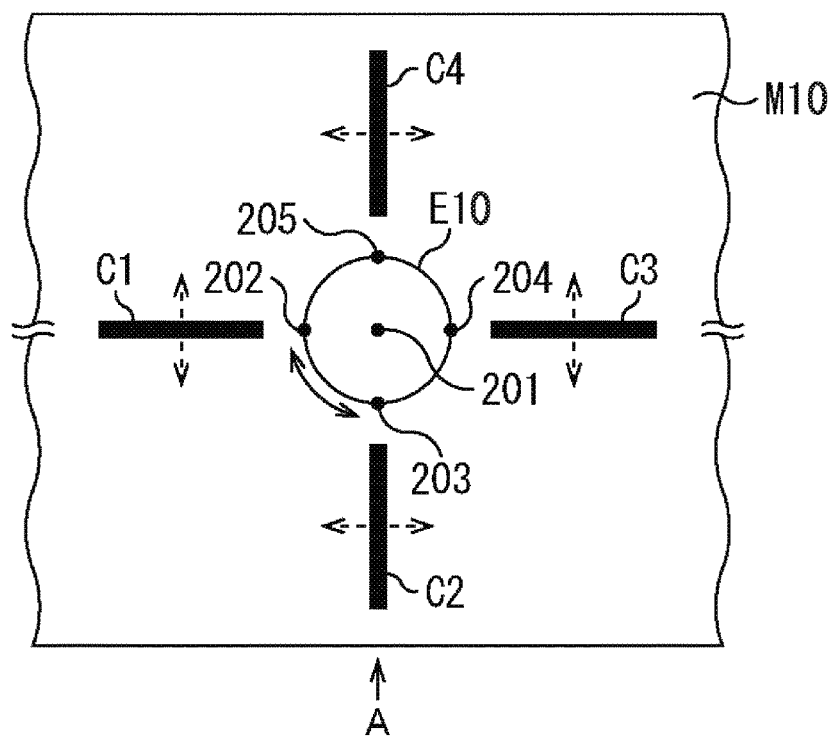
FIG. 7A is a plan view showing an example of coil arrangement according to the present embodiment.
Figure 7B:
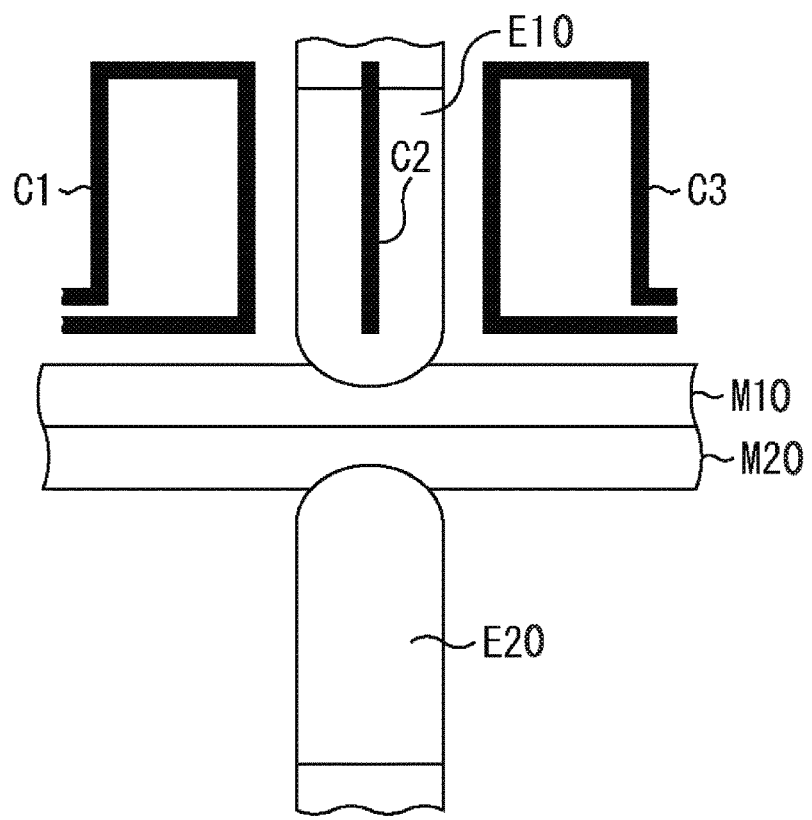
FIG. 7B is a side view viewed from arrow A of FIG. 7A in order to show the coil arrangement according to the present embodiment.

In FIGS. 7A and 7B, the coil C4 is not visible to be hidden by the upper welding electrode E10. For the sake of convenience in notation, partial regions of the coils C1 and C3 are not shown, and lead portions of the coils C1 to C3 are not shown.

In FIG. 6, a connection relationship on an input side of the MERS 410 is as follows.

An input end of the rectifier 210 and the AC power supply 110 are connected to each other. One of output ends of the rectifier 210 and one end of the DC reactor 310 are connected to each other. The other one of the output ends of the rectifier 210 and a DC terminal c of the MERS 410 are connected to each other. The other end of the DC reactor 310 and a DC terminal b of the MERS 410 are connected to each other.

A connection relationship on an output side of the MFRS 410 is as follows.

An AC terminal d of the MERS 410 and one end of the AC inductance 610 are connected to each other. The other end of the AC inductance 610 and one of input ends of the current transformer 710 are connected to each other. An AC terminal a of the MERS 410 and the other one of the input ends of the current transformer 710 are connected to each other. One of output ends of the current transformer 710 and the upper welding electrode E10 are connected to each other, and the other one thereof and the lower welding electrode E20 are connected to each other.

The AC power supply 110 outputs an AC power. The AC power supply 110 may be a single-phase AC power supply, or may be a three-phase AC power supply.

The rectifier 210 rectifies the AC power output from the AC power supply 110, and converts the rectified AC power into a DC power. In a case where the AC power supply 110 is the single-phase AC power supply, the rectifier 210 includes a single-phase rectifier circuit. Meanwhile, in a case where the AC power supply 110 is the three-phase AC power supply, the rectifier 210 includes a three-phase rectifier circuit.

The DC reactor 310 smooths the DC power passed through the rectifier 210.

The MERS 410 is an example of a magnetic energy recovery bidirectional current switch, and outputs the DC power input from the rectifier 210 via the DC reactor 310, as an AC power, by an operation to be described below.

An operation of the MERS 410 will be described in detail.

The current transformer 710 converts the alternating current output from the MERS 410 via the AC inductance 610 into a high current according to a turns ratio (of the current transformer 710), and outputs the transformed high current to the upper welding electrode E10 and the lower welding electrode E20 of the resistance spot welder 810. In a case where the high current is not required, the current transformer 710 may not be provided.

The resistance spot welder 810 applies the current while pressurizing the upper welding electrode E10 which is an example of an upper welding electrode and the lower welding electrode E20 which is an example of a lower welding electrode so as to clamp the metal sheets M10 and M20 from a front surface and a rear surface of a layered portion of a plurality of the metal sheets M1 and M2 of which sheet surfaces are layered each other, that is, in an A direction and a B direction of FIG. 6. The resistance spot welder joins these metal sheets M10 and M20 by Joule's heat generated in the metal sheets M10 and M20 through the application of the electric current. A known welding device may be used as the resistance spot welder 810. Various capable of being applied to the resistance spot welding may be employed as the material, sheet thickness, and number of the metal sheets M10 and M20 as targets of the resistance spot welding.

Coils C1 to C4 detect magnetic flux (magnetic field) generated by the welding current flowing in the upper welding electrode E10, the metal sheet M10, the metal sheet M20, and the lower welding electrode E20. In the following description, the welding current flowing in the upper welding electrode E10, the metal sheet M10, the metal sheet M20, and the lower welding electrode E20 is simply referred to as a welding current necessary. It is assumed that a magnitude of the welding current is an effective value. Here, the magnitude of the welding current may be defined as, for example, a crest value.

FIGS. 7A and 7B are diagrams showing an example of the arrangement of the coils C1 to C4 according to the second embodiment.

Specifically, FIG. 7A is a diagram when the metal sheet M10, the upper welding electrode E10, and the coils C1 to C4 are viewed from a side on which the upper welding electrode E10 is disposed in a normal direction of the metal sheet M10. FIG. 7B is a diagram when the metal sheet M10, the metal sheet M20, the upper welding electrode E10, the lower welding electrode E20, and the coils C1 to C4 are viewed along arrow line A of FIG. 7A. In FIG. 7B, the coil C4 is not visible to be hidden by the upper welding electrode E10.

The coils C1 to C4 are arranged in first to fourth positions 202 to 205 (positions acquired by equally dividing a side circumferential surface of the upper welding electrode E10 into four along the axis 201) in circumferential directions (directions of solid double-headed arrow lines shown in FIG. 7A) of the side circumferential surface of the upper welding electrode E10 in a state in which the magnetic flux generated by the welding current penetrates. That is, the coils C1 to C4 are arranged in positions different from each other around a central axis which shares a common axis with the welding electrode E10 and the welding electrode E20 with respect to the welding electrode E10.

Specifically, all the coils C1 to C4 are the same in the example shown in FIGS. 7A and 7B. As shown in FIG. 7A, the coils C1 to C4 are arranged in positions so as to have a 4-fold symmetric relationship with an axis 201 of the upper welding electrode E10 as its axis. The coils C1 to C4 are arranged in positions in which directions (directions of dashed double-headed arrow lines) of axes (axes passing through centers of coil surfaces of the coils C1 to C4) of the coils C1 to C4 match tangent directions of a circle with the axis 201 of the upper welding electrode E10 as its center. Here, the coils C1 to C4 are preferably arranged in positions as close as possible to the upper welding electrode E10 and the metal sheet M10 within a range in which these coils do not interfere in the resistance spot welding.

As shown in FIG. 7B, as long as the coils C1 to C4 are arranged such that the relatively lower regions thereof are positioned on a side of the upper welding electrode E10 which are pressurizing and applying the current, all the regions of the coils C1 to C4 are not necessarily positioned on the side of the upper welding electrode E10 which are pressurizing and applying the current. That is, the coils C1 to C4 may be arranged such that at least partial regions thereof are positioned on the side of the upper welding electrode E10 which are pressurizing and applying the current.

In FIG. 7B, an example in which a winding start portion and a winding end portion of the coils C1 and C3 are extracted is shown. However, similarly the coils C1 and C3, a winding start portion and a winding end portion of the coils C2 and C4 are extracted is also shown. In FIGS. 7A and 7B, an example in which the number of turns of each of the coils C1 to C4 is "1" is shown. However, the number of turns of each of the coils C1 to C4 may be "2" or more. As mentioned above, since the coils C1 to C4 are the same in this example, the number of turns is the same between the coils C1 to C4.

Referring back to FIG. 6, the magnetic flux (magnetic field) generated by the welding current penetrates through each of the coils C1 to C4, and thus, the voltage detection unit 910 detects induced electromotive force generated by each of the coils C1 to C4 for each of the coils C1 to C4. Although the detailed illustration is omitted in FIG. 6 for the sake of convenience in notation, the voltage detection unit 910 is electrically connected to the winding start portion and the winding end portion of the coils C1 to C4 each other.

The control unit 510 inputs the induced electromotive forces of the coils C1 to C4 detected by the voltage detection unit 910, and controls the operation of the MERS 410. For example, hardware of the control unit 510 is realized by using information processing device including a CPU, a ROM, a RAM, an HDD, and various interfaces, or dedicated hardware.

As the functions, the control unit 510 includes a magnetic flux distribution deriving unit 511, a welding current distribution deriving unit 512, a determination unit 513, and a circuit control unit 514. Hereinafter, examples of functions of the respective units will be described.

The magnetic flux distribution deriving unit 511 derives magnetic fluxes φ of the coils C1 to C4 from the induced electromotive forces of the coils C1 to C4 detected by the voltage detection unit 910 and the number of turns of each of the coils C1 to C4.

For example, the welding current distribution deriving unit 512 derives the welding currents (the welding currents based on the magnetic fluxes φ of the coils C1 to C4) of the regions corresponding to the coils C1 to C4 of the upper welding electrode E10 from the magnetic fluxes φ of the coils C1 to C4 by a method to be described below.

That is, the welding current distribution deriving unit 512 derives magnetic flux densities B from the magnetic fluxes φ of the coils C1 to C4, derives a magnetic field H from the magnetic flux densities B and permeability $\mu_{air}$ of air, and derives the welding currents corresponding to the coils C1 to C4 of the upper welding electrode E10 by Ampere's law from the magnetic field H. In the following description, the welding currents of the regions of the coils C1 to C4 among the regions of the upper welding electrode E10 are referred to as the welding currents of the regions corresponding to the coils C1 to C4 when necessary.

Figure 8A:
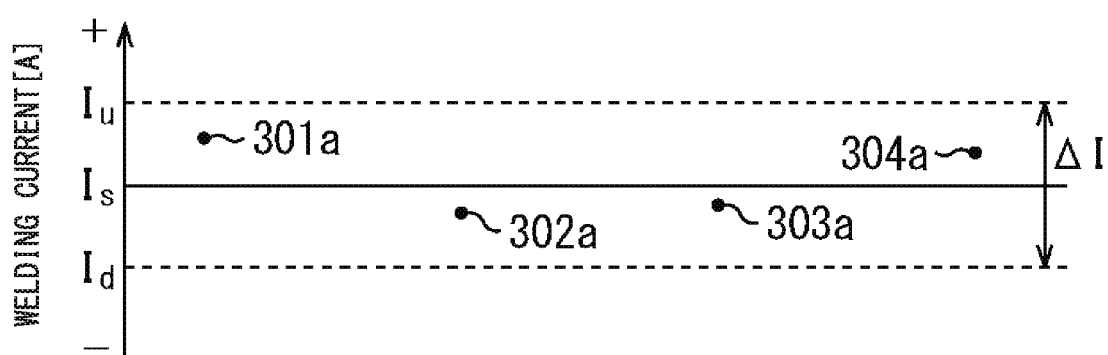
FIG. 8A is a conceptual diagram showing an example of the relationship between welding currents of regions corresponding to the coils of the welding electrodes according to the present embodiment.
Figure 8B:
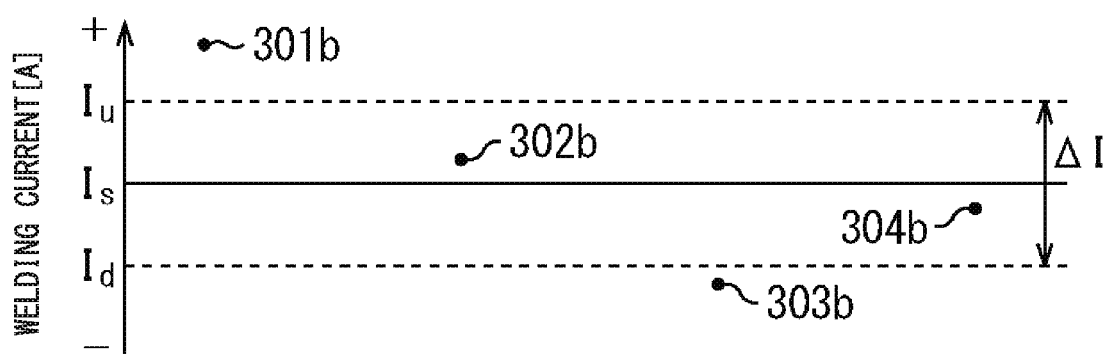
FIG. 8B is a conceptual diagram showing an example of the relationship between the welding currents of the regions corresponding to the coils of the welding electrodes according to the present embodiment.

FIGS. 8A and 8B are conceptual diagrams showing examples of the relationship of the welding currents of the regions corresponding to the coils C1 to C4 according to the second embodiment. FIG. 8A shows an example of the relationship of the welding currents of the regions corresponding to the coils C1 to C4 in a case where it is not necessary to set the magnitude of the welding current to be lower than a current value. FIG. 8B shows an example of the relationship of the welding currents of the regions corresponding to the coils C1 to C4 in a case where it is necessary to set the magnitude of the welding current to be lower than the current value.

In FIGS. 8A and 8B, points 301a and 301b denote the welding current of the region corresponding to the coil C1. Points 302a and 302b denote the welding current of the region corresponding to the coil C2. Points 303a and 303b denote the welding current of the region corresponding to the coil C3. Points 304a and 304b denote the welding current of the region corresponding to the coil C4.

In FIGS. 8A and 8B, a target welding current $I_s$ is a target value of the welding current when spot welding is performed on the metal sheets M1 and M2. An upper-limit welding current $I_u$ is an upper limit of the welding currents of the regions corresponding to the coils C1 to C4. A lower-limit welding current $I_d$ is a lower limit of the welding currents of the regions corresponding to the coils C1 to C4. For example, in a case where the sputters occur or a case where there is a symptom of the occurrence of the sputters, values indicating the magnitudes of the welding currents of the regions corresponding to the coils C1 to C4 may be previously investigated, and the upper-limit welding current $I_u$ and the lower-limit welding current $I_d$ may be determined from the magnitudes of the investigated welding currents.

The determination unit 513 determines whether or not it is necessary to set the magnitudes of the welding currents to be lower than the current values from the magnitudes of the welding currents of the regions corresponding to the coils C1 to C4 which are derived by the welding current distribution deriving unit 512.

For example, the determination unit 513 determines whether or not at least one of the magnitudes of the welding currents of the regions corresponding to the coils C1 to C4 is deviated from a range ΔI determined by the upper-limit welding current $I_u$ and the lower-limit welding current $I_d$. In the present embodiment, it is determined whether or not a distribution (greater than a preset range) is generated in the welding currents in a region (for example, a circular region indicating the upper welding electrode E10 in FIG. 7A) perpendicular to the axis of the upper welding electrode E10 in this manner. The determination unit 513 may determine whether or not at least one of the magnitudes of the welding currents of the regions corresponding to the coils C1 to C4 exceeds the upper-limit welding current $I_u$ without using the lower-limit welding current $I_d$.

If a timing when the application of the electric current to the metal sheets M10 and M20 is started arrives, the circuit control unit 514 controls the MERS 410 in an operation frequency corresponding to the target welding current $I_s$.

Thereafter, if the determination unit 513 determines that at least one of the magnitudes of the welding currents corresponding to the coils C1 to C4 is deviated from the range ΔI determined by the upper-limit welding current $I_u$ and the lower-limit welding current $I_d$, the circuit control unit 514 controls the operation of the MERS 410 such that the magnitude of the welding current becomes lower than the current value by a value corresponding to a deviation amount from the range ΔI.

Here, in a case where the magnitudes of two or more welding currents among the welding currents of the regions of the coils C1 to C4 are deviated from the range ΔI determined by the upper-limit welding current $I_u$ and the lower-limit welding current $I_d$, the circuit control unit 514 specifies the welding current, among the two or more welding currents, of which an absolute value of the deviation amount from the upper-limit welding current $I_u$ or the lower-limit welding current $I_d$ is largest. The circuit control unit 514 increases the operation frequency of the MERS 410 such that the current magnitude of the welding current is decreased by the value corresponding to the absolute value of the deviation amount of the specified welding current.

In the example shown in FIG. 8B, the welding current (point 301b) of the region corresponding to the coil C1 and the welding current (point 303b) corresponding to the coil C3 are deviated from the range ΔI determined by the upper-limit welding current $I_u$ and the lower-limit welding current $I_d$. The absolute value (for example, the absolute value of the value acquired by subtracting the upper-limit welding current from the welding current corresponding to the coil C) of the deviation amount from the upper-limit welding current $I_u$ of the welding current (point 301b) of the region corresponding to the coil C1 is greater than the absolute value (for example, the absolute value of the value acquired by subtracting the lower-limit welding current $I_d$ from the welding current of the region corresponding to the coil C3) of the deviation amount from the lower-limit welding current $I_d$ of the welding current (point 303b) corresponding to the coil C3.

Accordingly, the circuit control unit 514 increases the operation frequency of the MFRS 410 such that the current magnitude of the welding current is decreased by the value corresponding to the absolute value of the deviation amount from the upper-limit welding current $I_u$ of the welding current (point 301b) of the region corresponding to the coil C1.

Meanwhile, in a case where the determination unit 513 determines that all the magnitudes of the welding currents of the regions corresponding to the coils C1 to C4 fall within the range ΔI determined by the upper-limit welding current $I_u$ and the lower-limit welding current $I_d$, the circuit control unit 514 continues to control the operation of the MERS 410 in the operation frequency corresponding to the target welding current $I_s$.

Figure 9A:
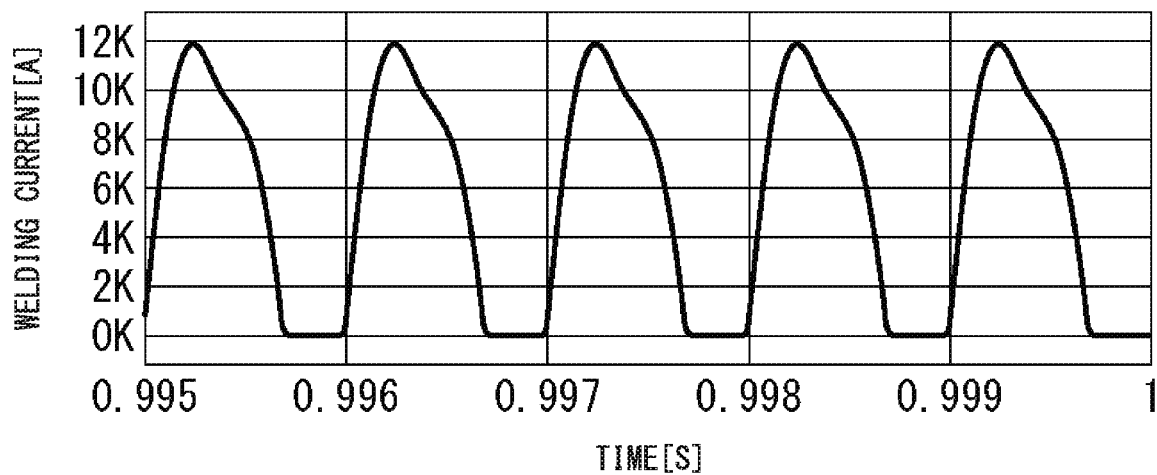
FIG. 9A is a diagram showing an example of a waveform of the welding current according to the present embodiment.
Figure 9B:
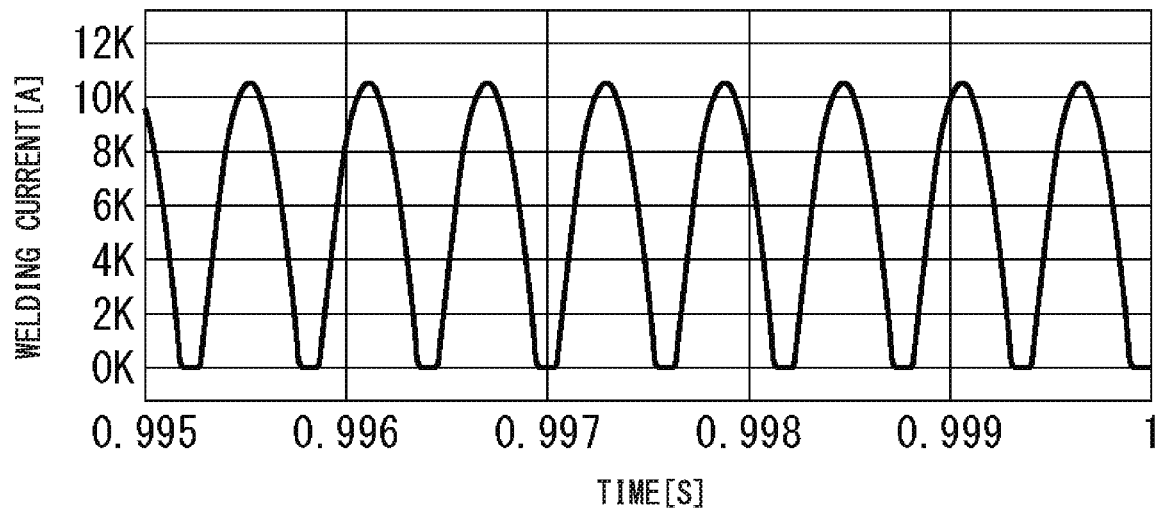
FIG. 9B is a diagram showing an example of the waveform of the welding current according to the present embodiment.

FIGS. 9A and 9B are diagrams showing examples of a waveform of the welding current according to the second embodiment. FIG. 9A shows an example of the waveform of the welding current before the operation frequency of the MERS 410 is changed. FIG. 9B shows an example of the waveform of the welding current after the operation frequency of the MERS 410 is changed.

FIG. 9A shows a case where the operation frequency (that is, the frequency of the welding current) of the MERS 410 is 1 kHz, and FIG. 9B shows a case where the operation frequency (that is, the frequency of the welding current) of the MERS 410 is 1.7 kHz. As shown in FIGS. 9A and 9B, the operation frequency of the MERS 410 is changed to 1.7 kHz from 1 kHz, and thus, the crest value of the welding current is decreased to about 10.5 kA from less than 12 kA.

Hereinafter, an example of a configuration of the MERS 410 will be described.

As shown in FIG. 6, the MERS 410 is an example of the magnetic energy recovery bidirectional current switch, and includes a bridge circuit and a capacitor C.

The bridge circuit includes four reverse conducting semiconductor switches U, V, X, and Y which are provided on two paths, and two switches are arranged in each path. The capacitor C is disposed between two paths of the bridge circuit.

Specifically, the bridge circuit includes a first path that is a path which reaches from the AC terminal a to the AC terminal d via the DC terminal b, and a second path that is a path which reaches from the AC terminal a to the AC terminal d via the DC terminal c.

On the first path, the reverse conducting semiconductor switch V (fourth reverse conducting semiconductor switch) is disposed between the AC terminal d and the DC terminal b, and the reverse conducting semiconductor switch U (first reverse conducting semiconductor switch) is disposed between the DC terminal b and the AC terminal a.

On the second path, the reverse conducting semiconductor switch Y (third reverse conducting semiconductor switch) is disposed between the AC terminal d and the DC terminal c, and the reverse conducting semiconductor switch X (second reverse conducting semiconductor switch) is disposed between the DC terminal c and the AC terminal a. The capacitor C is disposed between the DC terminal b and the DC terminal c.

Between the AC terminal a and the AC terminal d, the reverse conducting semiconductor switches U and X are connected in parallel, and the reverse conducting semiconductor switches V and Y are connected in parallel. Between the AC terminal a and the AC terminal d, the reverse conducting semiconductor switches U and V are connected in series, and the reverse conducting semiconductor switches X and Y are connected in series.

When ON signals are not input to gate terminals $G_U$, $G_V$, $G_X$, and $G_Y$ and the reverse conducting semiconductor switches U, V, X, and Y are switched off, these switches cause the current to flow only in one direction, and when ON signals are input to the gate terminals $G_U$, $G_V$, $G_X$, and $G_Y$ and these switches are switched on, these switches cause the current to flow in both directions. That is, when the reverse conducting semiconductor switches U, V, X, and Y are switched off, these switches cause the current to flow in one direction between an emitter terminal and a collector terminal, and when these switches are switched on, these switches cause the current to flow in both directions between the emitter terminal and the collector terminal.

In the following description, the "directions in which the current flows when the reverse conducting semiconductor switches U, V, X, and Y are switched off" are referred to as "forward directions" when necessary, and the directions in which the current does not flow when these switches are switched off are referred to as "reverse directions" when necessary. In the following description, "connection directions to the circuit in the forward directions and the reverse directions" are referred to as "switch polarities" when necessary.

The reverse conducting semiconductor switches U, V, X, and Y are arranged such that the polarities of the switches are as follows. The reverse conducting semiconductor switch U and the reverse conducting semiconductor switch X which are connected in parallel have switch polarities of reverse directions each other between the AC terminal a and the AC terminal d. Similarly, the reverse conducting semiconductor switch V and the reverse conducting semiconductor switch Y which are connected in parallel also have switch polarities of reverse directions each other between the AC terminal a and the AC terminal d.

The reverse conducting semiconductor switch U and the reverse conducting semiconductor switch V which are connected in series have switch polarities of reverse directions each other between the AC terminal a and the AC terminal d. Similarly, the reverse conducting semiconductor switch X and the reverse conducting semiconductor switch Y which are connected in series also have switch polarities of reverse directions each other between the AC terminal a and the AC terminal d.

Thus, the reverse conducting semiconductor switch U and the Y have switch polarities of forward directions each other, and the reverse conducting semiconductor switch V and the reverse conducting semiconductor switch X also have switch polarities of forward directions each other. The switch polarities of the reverse conducting semiconductor switches U and Y and the switch polarities of the reverse conducting semiconductor switches V and X are reverse directions each other.

The switch polarities shown in FIG. 6 may be opposite to each other between the reverse conducting semiconductor switches U and Y and the reverse conducting semiconductor switches V and X.

Various configurations are considered as the configuration of the reverse conducting semiconductor switches U, V, X, and Y. In the present embodiment, it is assumed that semiconductor switches $S_U$, $S_V$, $S_X$, and $S_Y$ and diodes $D_U$, $D_V$, $D_X$, and $D_Y$ are connected in parallel. That is, the reverse conducting semiconductor switches U, V, X, and Y include one of the diodes $D_U$, $D_V$, $D_X$, and $D_Y$, and one of the semiconductor switches $S_U$, $S_V$, $S_X$, and $S_Y$ connected to the diodes in parallel, respectively.

The gate terminals $G_U$, $G_V$, $G_X$, and $G_Y$ of the semiconductor switches $S_U$, $S_V$, $S_X$, and $S_Y$ are connected to the control unit 510. The gate terminals $G_U$, $G_V$, $G_X$, and $G_Y$ receive the inputs of the ON signals (gate signals) for turning on the semiconductor switches $S_U$, $S_V$, $S_X$, and $S_Y$, as a control signal to the MERS 410 from the control unit 510. While the ON signals are being input, the semiconductor switches $S_U$, $S_V$, $S_X$, and $S_Y$ are turned on, and cause the current to flow in both directions. However, in a case where the ON signals are not input, the semiconductor switches $S_U$, $S_V$, $S_X$, and $S_Y$ are turned off, the switches do not cause the current to flow in any direction. Thus, when the semiconductor switches $S_U$, $S_V$, $S_X$, and $S_Y$ are turned off, the current flows only in the conduction directions of the diodes $D_U$, $D_V$, $D_X$, and $D_Y$ connected to the semiconductor switches $S_U$, $S_V$, $S_X$, and $S_Y$ in parallel.

The reverse conducting semiconductor switches included in the MERS 410 are not limited to the reverse conducting semiconductor switches U, V, X, and Y. That is, the reverse conducting semiconductor switches may have the configuration indicating the above-described operation. For example, these switches may be power MOS FETs or reverse conducting GTO thyristors, or may have a configuration in which the diodes and the semiconductor switches such as IGBTs are connected in parallel.

The description of the switch polarities of the reverse conducting semiconductor switches U, V, X, and Y using the diodes $D_U$, $D_V$, $D_X$, and $D_Y$ is as follows. That is, the forward directions (the directions in which the current flows when the switches are turned off) are conduction directions of the diodes $D_U$, $D_V$, $D_X$, and $D_Y$, and the reverse directions (the directions in which the current does not flow when the switches are turned off) are non-conduction directions of the diodes $D_U$, $D_V$, $D_X$, and $D_U$. The conduction directions of the diodes ($D_U$ and $D_X$ or $D_V$ and $D_Y$) connected in parallel are the reverse directions each other, and the conduction directions of the diodes ($D_U$ and $D_V$ or $D_X$ and $D_Y$) connected in series are the reverse directions each other. The conduction directions of the diodes $D_U$ and $D_Y$ are the forward directions each other, and the conduction directions of the diodes $D_V$ and $D_X$ are similarly the forward directions each other.

Accordingly, the conduction directions of the diodes $D_U$ and $D_Y$ and the diodes $D_V$ and $D_X$ are the reverse directions each other.

As described above, the reverse conducting semiconductor switches U, V, X, and Y are arranged such that the forward directions are as follows. That is, if the reverse conducting semiconductor switch U and the reverse conducting semiconductor switch Y are paired as a first pair and the reverse conducting semiconductor switch V and the reverse conducting semiconductor switch X are paired as a second pair, the reverse conducting semiconductor switch U and the reverse conducting semiconductor switch Y which are paired as the first pair are arranged such that the forward directions are the same direction, and the reverse conducting semiconductor switch V and the reverse conducting semiconductor switch X which are paired as the second pair are arranged such that the forward directions are the same direction.

The first pair and the second pair are arranged such that the forward directions are opposite to each other. Accordingly, the reverse conducting semiconductor switches (U and Y or V and X) arranged in a diagonal line in the bridge circuit are arranged such that the forward directions are the same direction.

(Operation of MFRS 410)

In the MERS 410, if one reverse conducting semiconductor switch of two reverse conducting semiconductor switches arranged in the diagonal line of the bridge circuit, is turned on, the other reverse conducting semiconductor switch is turned off. Similarly, if one reverse conducting semiconductor switch of two reverse conducting semiconductor switches provided in the diagonal line of the bridge circuit is turned off, the other reverse conducting semiconductor switch is also turned off. For example, if the reverse conducting semiconductor switch U is turned on, the reverse conducting semiconductor switch Y is also turned on, and if the reverse conducting semiconductor switch U is turned off, the reverse conducting semiconductor switch Y is also turned off. The same is true of the reverse conducting semiconductor switches V and X.

When two reverse conducting semiconductor switches provided in one diagonal line of two diagonal lines of the bridge circuit are turned on, two reverse conducting semiconductor switches provided in the other diagonal line are turned off. For example, when the reverse conducting semiconductor switches U and Y are turned on, the reverse conducting semiconductor switches V and X are turned off.

The frequency or waveform of the welding current may be variously changed by controlling the ON and OFF operations of the reverse conducting semiconductor switches (U and Y or V and X) in the MERS 410, but an example of the operation of the MERS 410 for acquiring the waveform of the welding current shown in FIGS. 9A and 9B will be described.

The switching pattern of the example shown in FIGS. 9A and 9B is a pattern in which only two reverse conducting semiconductor switches U and Y arranged in one diagonal line of the diagonal lines of the bridge circuit are turned on and off and two reverse conducting semiconductor switches V and X arranged in the other diagonal line are not turned on (are maintained in the OFF state).

FIG. 10 is a diagram for describing an example of the operation of the MERS 410 when the welding current shown in FIGS. 9A and 9B is acquired.

In the present embodiment, the operation frequency $f_1$ ($=1/T_1$) of the MERS 410 is set to be lower than the resonance frequency based on the inductance when the load side is viewed from the output end of the MERS 410 and the capacitance of the capacitor C. Accordingly, it is possible to realize the soft switching. Since it is not necessary to use a voltage source capacitor having a high capacitance, a capacitance of the capacitor C can be decreased.

In FIG. 10, the U-Y gate represents the ON signals (gate signals) input to the gate terminals $G_U$ and $G_Y$. The V-X gate represents the ON signals (gate signals) input the gate terminals $G_V$ and $G_X$. The reverse conducting semiconductor switches U and Y (semiconductor switches $S_U$ and $S_Y$) are turned on for a period during which the waveform of the U-Y gate rises.

In the following description, a case where the ON signals (gate signals) are input to the gate terminals $G_U$ and $G_Y$, and thus, the reverse conducting semiconductor switches U and Y turned on is referred to as a case where the "U-Y gate is turned on" when necessary. Meanwhile, a case where the ON signals (gate signals) is not input to the gate terminals $G_U$ and $G_Y$, and thus, the reverse conducting semiconductor switches U and Y are turned off is referred to as a case where the "U-Y gate is turned off" when necessary.

A case where the ON signals (gate signals) are input to the gate terminals $G_V$ and $G_X$, and thus, the reverse conducting semiconductor switches V and X are turned on is referred to as a case where the "V-X gate is turned on" when necessary. Meanwhile, a case where the ON signals (gate signals) are not input to the gate terminals $G_V$ and $G_X$, and thus, the reverse conducting semiconductor switches V and X are turned off is referred to as a case where the "V-X gate is turned off" when necessary.

Hereinafter, the operation of the MERS 410 in the example shown in FIGS. 9A and 9B will be described with reference to FIG. 10.

(1) U-Y Gate: ON, V-X Gate: OFF

The capacitor C is charged by a DC input current input through the DC reactor 310 in a timing when the U-Y gate is turned on since both the V-X gate and the U-Y gate are turned off during a period immediately before the timing. Accordingly, the voltage $V_C$ at both ends of the capacitor C represents a maximum value.

If the U-Y gate is turned on, the discharging of the capacitor C is started, the output current $I_L$ of the MFRS 410 flows along the path in the order of the capacitor C, the reverse conducting semiconductor switch U, the current transformer 710, and the reverse conducting semiconductor switch Y. Accordingly, the output current $I_L$ of the MERS 410 is increased from 0 (zero), and the voltage $V_C$ at both ends of the capacitor C is decreased. If the discharging of the capacitor C is completed, the output current $I_L$ of the MERS 410 represents a positive maximum value, and the voltage $V_C$ at both ends of the capacitor C of becomes a minimum value (0 (zero)).

Since the operation frequency $f_1$ of the MERS 410 is set to be lower than the resonance frequency, even though the discharging of the capacitor C is completed, the control unit 510 does not turn off the U-Y gate, and the U-Y gate is maintained at the ON state. Accordingly, the output current $I_L$ of the MERS 410 flows along the path in the order of the reverse conducting semiconductor switch U, the current transformer 710, and the diode $D_V$ and the path in the order of the reverse conducting semiconductor switch Y, the diode $D_X$, and the current transformer 710 in parallel, and is returned. The output current $I_L$ of the MERS 410 is decreased (approaches 0 (zero)) depending on a time constant determined from the inductance and the resistance of the load.

(2) U-Y Gate: OFF, V-X Gate: OFF

If a time (a time which is ½ of the cycle $T_1$) which is a reciprocal of twice as much as the operation frequency $f_1$ of the MERS 410 elapses, the control unit 510 turns off the U-Y gate. In this case, since the voltage $V_C$ at both ends of the capacitor C is 0 (zero), the soft switching is realized.

If the returning of the current is not ended in a timing when the U-Y gate is turned Off (if the output current $I_L$ of the MERS 410 is not 0 (zero)), the output current $I_L$ of the MERS 410 flows along the path in the order of the diode $D_V$, the capacitor C, and the diode $D_X$, and the capacitor C is charged. Thus, the output current is rapidly decreased, and becomes 0 (zero).

Thereafter, the capacitor C is charged by the DC input current input through the DC reactor 310. Accordingly, the voltage $V_C$ at both ends of the capacitor C is raised.

If a time (a time which is ½ of the cycle $T_1$) which is a reciprocal of twice as much as the operation frequency $f_1$ of the MERS 410 elapses, the control unit 510 turns on the U-Y gate. In this case, since the output current $I_L$ of the MFRS 410 is 0 (zero), the soft switching is realized.

The operation of the cycle $T_1$ (one cycle) is ended by the operations of (1) and (2). Such an operation is repeatedly performed, and thus, the waveform of the welding current shown in FIGS. 9A and 9B is acquired.

Figure 11:
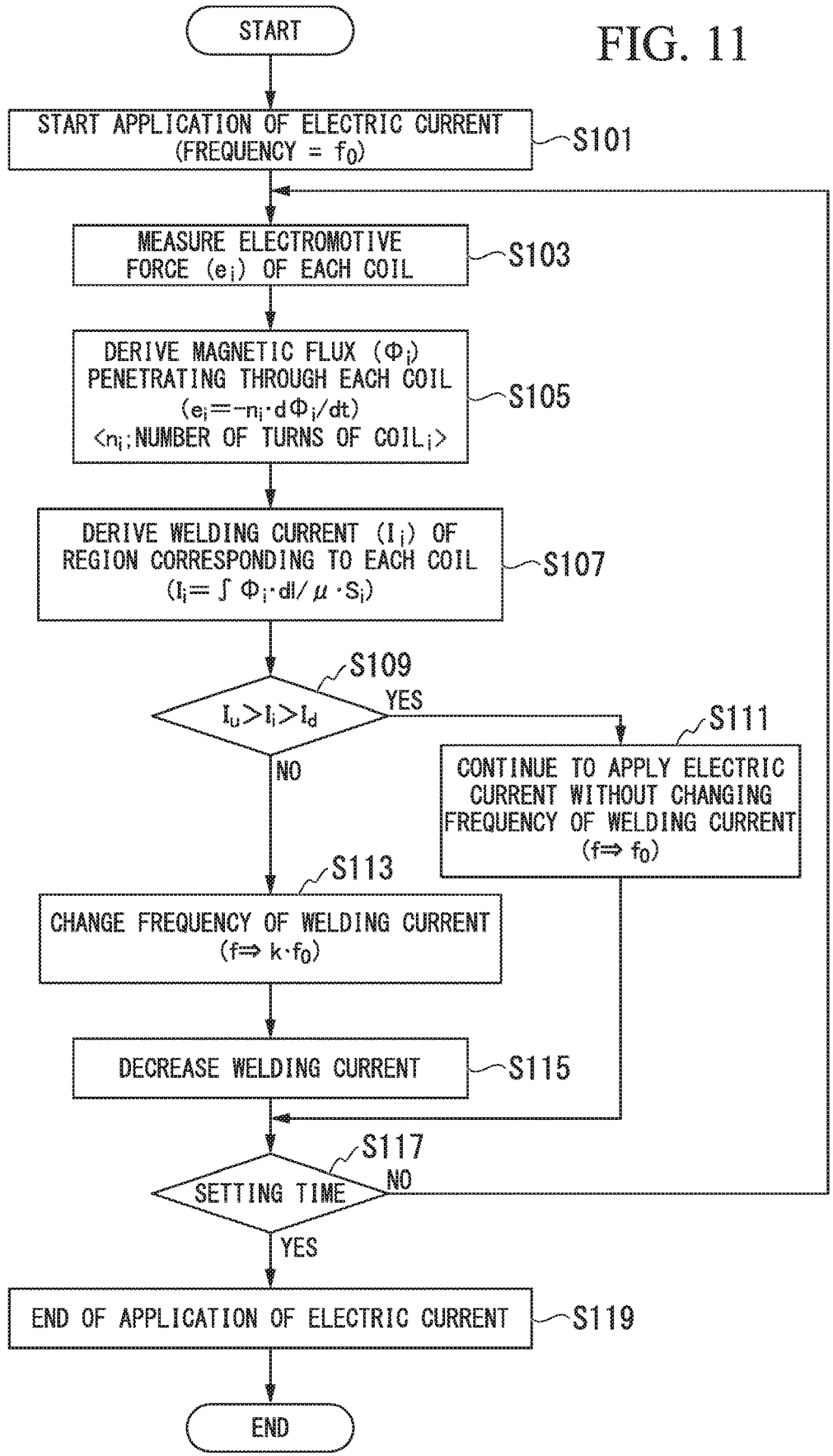
FIG. 11 is a flowchart showing an example of an electric processing process according to the present embodiment.

Hereinafter, the operation of the resistance spot welding system 1A according to the second embodiment will be described. FIG. 11 is a flowchart showing a flow of the electric processing of the resistance spot welding system 1A according to the second embodiment. In the process shown in FIG. 11, the operation frequency of the MERS 410 is controlled based on the welding current of the region corresponding to each of the coils C1 to C4.

The metal sheets M10 and M20 which are layered each other are set between the upper welding electrode E10 and the lower welding electrode E20 of the resistance spot welder 810, and the electric current applying process is started while pressurizing the metal sheets M10 and M20 such that the metal sheets are clamped between the upper welding electrode E10 and the lower welding electrode E20 (step S101). Here, the circuit control unit 514 controls the operation frequency of the MERS 410 such that the operation frequency becomes $f_0$.

Subsequently, the magnetic fluxes generated by the welding currents penetrate through the coils C1 to C4, and thus, the voltage detection unit 910 measures induced electromotive forces $e_i$ (i is an integer of 1 to 4) generated by the coils C1 to C4 (step S103).

Subsequently, the magnetic flux distribution deriving unit 511 derives magnetic fluxes $ϕ_i$ of the coils C1 to C4 from the induced electromotive forces of the coils C1 to C4 detected by the voltage detection unit 910 and the number of turns of each of the coils C1 to C4 based on, for example, Expression (1) to be represented below (step S105). In Expression (1), $n_i$ denotes the number of turns of the coil.

$$e_i = -n_i \cdot dϕ_i/dt \qquad \text{(Expression 1)}$$

Subsequently, the welding current distribution deriving unit 512 derives welding currents $I_i$ (i is an integer of 1 to 4) (the welding currents based on the magnetic fluxes $ϕ_i$ of the coils C1 to C4) of the regions corresponding to the coils C1 to C4 of the upper welding electrode E10 from the magnetic fluxes $ϕ_i$ of the coils C1 to C4 derived by the magnetic flux distribution deriving unit 511 based on, for example, Expression (2) (step S107). In Expression (2), dl denotes a minute length, μ denotes permeability, and $S_i$ denotes area of each of coils C1 to C4.

$$I_i = ∮ ϕ_i \cdot dl/(μ \cdot S_i) \qquad \text{(Expression 2)}$$

Subsequently, the determination unit 513 determines whether or not the magnitudes of the welding currents Ii of the regions corresponding to the coils C1 to C4 derived by the welding current distribution deriving unit 512 are included in a predetermined range ΔI between the upper-limit welding current $I_u$ and the lower-limit welding current $I_d$ (step S109).

Subsequently, in a case where the determination unit 513 determines that the magnitudes of the welding current $I_i$ are included in the predetermined range ΔI, the circuit control unit 514 continues the electric current applying process without changing the operation frequency $f_0$ of the MERS 410 (step S111).

Meanwhile, in a case where the determination unit 513 determines that the magnitudes of the welding current $I_i$ are not included in the predetermined range ΔI, the circuit control unit 514 changes the operation frequency of the MERS 410 (step S113). The operation frequency of the MERS 410 is increased, and thus, the magnitude of the welding current is set to be lower than the current value (step S115). For example, the circuit control unit 514 controls the operation of the MERS 410 such that the magnitude of the welding current becomes lower than the current value by the value corresponding to the deviation amount from the range ΔI. For example, the circuit control unit 514 sets a value acquired by multiplying the frequency $f_0$ by a coefficient k preset depending on the deviation amount from the range ΔI, as a changed operation frequency ($kf_0$), and controls the operation frequency of the MERS 410 such that the operation frequency becomes $kf_0$.

Subsequently, the circuit control unit 514 determines whether or not the preset electric processing time (setting time) elapses after the application of the electric current is started (step S117). In a case where it is determined that the setting time elapses, the circuit control unit 514 stops the operation of the MERS 410 to end the electric current applying process (step S119), and ends the process of the present flowchart. Meanwhile, in a case where it is determined that the setting time does not elapse, the circuit control unit 514 returns to step S103 again, and continues the process of the present flowchart.

Figure 12:
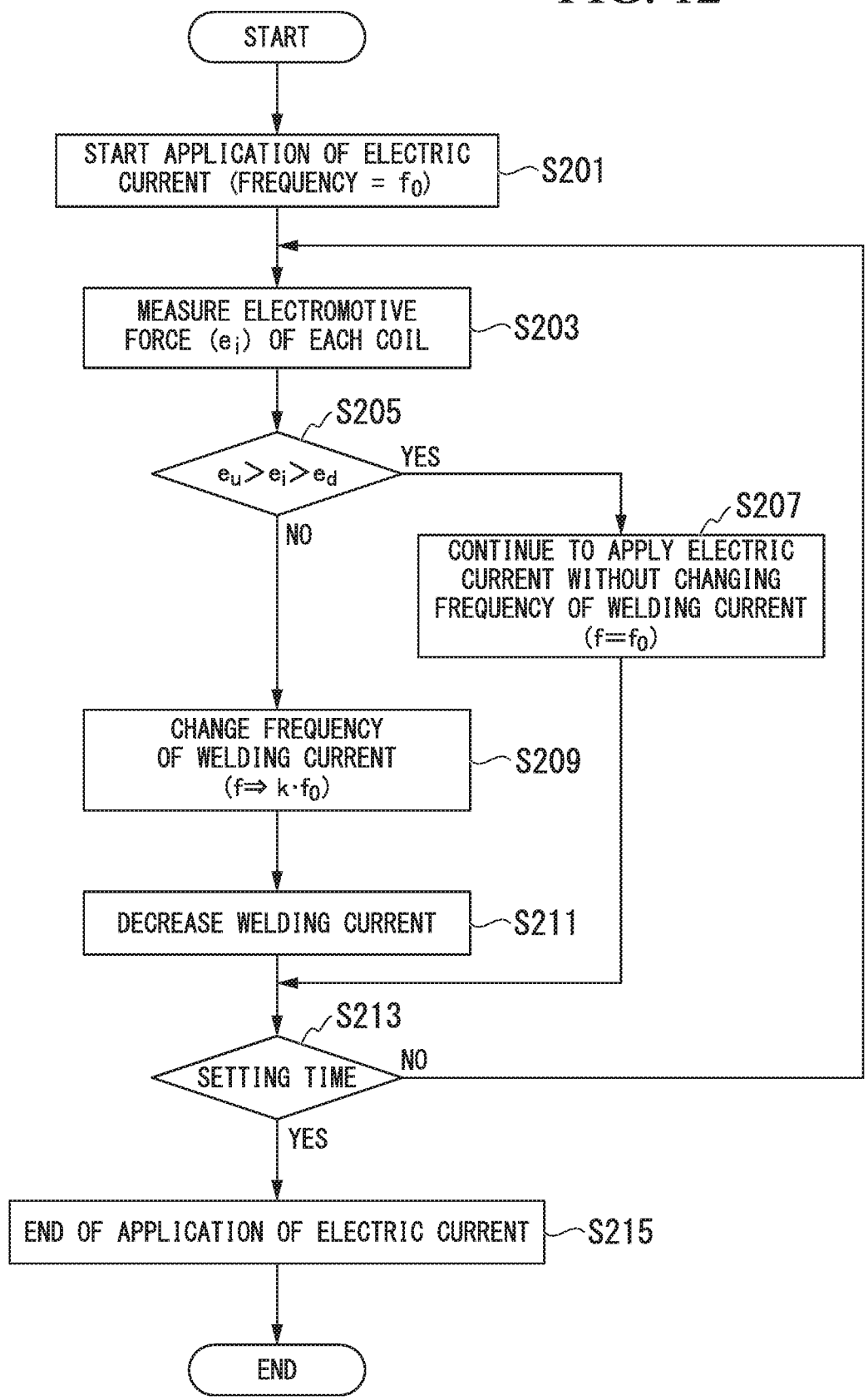
FIG. 12 is a flowchart showing another example of the electric processing process according to the present embodiment.

Hereinafter, a flow of another electric processing of the second resistance spot welding system 1A will be described. FIG. 12 is a flowchart showing a flow of another electric processing of the resistance spot welding system 1A according to the second embodiment. In the process shown in FIG. 12, the operation frequency of the MERS 410 is controlled based on an electromotive force of each of the coils C1 to C4.

The metal sheets M10 and M20 which are layered each other are set between the upper welding electrode E10 and the lower welding electrode E20 of the resistance spot welder 810, and the electric current applying process is started while pressurizing the metal sheets M10 and M20 such that the metal sheets are clamped between the upper welding electrode E10 and the lower welding electrode E20 (step S201). Here, the circuit control unit 514 controls the operation frequency of the MERS 410 such that the operation frequency becomes $f_0$.

Subsequently, the magnetic fluxes generated by the welding currents penetrate through the coils C1 to C4, and thus, the voltage detection unit 910 measures the induced electromotive forces $e_i$ generated by the coils C1 to C4 (step S203).

Subsequently, the determination unit 513 determines whether or not the magnitudes of the induced electromotive forces $e_i$ of the coils C1 to C4 measured by the voltage detection unit 910 are included in a predetermined range Δe between an upper-limit electromotive force $e_u$ and a lower-limit electromotive force $e_d$ (step S205). For example, in a case where the sputters occur or a case where there is a symptom of the occurrence of the sputters, values indicating the magnitudes of the induced electromotive forces $e_i$ of the coils C1 to C4 may be previously investigated, and the upper-limit electromotive force $e_u$ and the lower-limit electromotive force $e_d$ may be determined from the magnitudes of the investigated induced electromotive forces. The determination unit 513 may determine the magnitudes of the induced electromotive forces $e_i$ of the coils C1 to C4 measured by the voltage detection unit 910 exceed the upper-limit electromotive force $e_u$ without the lower-limit electromotive force $e_d$.

Subsequently, in a case where the determination unit 513 determines that the magnitudes of the induced electromotive forces $e_i$ are included in the predetermined range $Δ_e$, the circuit control unit 514 continues the electric current applying process without changing the operation frequency $f_0$ of the MERS 410 (step S207).

Meanwhile, in a case where the determination unit 513 determines that the magnitudes of the induced electromotive forces $e_i$ are not included in the predetermined range $Δ_e$, the circuit control unit 514 changes the operation frequency of the MERS 410 (step S209). The operation frequency of the MERS 410 is increased, and thus, the magnitude of the welding current is set to be lower than the current value (step S211). For example, the circuit control unit 514 controls the operation of the MERS 410 such that the magnitude of the welding current becomes lower than the current value by a value corresponding to the deviation amount from the range Δe. For example, the circuit control unit 514 sets the value acquired by multiplying the frequency $f_0$ by the coefficient k preset depending on the deviation amount from the range Δe, as the changed operation frequency ($kf_0$), and controls the operation frequency of the MERS 410 such that the operation frequency becomes $kf_0$.

Subsequently, the circuit control unit 514 determines whether or not the preset electric processing time (setting time) elapses after the application of the electric current is started (step S213). In a case where it is determined that the setting time elapses, the circuit control unit 514 stops the operation of the MERS 410 to end the electric current applying process (step S215), and ends the process of the present flowchart. Meanwhile, in a case where it is determined that the setting time does not elapse, the circuit control unit 514 returns to step S203 again, and continues the process of the present flowchart.

Figure 13:
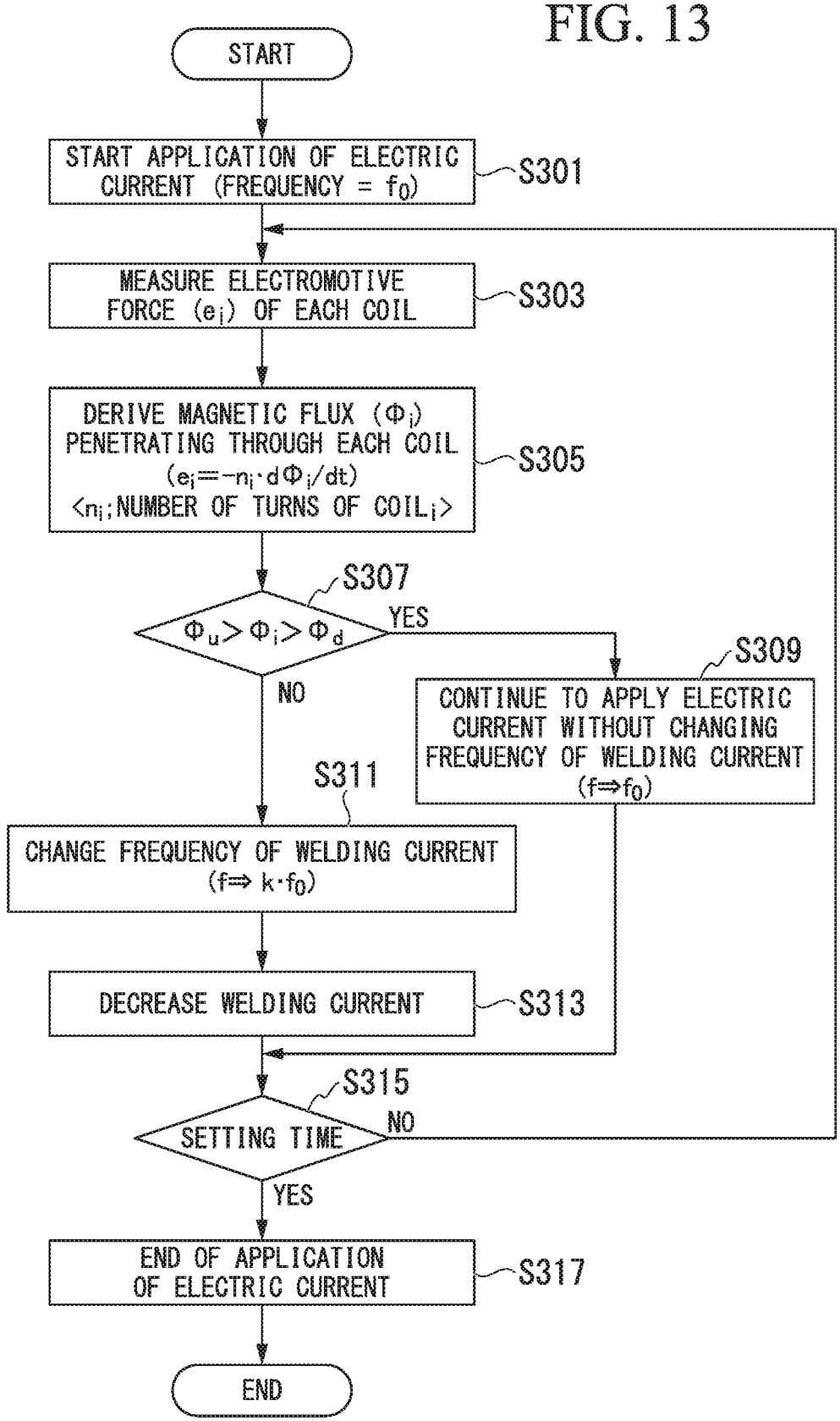
FIG. 13 is a flowchart showing still another example of the electric processing process according to the present embodiment.

Hereinafter, a flow of still another electric processing of the second resistance spot welding system 1A will be described. FIG. 13 is a flowchart showing a flow of another electric processing of the resistance spot welding system 1A according to the second embodiment. In the process shown in FIG. 13, the operation frequency of the MERS 410 is controlled based on the magnetic fluxes penetrating the coils C1 to C4.

The metal sheets M10 and M20 which are layered each other are set between the upper welding electrode E10 and the lower welding electrode E20 of the resistance spot welder 810, and the electric current applying process is started while pressurizing the metal sheets M10 and M20 such that the metal sheets are clamped between the upper welding electrode E10 and the lower welding electrode E20 (step S301). Here, the circuit control unit 514 controls the operation frequency of the MERS 410 such that the operation frequency becomes $f_0$.

Subsequently, the magnetic fluxes generated by the welding currents penetrate through the coils C1 to C4, and thus, the voltage detection unit 910 measures the induced electromotive forces $e_i$ generated by the coils C1 to C4 (step S303).

Subsequently, the magnetic flux distribution deriving unit 511 derives magnetic fluxes $\phi_i$, of the coils C1 to C4 from the induced electromotive forces of the coils C1 to C4 detected by the voltage detection unit 910 and the number of turns of each of the coils C1 to C4 based on, for example, Expression (3) to be represented below (step S305). In Expression (3), $n_i$ denotes the number of turns of the coil.

$$e_i = -n_i \cdot d\phi_i/dt \qquad \text{(Expression 3)}$$

Subsequently, the determination unit 513 determines whether or not the magnitudes of the magnetic fluxes $\phi_i$ of the coils C1 to C4 derived by the magnetic flux distribution deriving unit 511 are included in a predetermined range $\Delta\phi$ between an upper-limit magnetic flux $\phi_u$ and a lower-limit magnetic flux $\phi_d$ (step S307). For example, in a case where the sputters occur or a case where there is a symptom of the occurrence of the sputters, values indicating the magnitudes of the magnetic fluxes $\phi_i$ of the coils C1 to C4 may be previously investigated, and the upper-limit magnetic flux $\phi_u$ and the lower-limit magnetic flux $\phi_d$ may be determined from the magnitude of the investigated magnetic flux. The determination unit 513 may determine whether or not the magnitudes of the magnetic fluxes $\phi_i$ of the coils C1 to C4 derived by the magnetic flux distribution deriving unit 511 exceed the upper-limit magnetic flux $\phi_u$ without using the lower-limit magnetic flux $\phi_d$.

Subsequently, in a case where the determination unit 513 determines that the magnitudes of the magnetic fluxes $\phi_i$ are included in the predetermined range $\Delta\phi$ the circuit control unit 514 continues the electric current applying process without changing the operation frequency $f_0$ of the MERS 410 (step S309).

Meanwhile, in a case where the determination unit 513 determines that the magnitudes of the magnetic fluxes $\phi_i$ are not included in the predetermined range $\Delta\phi$ the circuit control unit 514 changes the operation frequency of the MERS 410 (step S311). The operation frequency of the MERS 410 is increased, and thus, the magnitude of the welding current is set to be lower than the current value (step S313). For example, the circuit control unit 514 controls the operation of the MERS 410 such that the magnitude of the welding current becomes lower than the current value by a value corresponding to the deviation amount from the range $\Delta\phi$. For example, the circuit control unit 514 sets the value acquired by multiplying the frequency $f_0$ by the coefficient k preset depending on the deviation amount from the range $\Delta\phi$, as the changed operation frequency ($kf_0$), and controls the operation frequency of the MERS 410 such that the operation frequency becomes $kf_0$.

Subsequently, the circuit control unit 514 determines whether or not the preset electric processing time (setting time) elapses after the application of the electric current is started (step S315). In a case where it is determined that the setting time elapses, the circuit control unit 514 stops the operation of the MERS 410 to end the electric current applying process (step S317), and ends the process of the present flowchart. Meanwhile, in a case where it is determined that the setting time does not elapse, the circuit control unit 514 returns to step S303 again, and continues the process of the present flowchart.

Figure 14:
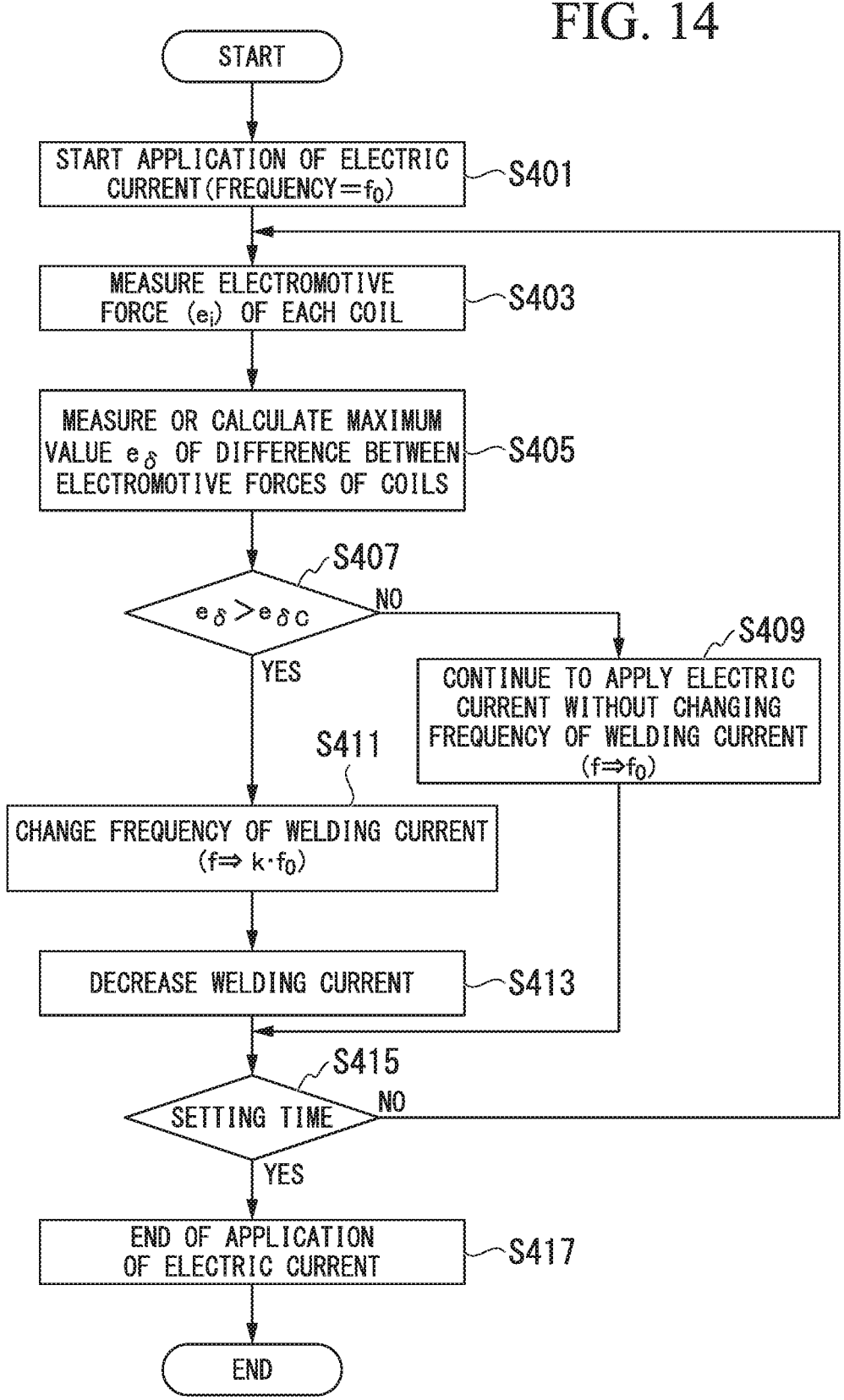
FIG. 14 is a flowchart showing still another example of the electric processing process according to the present embodiment.

Hereinafter, a flow of still another electric processing of the second resistance spot welding system 1A will be described. FIG. 14 is a flowchart showing a flow of another electric processing of the resistance spot welding system 1A according to the second embodiment. In the process shown in FIG. 14, the operation frequency of the MERS 410 is controlled based on a maximum value of a difference between the electromotive forces of the coils C1 to C4.

The metal sheets M10 and M20 which are layered each other are set between the upper welding electrode E10 and the lower welding electrode E20 of the resistance spot welder 810, and the electric current applying process is started while pressurizing the metal sheets M10 and M20 such that the metal sheets are clamped between the upper welding electrode E10 and the lower welding electrode E20 (step S401). Here, the circuit control unit 514 controls the operation frequency of the MERS 410 such that the operation frequency becomes $f_0$.

Subsequently, the magnetic fluxes generated by the welding currents penetrate through the coils C1 to C4, and thus, the voltage detection unit 910 measures the induced electromotive forces $e_i$ generated by the coils C1 to C4 (step S403).

Subsequently, the determination unit 513 measures or calculates a maximum value $e_o$ of a voltage difference of two induced electromotive forces $e_i$ within four induced electromotive forces $e_i$ of the coils C1 to C4 measured by the voltage detection unit 910 (step S405).

Subsequently, the determination unit 513 determines whether or not the magnitude of the maximum value $e_o$ of the voltage difference exceeds a predetermined upper-limit voltage difference threshold $e_{oc}$ (step S407). For example, in a case where the sputters occur or a case where there is a symptom of the occurrence of the sputters, values indicating the magnitude of the voltage difference between the induced electromotive forces $e_i$ of the coils C1 to C4 may be previously investigated, and the voltage difference threshold $e_{oc}$ may be determined from the magnitude of the investigated induced electromotive force.

Subsequently, in a case where the determination unit 513 determines that the magnitudes of the maximum value $e_o$ of the voltage difference does not exceed the voltage difference threshold $e_{oc}$, the circuit control unit 514 continues the electric current applying process without changing the operation frequency $f_0$ of the MERS 410 (step S409).

Meanwhile, in a case where the determination unit 513 determines that the magnitude of the maximum value $e_o$ of the voltage difference exceeds the voltage difference threshold $e_{oc}$, the circuit control unit 514 changes the operation frequency of the MERS 410 (step S411). The operation frequency of the MERS 410 is increased, and thus, the magnitude of the welding current is set to be lower than the current value (step S413). For example, the circuit control unit 514 controls the operation of the MERS 410 such that the magnitude of the welding current becomes lower than the current value by a value corresponding to a difference between the magnitude of the maximum value $e_o$ of the voltage difference and the voltage difference threshold $e_{oc}$. For example, the circuit control unit 514 sets the value acquired by multiplying the frequency $f_0$ by the coefficient k preset depending on the difference between the magnitude of the maximum value $e_o$ of the voltage difference and the voltage difference threshold $e_{oc}$, as the changed operation frequency ($kf_0$), and controls the operation frequency of the MERS 410 such that the operation frequency becomes $kf_0$.

Subsequently, the circuit control unit 514 determines whether or not the preset electric processing time (setting time) elapses after the application of the electric current is started (step S415). In a case where it is determined that the setting time elapses, the circuit control unit 514 stops the operation of the MERS 410 to end the electric current applying process (step S417), and ends the process of the present flowchart. Meanwhile, in a case where it is determined that the setting time does not elapse, the circuit control unit 514 returns to step S403 again, and continues the process of the present flowchart.

As described above, in the present embodiment, a plurality of coils C1 to C4 is arranged so as to have a distance in a direction in which the coils circle around the upper welding electrode E10 in a state in which the magnetic fluxes generated by the welding currents flowing in the upper welding electrode E10, the metal sheet M10, the metal sheet M20, and the lower welding electrode E20 penetrate on a side of the upper welding electrode E10. For example, the welding currents of the regions corresponding to the coils C1 to C4 are derived from the magnetic fluxes φ derived from the induced electromotive forces of the coils C1 to C4. In a case where at least one of the magnitudes of the welding currents of the regions corresponding to the coils C1 to C4 is deviated from the range ΔI determined by the upper-limit welding current $I_u$ and the lower-limit welding current $I_d$, the operation frequency of the MERS 410 is increased such that the magnitude of the welding current is decreased by the value corresponding to the maximum deviation amount. Accordingly, a change of the impedance between the upper welding electrode E10, the metal sheet M10, the metal sheet M20, and the lower welding electrode E20 may be directly captured as a distribution of the welding current in a region perpendicular to the axis of the upper welding electrode E10. Thus, it is possible to more rapidly and reliably detect the occurrence of the sputters than in a case where the welding pressure is detected and the welding pressure is controlled. It is possible to set the range ΔI determined by the upper-limit welding current $I_u$ and the lower-limit welding current $I_d$ such that an indication of the sputters occur is detected.

In the present embodiment, it has been described that an example in which the coils C1 to C4 are the same and have a 4-fold symmetric relationship with the axis 201 of the upper welding electrode E10 as its axis. However, in the present embodiment, the coils do not necessarily have such a relationship as long as two or more (preferably three or more) coils are arranged so as to have a distance in the direction in which the coils circle around the upper welding electrode E10 in a state in which the magnetic fluxes generated by the welding currents penetrate on the side of the upper welding electrode E10. The number of coils may not be 4, and at least one of the magnitude, the orientation, and the number of turns of each coil may be different. The coils may not have the rotational symmetric relationship with the axis 201 of the upper welding electrode E10 as its axis.

In such a case, it is possible to set a correction factor by which the induced electromotive forces of the coils C1 to C4 are to be multiplied for the coils C1 to C4 depending on the magnitude, the position, or the orientation of the coil surface of the coil. For example, in a case where the magnitude of the coils are different, the resistance spot welding may be performed by using coils each having a reference magnitude and coils to be actually used under the same condition except for the magnitude of the coils, the induced electromotive forces of the coils may be measured, and a ratio of the measured induced electromotive forces of the coils may be used as the correction factor. Even in a case where the orientations of the coils are different or the coils do not have the rotational symmetric relationship, it is possible to determine the correction factor similarly to a case where the magnitudes of the coils are different.

In the present embodiment, it has been described that the coils C1 to C4 are arranged for the upper welding electrode E10. However, the coils C1 to C4 may be arranged for the lower welding electrode E20 in addition to or instead of the arrangement of the coils C1 to C4 for the upper welding electrode E10. All the number of coils, the magnitude, the orientations of coils, and the number of turns of each of the coils may be same or at least one thereof may be different between the coils arranged for the upper welding electrode E10 and the coils arranged for the lower welding electrode E20. The coils arranged for the lower welding electrode E20 may not have the rotational symmetric relationship with the axis of the lower welding electrode E20 as its axis. The magnetic field generated by the welding currents may be measured using another magnetic field measurement device such as a hall element instead of the coils C1 to C4.

In the present embodiment, it has been described that the welding currents of the regions corresponding to the coils C1 to C4 are derived and whether or not at least one of the magnitudes of the derived welding currents is deviated from the range ΔI is determined. In addition, for example, whether or not at least one of the magnetic fluxes φ of the coils C1 to C4 is deviated from the preset range may be determined. For example, in a case where the sputters occur or a case where there is a symptom of the occurrence of the sputters, the values indicating the magnetic fluxes of the coils C1 to C4 may be previously determined, and this range may be determined from the investigated magnetic fluxes φ. For example, in such a case, the relationship between the deviation amount from the preset range of the magnetic flux φ and a change amount (reduction amount) of the magnitude of the welding current may be preset for the coils C1 to C4. The change amount of the magnitude of the welding current may be determined from the above-described relationship set for the coil indicating the magnetic flux φ to which is not present in the preset range, and the operation frequency of the MFRS 410 may be changed depending on the determined change amount. In addition, it is possible to change the operation frequency of the MERS 410 based on the induced electromotive forces generated by the coils C1 to C4 or the maximum value of the difference between the induced electromotive forces generated by the coils C1 to C4.

In the present embodiment, it has been described that the magnitude of the welding current is changed using the MERS 410. If the MERS 410 is used, since the soft switching can be realized as described above, a response speed can be increased, and various waveforms can be generated, the use of the MERS is preferable. However, the MERS is not necessarily used as long as a power supply circuit capable of changing the magnitudes of the welding currents (the powers applied to the upper welding electrode E10, the metal sheet M10, the metal sheet M20, and the lower welding electrode E20) is used. For example, a known inverter circuit capable of changing the magnitude of the current by changing the frequency may be used. A single-phase AC power supply circuit may be used as long as phase controlling using the thyristor is performed. A DC power supply circuit may be used. If the distribution of the welding current is generated within the upper welding electrode E1, the magnetic fluxes penetrating the coils C1 to C4 can be changed with time as described above even though a direct current is used.

[Third Embodiment]

Hereinafter, a third embodiment of the present invention will be described. In the second embodiment, it has been described that the coils C1 to C4 are arranged above the metal sheet M10 (or under the metal sheet M20). In contrast, in the present embodiment, two coils circle around the metal sheets M10 and M20. As mentioned above, the number, configuration, and arrangement of coils are principally different between the present embodiment and the second embodiment. Accordingly, in the description of the present embodiment, the same portions as those in the second embodiment will be assigned the same reference symbols as the reference symbols assigned in FIGS. 6 to 14, and the detailed description thereof will be omitted.

Figure 15A:
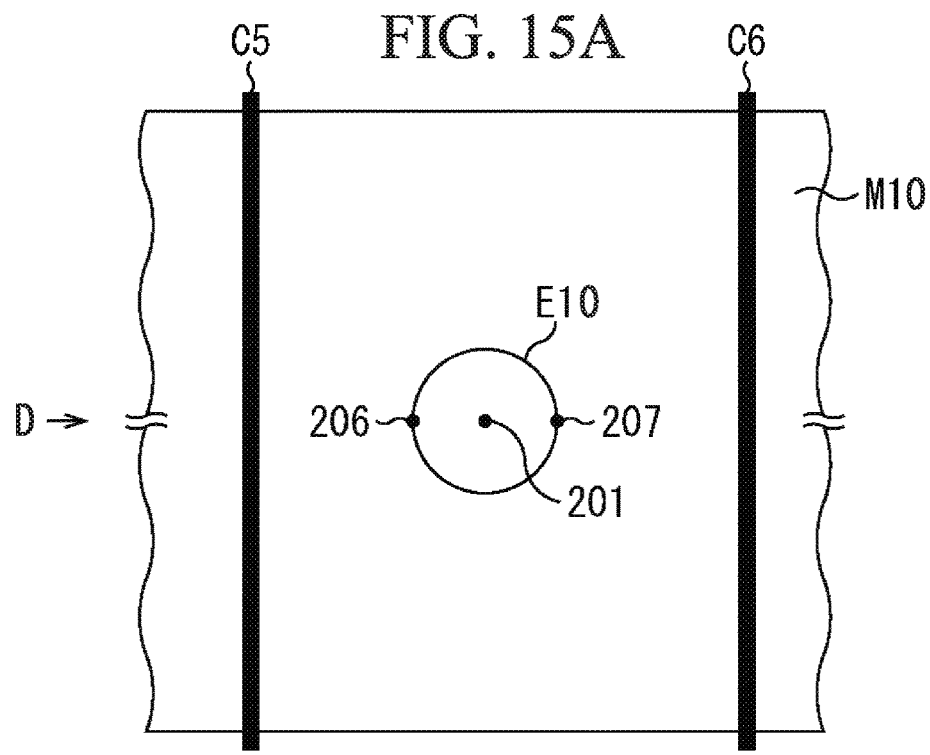
FIG. 15A is a plan view showing an example of coil arrangement according to a third embodiment of the present invention.
Figure 15B:
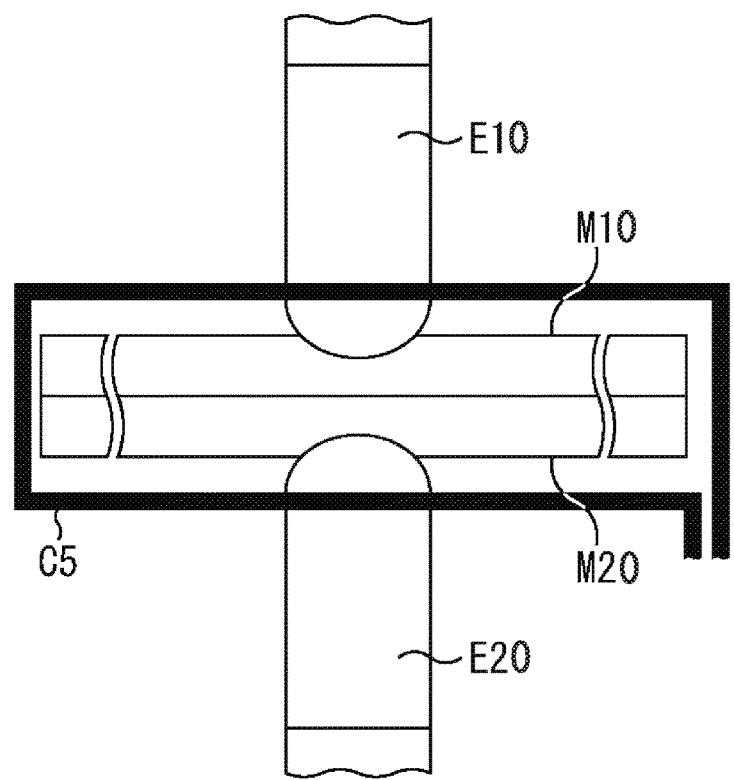
FIG. 15B is a side view viewed from arrow D of FIG. 15A in order to show the coil arrangement according to the present embodiment.

FIGS. 15A and 15B are diagrams showing examples of the arrangement of the coils C5 and C6.

Specifically, FIG. 15A is a diagram when the metal sheet M10 the upper welding electrode E10, the coil C5, and the coil C6 are viewed from a side on which the upper welding electrode E10 is disposed in a normal direction of the metal sheet M10. FIG. 15B is a diagram when the metal sheet M10, the metal sheet M20, the upper welding electrode E10, the lower welding electrode E20, the coil C5, and the coil C6 are viewed in arrow line D of FIG. 15A. In FIG. 15B, the coil C6 is not visible to be hidden by the coil C5 and the upper welding electrode E10.

The coils C5 and C6 circle (is wound) around the metal sheets M1 and M2 with the distance between the metal sheets M10 and M2 so as to face fifth and sixth positions 206 and 207 (positions acquired by equally dividing the side circumferential surfaces of the upper welding electrode E10 and the lower welding electrode E20 into two along the axis 201) in the circumferential directions of the side circumferential surfaces of the upper welding electrode E10 and the lower welding electrode E20 in a state in which the magnetic fluxes generated by the welding currents penetrate.

Specifically, in the examples shown in FIGS. 15A and 15B, the coils C5 and C6 are the same. As shown in FIG. 15A, the coils C5 and C6 are arranged in positions having a 2-fold symmetric relationship with the axis 201 (the axis 201 matches the axis of the lower welding electrode E20) of the upper welding electrode E10 as its axis. Here, the coils C5 and C6 are preferably arranged in positions as close as possible to the upper welding electrode E10 and the lower welding electrode E20.

A case where the number of turns of the coils C5 and C6 may not be "1" or may be "2" or more as shown in FIGS. 15A and 15B is as described in the second embodiment. At least one of the number of coils, the magnitude, orientations of coils, and the number of turns of each of the coils may be different, and the coils may not be arranged in positions having the rotational symmetric relationship. Here, at least two or more coils are arranged in positions facing each other with the upper welding electrode E10 and the lower welding electrode E20 interposed therebetween. If the coils are arranged in the positions facing each other with the upper welding electrode E10 and the lower welding electrode E20 interposed therebetween, the coils may circle (may be wound) around the metal sheets M1 and M2 such that the coils are perpendicular to the coils C5 and C6 in addition to or instead of the coils C5 and C6.

In addition, in the description of the second embodiment, since the configuration and operation caused by setting the number of coils to be "4" to "2" are merely different, the detailed description thereof will be omitted.

In even such a case, the same effect as that of the second embodiment can be acquired.

Even in the present embodiment, various modification examples described in the second embodiment may be employed.

The process of the control unit 510 according to the second and third embodiments of the present invention described above may be realized by causing a computer to execute a program. A computer-readable recording medium that records the program and a computer program product such as the program may also be applied as the embodiment of the present invention. For example, a removable disk, a hard disk, an optical disk, a magneto-optical disk, a CD-ROM, a magnetic tape, a non-volatile memory card, or a ROM may be used as the recording medium.

[Fourth Embodiment]

Hereinafter, a fourth embodiment of the present invention will be described. A resistance spot welding system 1B according to the fourth embodiment is different from that in the first embodiment in that the resistance spot welder 800 includes a pressure adjustment unit 900. Thus, the drawings described in the first embodiment and the relevant description will be employed to the configuration, and the same reference symbols will be used. Thus, the description thereof will be omitted.

In a resistance spot welding system and a resistance spot welding method according to the present embodiment, a pressure is applied to the contact region between the metal sheet and the metal sheet while a high-frequency electric current is applied to the metal sheets layered each other, and this pressure is gradually increased until the application of the electric current is ended.

A spot welded joint according to the present embodiment is a spot welded joint formed by the resistance spot welding method according to the present embodiment, and melt-solidification structures are formed at an outer circumferential portion of the contact region between the metal sheet and the metal sheet.

Figure 16:
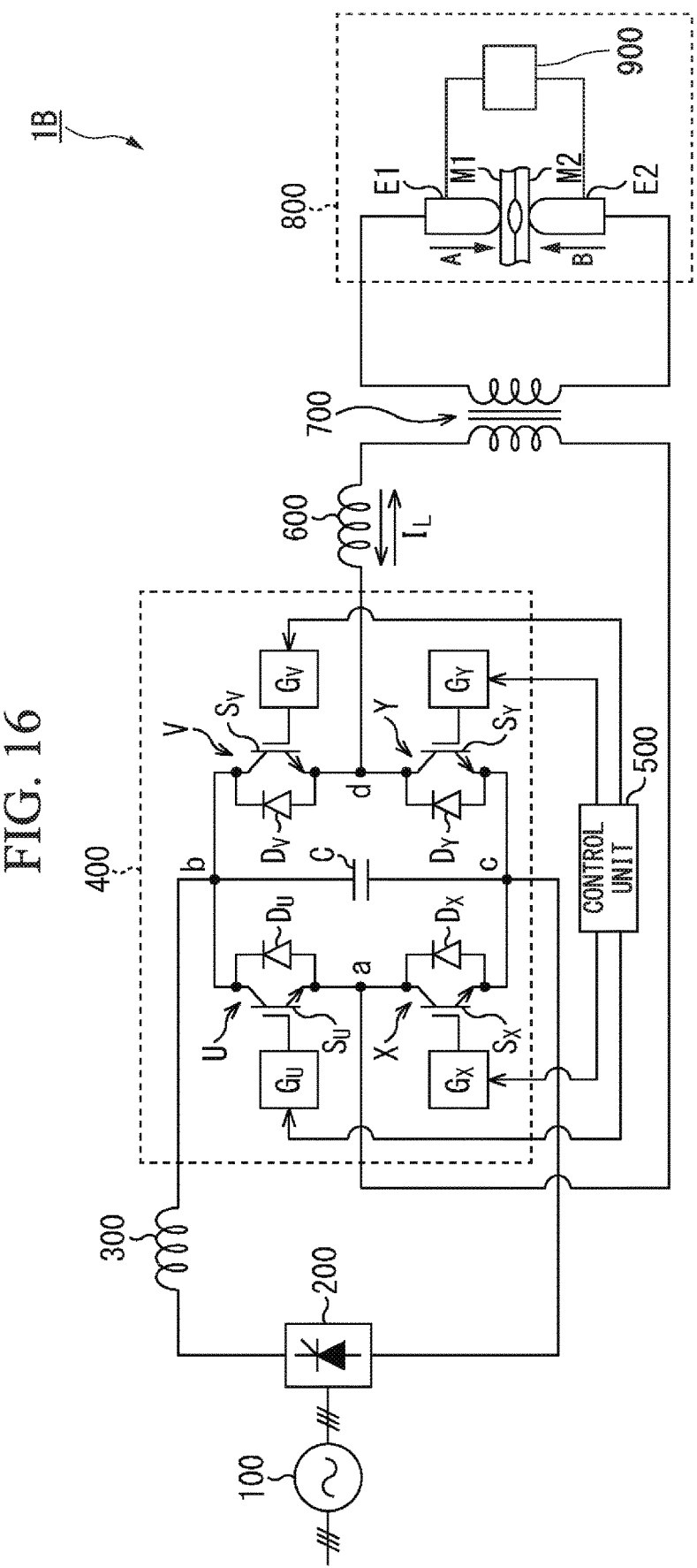
FIG. 16 is a diagram showing an example of a resistance spot welding system according to a fourth embodiment of the present invention.

FIG. 16 is a diagram showing an example of a configuration of the resistance spot welding system according to the fourth embodiment. The pressure adjustment unit 900 increases or decreases a clamping force of the welding electrodes E1 and E2 that clamp the plurality of metal sheets M1 and M2 of which the sheet surfaces are layered each other. For example, the pressure adjustment unit 900 increases or decreases the clamping force of the welding electrodes E1 and E2 that clamp the metal sheets M1 and M2 in an A direction and a B direction of FIG. 16.

Figure 17A:
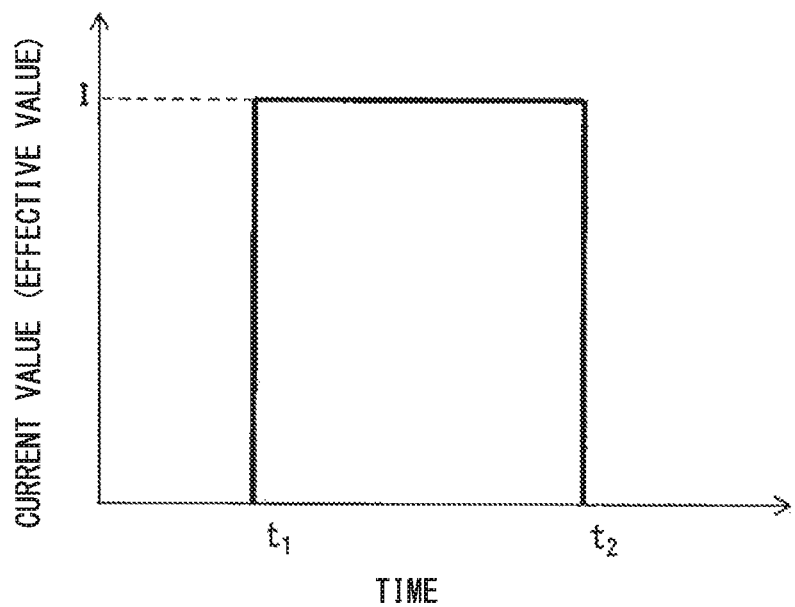
FIG. 17A is a diagram showing an electric current pattern according to the present embodiment.
Figure 17B:
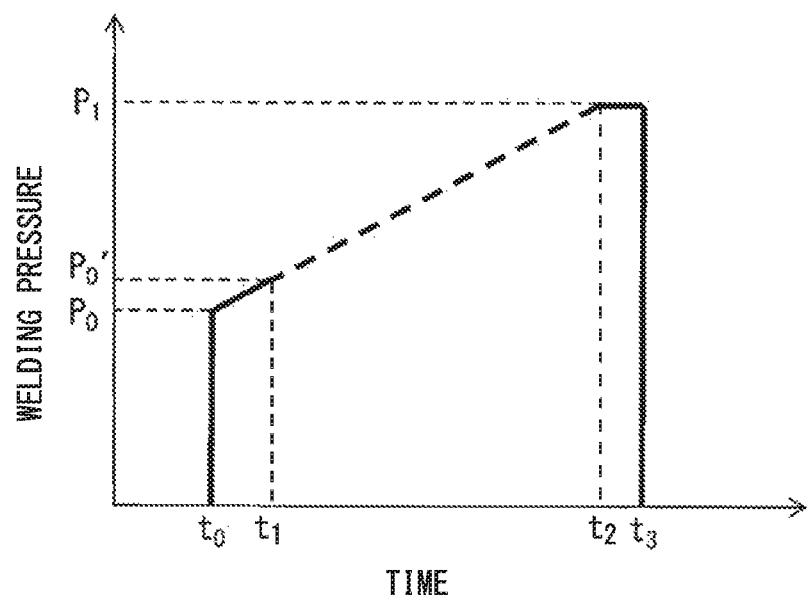
FIG. 17B is a diagram showing a pattern of a pressurization or electrode pushing amount according to the present embodiment.

FIG. 17A shows an electric current pattern according to the fourth embodiment. FIG. 17B shows an association of the pattern of the pressurization of the welding electrodes E1 and E2 to the metal sheets M1 and M2 or an electrode pushing amount.

The metal sheets M1 and M2 layered each other are clamped by the welding electrodes E1 and E2, and a pressure $P_0$ is pressurized. The clamping force for clamping the metal sheets M1 and M2 is gradually increased from a pressurizing start point $t_0$, the application of a high-frequency electric current corresponding to the current value (effective value) I to the welding electrodes E1 and E2 is started in a time $t_1$ ($>t_0$), and the application of the electric current is continued until $t_2$ ($>t_1$) (see FIG. 17A). Here, the clamping force for clamping the metal sheets M1 and M2, that is, the pressure with which the contact region between the metal sheets M1 and M2 layered each other is pressurized is gradually increased from $P_0'$ at the time $t_1$ to $P_1$ between $t_1$ and $t_2$. The pressure $P_1$ is maintained until $t_3$ ($>t_2$) after the application of the electric current is ended ($t_2$), and the spot welding is ended after the solidification of the melting portions of the metal sheets M1 and M2 is completed.

In FIG. 17B, the pattern of the pressurization or the electrode pushing amount between $P_0'$ and P1 between $t_1$ and $t_2$ is depicted by a dotted line, but the pressurization pattern during this period is not limited to a straight line. The pressurization pattern may be an upward convex curve, or a downward convex curve. The welding pressure may be increased in a stepped shape.

Figure 19A:
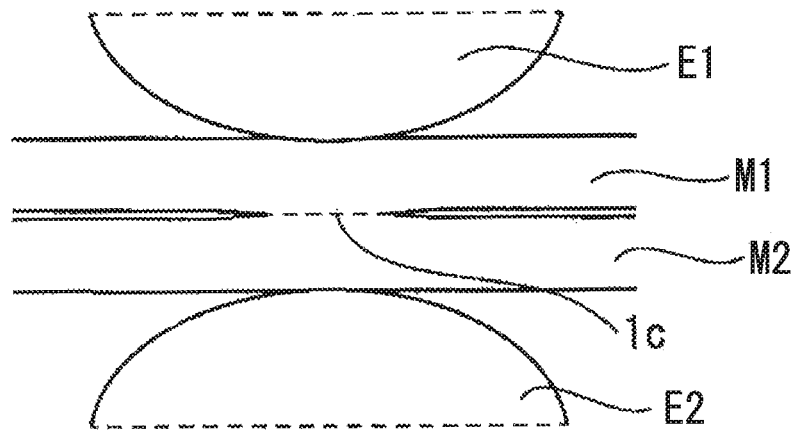
FIG. 19A is a schematic diagram showing a procedure during which a contact region between a steel sheet and an electrode is increased in a situation in which a contact diameter between the steel sheet and the electrode is decreased since pressurization or an electrode displacement is small in the present embodiment.
Figure 19B:
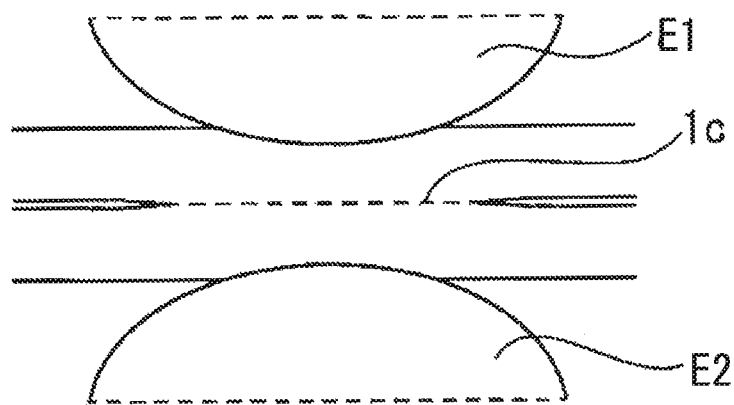
FIG. 19B is a schematic diagram showing a procedure during which the contact region between the steel sheet and the electrode is increased in a situation in which the contact diameter between the steel sheet and the electrode is increased since the pressurization or the electrode displacement is large in the present embodiment.

In the present embodiment, it is important to gradually increase the welding pressure or displacement of the welding electrodes E1 and E2 while the high-frequency current is applied to the welding electrodes. As shown in FIGS. 19A and 19B, the welding electrodes E1 and E2 clamp and pressurize a contact region 1c of the metal sheets M1 and M2 layered each other, and a welding pressure or a displacement amount is gradually increased. Thus, a contact diameter between the metal sheets M1 and M2 is gradually increased. In order to increase the contact diameter between the metal sheets M1 and M2, tip shapes of the welding electrodes E1 and E2 need to have convex shapes. In general, an R electrode or a DR electrode which is commercially available may be appropriately used.

In the application of the high-frequency electric current, since the current is concentrated on an outer circumference of the contact region between the metal sheets, heat is generated in the outer circumference of the contact region and the circumference thereof is melt while the contact diameter between the metal sheets becomes larger. Thus, the melting portions expand. The expansion of the melting portions, that is, the expansion of the outer diameters of the melting portions leads to the improvement of the CTS. The association of the behavior of the melting portions with the improvement of the CTS will be described below.

Figure 18A:
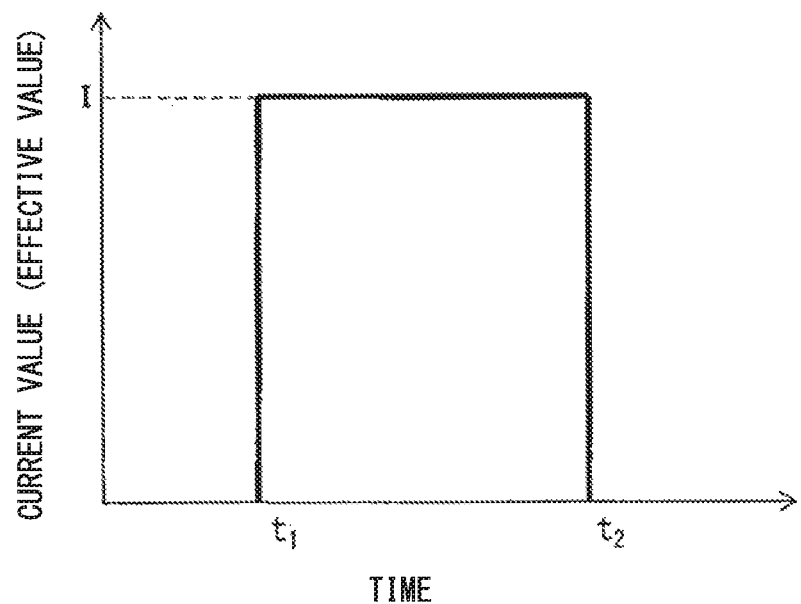
FIG. 18A is a diagram showing another electric current pattern according to the present embodiment.
Figure 18B:
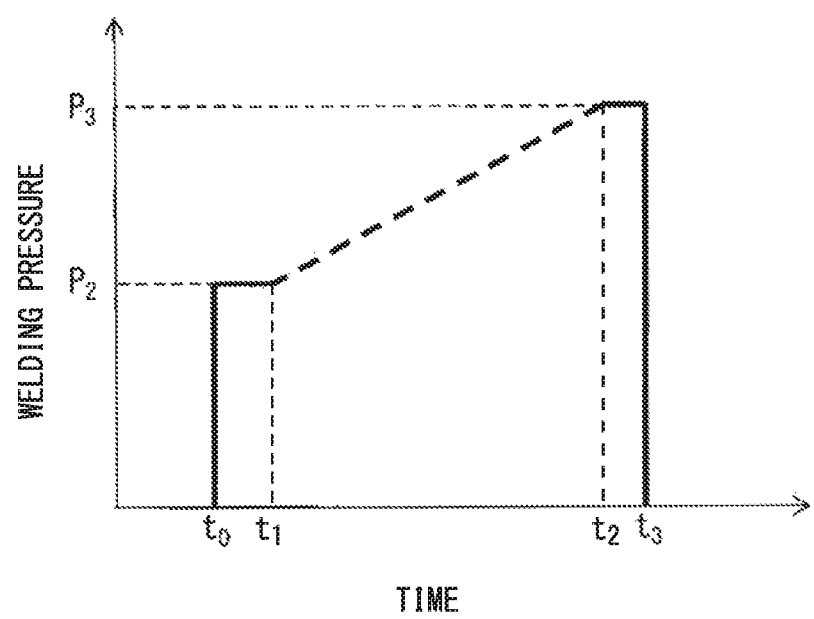
FIG. 18B is a diagram showing another pattern of the pressurization or electrode pushing amount according to the present embodiment.

FIG. 18A shows another electric current pattern according to the present embodiment. FIG. 18B shows a pressurization pattern associated with the electric current pattern shown in FIG. 18A. This association is basically the same as the association shown in FIGS. 17A and 17B, but the metal sheets M1 and M2 layered each other is pressurized with a pressure $P_2$, and the pressure is maintained until $t_1$ when the application of the electric current is started.

After the clamping force for clamping the metal sheets M1 and M2 is maintained in the pressure $P_2$ until $t_1$, the application of the high-frequency electric current corresponding to the current value (effective value) I for the welding electrodes E1 and E2 is started, and the application of the electric current is continued until $t_2$ (see FIG. 18A). The pressure with which the contact region between the metal sheets M1 and M2 layered each other is pressurized is increased from $P_2$ at the time $t_1$ to $P_3$ between $t_1$ and $t_2$, the pressure $P_3$ is maintained until $t_3$ after the application of the electric current is ended ($t_2$), and the spot welding is ended after the solidification of the melting portions of the metal sheets M1 and M2 is completed.

The pressurization pattern from $P_2$ to $P_3$ between $t_1$ and $t_2$ is depicted by a dotted line in FIG. 18B, but the pressurization pattern during this pattern is not limited to a straight line. The pressurization pattern may be an upward convex curve, or a downward convex curve. The welding pressure may be increased in a stepped shape. In FIGS. 17A, 17B, 18A, and 18B, the pressurization process between $t_0$ and $t_1$ is performed in order to bring the metal sheet M1 into contact with the metal sheet M2. The pressurization process between $t_2$ and $t_3$ is performed in order to cool the metal sheets M1 and M2 under pressurizing the melt metal sheets M1 and M2.

A case where the frequency of the high-frequency electric current flowing in the metal sheets M1 and M2 is constant is illustrated in FIGS. 17A, 17B, 18A, and 18B but the frequency of the high-frequency electric current may be changed during the application of the electric current in consideration of a heat generation amount in the outer circumferential portion of the contact region between the metal sheets. The frequency of the high-frequency electric current flowing in the metal sheets M1 and M2 is changed by controlling the MERS 400 by means of the control unit 500. The frequency of the high-frequency electric current is changed, and thus, a range of the melt region and characteristics of a heat generation distribution can be adjusted.

The frequency of the high-frequency electric current flowing in the metal sheets M1 and M2 is not particularly limited, but the frequency thereof is preferably 15 kHz or more with which the concentration of the current due to skin effect is efficiently performed, and the frequency thereof is preferably 100 kHz or less in order not to increase power capacity too much.

The pressure with which the contact region between the metal sheets M1 and M2 layered each other is pressurized is not particularly limited. The portions to be melt are appropriately bought into contact with each other in consideration of the strength, thickness, and member shapes of the metal sheets M1 and M2.

Here, in the present embodiment, the association of the behavior of the melting portions to be formed on the outer circumferential portion of the contact region between the metal sheets M1 and M2 with the improvement of the CTS will be described.

Figure 20A:
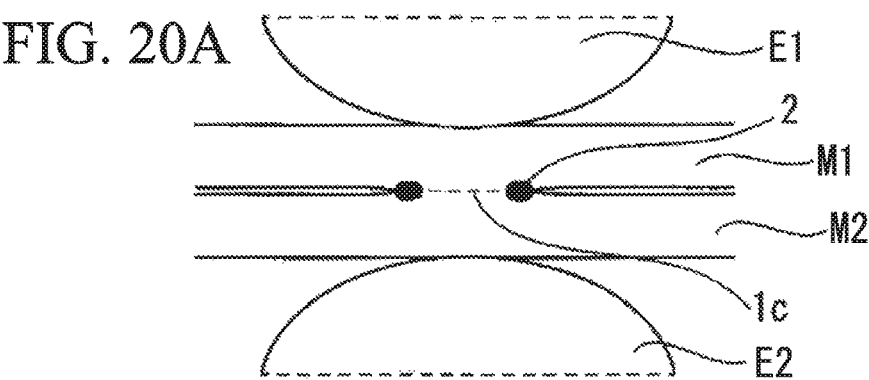
FIG. 20A is a schematic diagram showing melting portions (black portion in the drawing) at an initial stage of the application of the electric current in the procedure during which the melting portions formed on the outer circumferential portion of the contact region between the steel sheets are increased in the present embodiment.
Figure 20B:
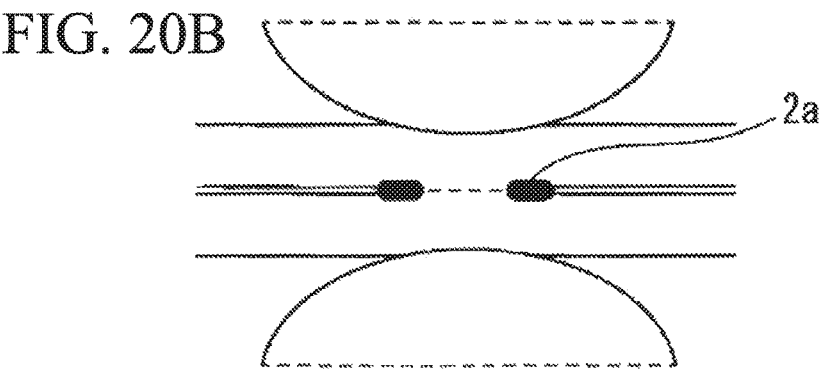
FIG. 20B is a schematic diagram showing the melting portions at the initial stage of the application of the electric current in order to show the continuous of FIG. 20A in the present embodiment.
Figure 20C:
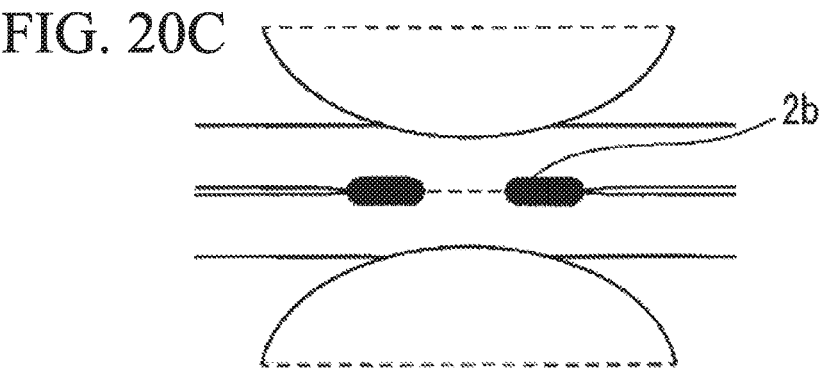
FIG. 20C is a schematic diagram showing the melting portions at the initial stage of the application of the electric current in order to show the continuous of FIG. 20B in the present embodiment.
Figure 20D:
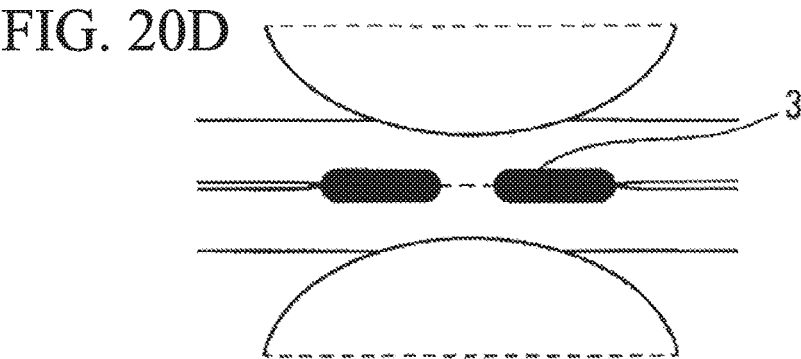
FIG. 20D is a schematic diagram showing the melting portions at the initial stage of the application of the electric current in order to show the continuous of FIG. 20C in the present embodiment.

FIGS. 20A to 20D are a schematic diagram showing a procedure during which the melting portions (black portions) formed on the outer circumferential portion of the contact region between the metal sheets M1 and M2 expand. This is a phenomenon occurred over the times $t_1$ to $t_2$ or the times $t_1$ to $t_3$ shown in FIGS. 17A, 17B, 18A, and 18B. FIG. 20A shows melting portions 2 (black portions) at an initial stage of the application of the electric current, FIGS. 20B and 20C show melting portions 2a and 2b (black portions) in the middle of the procedure during which the melting portions (black portions) expand, and FIG. 20D shows solidification structures 3 (black portion) finally solidified the expanded melting portions.

The metal sheets M1 and M2 layered each other are clamped between the welding electrodes E1 and E2, and thus, the contact region 1c is formed. The high-frequency electric current is applied to the contact region 1c. If the high-frequency electric current is applied to the contact region 1c, heat is generated in the end portions of the contact region 1c due to the skin effect of the current, and the end portions are melt. Thus, the melting portions 2 are formed on the outer circumferential portion of the contact region 1c.

After the melting portions 2 are formed, if the pressure applied to the contact region 1c is gradually increased as shown in FIGS. 17B and 18B, the outer diameters of the melting portions 2 are increased as shown in FIG. 20B, and the melting portions 2a of which the outer diameters are increased are formed on the outer circumferential portion of the contact region 1c.

If the pressure applied to the contact region 1c is further increased, the outer diameters of the melting portions 2a are further increased, and the melting portions 2b of which the outer diameters are further increased are formed on the outer circumferential portion of the contact region 1c, as shown in FIG. 20C.

If the electric current is applied while increasing the pressure applied to the contact region 1c, the outer diameters of the melting portions are increased, and the inner diameters of the melting portions 2 contract due to the heat transfer to the inside, as shown in FIG. 20D. Thus, a fused area of the metal sheets M1 and M2 is increased.

As mentioned above, if the pressure applied to the contact region 1c is increased until the application of the electric current is ended, the outer diameters of the melting portions 2b are further increased, and the fused area of the metal sheets M1 and M2 is increased. The melting portions are solidified. As a result, as shown in FIG. 20D, the welded joint including the melt-solidification structures 3 of which the fused area of the metal sheets M1 and M2 is increased and the length of the outer circumference is long can be acquired on the outer circumferential portion of the contact region 1c between the metal sheets M1 and M2.

Accordingly, in the present embodiment, the spot welded joint with improved TSS and remarkably improved CTS can be acquired.

EXAMPLE

Hereinafter, an example of the present invention will be described, but a condition in the example is a condition example employed in order to check the feasibility and effect of the present invention. The present invention is not limited to the condition example. The present invention may employ various conditions without departing from the gist of the present invention as long as an object of the present invention is achieved.

Example 1

In the combination of the steel sheets shown in Table 1, the spot welding is performed by using the association of the electric current pattern with pressurization pattern shown in FIGS. 18A and 18B under the welding condition shown in Table 2. An outer diameter of a nugget formed on the outer circumferential portion of the contact region between the steel sheet and the steel sheet through the spot welding is measured, and TSS and CTS are measured. An R-type electrode which is made of a Cu—Cr alloy and of which diameter of the electrode tip is 8 mm and a radius of curvature of the electrode tip is 40 mm is used as the spot welding electrode. Here, $t_0$ in FIGS. 17A, 17B, 18A, and 18B is set to be 0(s). The result is shown in Table 2.

TABLE 1

| Combination | Steel sheet 1 | | Steel sheet 2 | |
|---|---|---|---|---|
| of steel sheet | Strength (MPa) | Sheet thickness (mm) | Strength (MPa) | Sheet thickness (mm) |
| A | 980 | 1.6 | 980 | 1.6 |
| B | 1180 | 1.2 | 1470 | 1.8 |

TABLE 2

| | Combination of steel sheet | Frequency [kHz] | Welding pressure [kN] | $t_1$[ms] ($t_0$ = 0) | $t_2$[ms] ($t_0$ = 0) | $t_3$[ms] ($t_0$ = 0) | Nugget outer diameter [mm] | TSS [kN] | CTS [kN] | Pattern |
|---|---|---|---|---|---|---|---|---|---|---|
| Invention example 1 | A | 18 | 1.3→ 3.8 | 200 | 800 | 820 | 9.5 | 10.8 | 11.9 | FIG. 1 |
| Invention example 2 | B | 15→ 40 | 1.7→ 4.2 | 100 | 700 | 800 | 7.2 | 8.2 | 8.4 | FIG. 2 |
| Comparative example 1 | A | 0.05 | 4.0 | 200 | 800 | 820 | 5.1 | 9.2 | 7.2 | |
| Comparative example 2 | A | 18 | 4.0 | 200 | 800 | 820 | 6.4 | 9.5 | 6.8 | |
| Comparative example 3 | A | 18 | 3.8→1.3 | 200 | 800 | 820 | 7.2 | 8.5 | 5.8 | |
| Comparative example 4 | B | 0.05 | 4.0 | 100 | 700 | 800 | 5.5 | 6.5 | 4.1 | |

In the present embodiment, it has been described that the MERS is used as the power supply device. If the MERS is used, since the soft switching can be realized as mentioned above, the response speed can be increased, and various waveforms can be generated, the use of the MERS is preferable. However, if it is necessary to change the magnitude and the frequency of the welding current, the MERS is not necessarily used. For example, a known power supply device capable of applying the electric current to the resistance spot welder may be used instead of the MERS.

According to the present embodiment described above, it is possible to provide the spot welded joint with remarkably improved cross tensile (CTS). Thus, the present embodiment has high applicability in an industry in which the spot welding is used as assembly means, for example, in an automobile industry.

In the fourth embodiment described above, the following conditions are employed.

(1) The spot welding method according to the present embodiment assumes that in a spot welding method of the layered steel sheets, the layered steel sheets are pressurized by using the electrodes of which the tips have the convex shapes, then, the high-frequency electric current is applied to the steel sheets, the contact region between the steel sheet and the steel sheet is pressurized during the application of the electric current, the welding pressure is gradually increased until the application of the electric current is ended, and the welding pressure is zero after the application of the electric current is ended.

(2) In the spot welding method of (1), the frequency of the high-frequency electric current is changed during the application of the high-frequency electric current.

(3) In the spot welding method of (1) or (2), the frequency of the high-frequency electric current is 15 kHz or more and 100 kHz or less.

(4) In the spot welded joint formed in the spot welding method according to any one of (1) to (3), the melt-solidification structures are formed on the outer circumferential portion of the contact region between the steel sheet and the steel sheet.

The embodiments of the present invention described above merely show the specific examples in performing the present invention, and the technical scope of the present invention is not interpreted as being limited by these embodiments. That is, the present invention may be performed in various forms without departing from the technical ideals thereof or the important features thereof.

INDUSTRIAL APPLICABILITY

In accordance with the power supply device according to the aspect of the present invention, since the electric processing device can perform the electric processing using the appropriate processing condition corresponding to the material or shape of the workpiece, it is possible to improve the characteristics (for example, the joint strength of the welding portion in the resistance spot welding) of the workpiece.

BRIEF DESCRIPTION OF THE REFERENCE SYMBOLS 1, 1A, 1B: RESISTANCE SPOT WELDING SYSTEM
100, 110: AC POWER SUPPLY
200, 210: RECTIFIER
300, 310: DC REACTOR
400, 410: MERS
500, 510: CONTROL UNIT
511: MAGNETIC FLUX DISTRIBUTION DERIVING UNIT
512: WELDING CURRENT DISTRIBUTION DERIVING UNIT
513: DETERMINATION UNIT
514: CIRCUIT CONTROL UNIT
600, 610: AC INDUCTANCE
700, 710: CURRENT TRANSFORMER
800, 810: RESISTANCE SPOT WELDER
900: PRESSURE ADJUSTMENT UNIT
910: VOLTAGE DETECTION UNIT
C1 to C6: COIL
E1, E2, E10, E20: WELDING ELECTRODE
M1, M2, M10, M20: METAL SHEET
1c: CONTACT REGION
2, 2a, 2b: MELT PORTION
3: MELT-SOLIDIFICATION STRUCTURE

The invention claimed is:

1. A power supply device that supplies an output current to an electric processing device which performs electric processing on workpieces, the power supply device comprising:

a first power supply;

a magnetic energy recovery switch that receives a current supplied from the first power supply, and converts the received current into the output current; and a control unit that controls the magnetic energy recovery switch such that an electric current frequency of the output current includes a first electric current frequency and a second electric current frequency which are different from each other within a one-time electric processing time using the electric processing device, wherein the magnetic energy recovery switch includes a bridge circuit in which a first reverse conducting semiconductor switch and a fourth reverse conducting semiconductor switch are arranged in series in a first path such that conduction directions when the first and fourth reverse conducting semiconductor switches are switched off are reverse directions each other, a second reverse conducting semiconductor switch and a third reverse conducting semiconductor switch are arranged in series in a second path such that conduction directions when the second and third reverse conducting semiconductor switches are switched off are reverse directions each other, and the conduction directions of the first reverse conducting semiconductor switch and the third reverse conducting semiconductor switch when the first and third reverse conducting semiconductor switches are switched off are the same, and a capacitor that is connected between a region of the first path which is located between the first reverse conducting semiconductor switch and the fourth reverse conducting semiconductor switch and a region of the second path which is located between the second reverse conducting semiconductor switch and the third reverse conducting semiconductor switch, the magnetic energy recovery switch is disposed between the first power supply and the electric processing device, and the control unit controls the electric current frequency within the one-time electric processing time by controlling an ON time and an OFF time of at least one of a pair including the first reverse conducting semiconductor switch and the third reverse conducting semiconductor switch and a pair including the second reverse conducting semiconductor switch and the fourth reverse conducting semiconductor switch, or controls the electric current frequency and a current value of the output current within the one-time electric processing time by controlling the current supplied from the first power supply, and the ON time and the OFF time of at least one of the pair including the first reverse conducting semiconductor switch and the third reverse conducting semiconductor switch and the pair including the second reverse conducting semiconductor switch and the fourth reverse conducting semiconductor switch.

2. The power supply device according to claim 1, wherein the one-time electric processing time is equal to or less than one second.

3. The power supply device according to claim 1, wherein the electric current frequency during the electric processing is equal to or less than a resonance frequency determined by inductance on a side of the electric processing device viewed from an output end of the magnetic energy recovery switch and capacitance of a capacitor included in the magnetic energy recovery switch.

4. A joining system comprising:
the power supply device according to claim 1; and
a joining device as the electric processing device that applies the output current output from the power supply device to a contact region between a plurality of electric-current applied materials as the workpieces and joins the plurality of electric-current applied materials by performing energization heating on the contact region.

5. The joining system according to claim 4,
wherein the joining device includes
first electrode,
a second electrode that is disposed so as to face the first electrode, the plurality of electric-current applied materials being clamped between the first electrode and the second electrode, and
a plurality of coils through which magnetic fluxes penetrate, the magnetic fluxes generated by the output current output from the power supply device, which flows in the first electrode, the plurality of electric-current applied materials, and the second electrode, and
the control unit controls the magnetic energy recovery switch such that the electric current frequency of the output current output from the power supply device is changed depending on electromotive forces generated by the plurality of coils due to the magnetic fluxes.

6. The joining system according to claim 5,
wherein the plurality of coils is arranged in positions different from each other around a central axis which shares a common axis with the first electrode and the second electrode with respect to at least one of the first electrode and the second electrode.

7. The joining system according to claim 5,
wherein, if it is determined that at least one of the electromotive forces generated by the plurality of coils is deviated from a preset range, the control unit controls the magnetic energy recovery switch such that the output current is increased or decreased by a value corresponding to a deviation amount from the preset range.

8. The joining system according to claim 5,
wherein the plurality of coils faces each other with the first electrode and the second electrode interposed therebetween, and is wound around the plurality of electric-current applied materials.

9. The joining system according to claim 4,
wherein the joining device includes a pressure adjustment unit that increases or decreases a clamping force for clamping the plurality of electric-current applied materials.

10. An electric processing method comprising:
a preparing process of preparing electric processing conditions depending on workpieces; and
an electric processing process of, within a one-time electric processing time of the workpieces according to the electric processing condition, applying an output current having a first electric current frequency to the workpieces and applying an output current having a second electric current frequency different from the first electric current frequency to the workpieces,
wherein
the electric processing process is performed using a magnetic energy recovery switch,
the magnetic energy recovery switch includes
a bridge circuit in which a first reverse conducting semiconductor switch and a fourth reverse conducting semiconductor switch are arranged in series in a first path such that conduction directions when the first and fourth reverse conducting semiconductor switches are switched off are reverse directions each other, a second reverse conducting semiconductor switch and a third reverse conducting semiconductor switch are arranged in series in a second path such that conduction directions when the second and third reverse conducting semiconductor switches are switched off are reverse directions each other, and the conduction directions of the first reverse conducting semiconductor switch and the third reverse conducting semiconductor switch when the first and third reverse conducting semiconductor switches are switched off are the same, and
a capacitor that is connected between a region of the first path which is located between the first reverse conducting semiconductor switch and the fourth reverse conducting semiconductor switch and a region of the second path which is located between the second reverse conducting semiconductor switch and the third reverse conducting semiconductor switch,
the magnetic energy recovery switch is disposed between the first power supply and the electric processing device, and
the control unit controls the electric current frequency within the one-time electric processing time by controlling an ON time and an OFF time of at least one of a pair including the first reverse conducting semiconductor switch and the third reverse conducting semiconductor switch and a pair including the second reverse conducting semiconductor switch and the fourth reverse conducting semiconductor switch, or controls the electric current frequency and a current value of the output current within the one-time electric processing time by controlling the current supplied from the first power supply, and the ON time and the OFF time of at least one of the pair including the first reverse conducting semiconductor switch and the third reverse conducting semiconductor switch and the pair including the second reverse conducting semiconductor switch and the fourth reverse conducting semiconductor switch.

11. The electric processing method according to claim 10, wherein the electric processing process includes a process of increasing or decreasing the output current depending on a change of an electromotive force based on magnetic flux generated by the output current applied to the workpieces.

12. The electric processing method according to claim 10, wherein the electric processing process includes
a process of forming a contact region for clamping a plurality of electric-current applied materials as the workpieces,
a process of performing energization heating for applying the output current to the contact region, and
a process of increasing or decreasing a clamping force applied to the plurality of electric-current applied materials.

* * * * *